(12) United States Patent
Matsuoka et al.

(10) Patent No.: US 12,238,058 B2
(45) Date of Patent: *Feb. 25, 2025

(54) SYSTEMS AND METHODS FOR MESSAGE FILTERING

(71) Applicant: Yohana LLC, Palo Alto, CA (US)

(72) Inventors: Yoky Matsuoka, Los Altos Hills, CA (US); Defne Civelekoglu, Berkeley, CA (US); Gwendolyn W. van der Linden, Redwood City, CA (US); Nitin Viswanathan, San Francisco, CA (US); Malia Beaulieu, San Jose, CA (US); Lingyun Liu, Sunnyvale, CA (US); Benjamin Deming, Campbell, CA (US); Sean Paterson, Mountain View, CA (US)

(73) Assignee: Yohana LLC, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/542,924

(22) Filed: Dec. 18, 2023

(65) Prior Publication Data

US 2024/0236022 A1 Jul. 11, 2024

Related U.S. Application Data

(63) Continuation of application No. 17/929,614, filed on Sep. 2, 2022, now Pat. No. 11,888,801.
(Continued)

(51) Int. Cl.
*H04L 51/212* (2022.01)
*G06F 40/20* (2020.01)
(Continued)

(52) U.S. Cl.
CPC ............ *H04L 51/212* (2022.05); *G06F 40/20* (2020.01); *G06Q 10/1097* (2013.01);
(Continued)

(58) Field of Classification Search
None
See application file for complete search history.

(56) References Cited

U.S. PATENT DOCUMENTS 6,411,899 B2  6/2002  Dussell et al.
6,671,682 B1 * 12/2003  Nolte .................. G06F 16/9538
                                                           707/999.005
(Continued)

FOREIGN PATENT DOCUMENTS

WO  2019083975    5/2019
WO  2020238698   12/2020
(Continued)

OTHER PUBLICATIONS

International Preliminary Report on Patentability mailed Mar. 14, 2024 in International Application PCT/US2022/075882.
(Continued)

*Primary Examiner* — Backhean Tiv
(74) *Attorney, Agent, or Firm* — Polsinelli LLP

(57) ABSTRACT

Message filtering and management systems in a chat forward task facilitation communication system are described. One implementation involves receiving one or more pre-filtering inputs from a member, where the inputs include task associations to identify message types to hide or display from a real-time chat interface based on the task associations. A set of messages are processed in real-time using a filtering algorithm to associate one or more tasks with messages of the set of messages, where the one or more tasks correspond to a set of tasks performable by the representative on behalf of the member. A first message is displayed based on the one or more pre-filtering inputs and a first task association with the first message, and a second message is
(Continued)

hidden or not displayed based on the one or more pre-filtering inputs and a second task association with the second message.

20 Claims, 23 Drawing Sheets

Related U.S. Application Data

(60) Provisional application No. 63/240,090, filed on Sep. 2, 2021.

(51) Int. Cl.
*G06Q 10/1093* (2023.01)
*H04L 51/04* (2022.01)
*H04L 51/216* (2022.01)
*H04L 51/224* (2022.01)
*H04L 51/234* (2022.01)

(52) U.S. Cl.
CPC ............ *H04L 51/04* (2013.01); *H04L 51/216* (2022.05); *H04L 51/224* (2022.05); *H04L 51/234* (2022.05)

(56) References Cited

U.S. PATENT DOCUMENTS

| | | | |
|---|---|---|---|
| 7,885,844 B1* | 2/2011 | Cohen | G06Q 10/10 |
| 8,375,320 B2* | 2/2013 | Kotler | G06Q 10/109 |
| | | | 715/764 |
| 8,473,949 B2* | 6/2013 | Horvitz | G06F 9/485 |
| | | | 718/100 |
| 8,485,944 B2 | 7/2013 | Schnackenberg | |
| 9,111,546 B2 | 8/2015 | Mauro et al. | |
| 9,117,199 B2* | 8/2015 | Peters | G06Q 10/101 |
| 10,115,154 B2 | 10/2018 | Lefebvre et al. | |
| 10,229,165 B2* | 3/2019 | Zhu | G06F 9/4843 |
| 10,462,087 B2* | 10/2019 | Desouza Sana | H04L 51/18 |
| 10,528,870 B2* | 1/2020 | Lindsley | G06F 16/90335 |
| 10,614,419 B2* | 4/2020 | Guo | G06Q 10/063116 |
| 10,706,710 B2* | 7/2020 | Choi | G06Q 10/1097 |
| 10,769,826 B2* | 9/2020 | Azmoon | G06T 11/206 |
| 10,791,212 B1 | 9/2020 | Mattox, Jr. et al. | |
| 10,796,225 B2* | 10/2020 | Shazeer | G06F 16/9024 |
| 10,796,255 B2* | 10/2020 | Newhouse | G06Q 10/06316 |
| 11,074,555 B2 | 7/2021 | Shah et al. | |
| 11,095,600 B2* | 8/2021 | Nizar | H04L 51/234 |
| 11,144,854 B1* | 10/2021 | Mouawad | G06Q 10/0639 |
| 11,157,847 B2* | 10/2021 | Abhinav | G06Q 50/01 |
| 11,257,038 B2 | 2/2022 | Toudji et al. | |
| 11,288,608 B2* | 3/2022 | Jafari | G06F 3/0483 |
| 11,379,106 B1 | 7/2022 | Graham et al. | |
| 11,392,395 B2* | 7/2022 | Li | G06F 1/1677 |
| 11,392,896 B2 | 7/2022 | Toudji et al. | |
| 11,416,799 B2* | 8/2022 | Tang | G06F 18/2132 |
| 11,416,817 B2 | 8/2022 | Toudji et al. | |
| 11,457,107 B2* | 9/2022 | Luo | H04L 51/04 |
| 11,537,997 B2 | 12/2022 | Vangala et al. | |
| 11,687,864 B2* | 6/2023 | Tang | H04L 67/535 |
| | | | 709/224 |
| 11,699,194 B2 | 7/2023 | Liu et al. | |
| 11,823,289 B2 | 11/2023 | Liu et al. | |
| 11,853,536 B2 | 12/2023 | Napolitano et al. | |
| 11,888,801 B2* | 1/2024 | Matsuoka | H04L 51/212 |
| 11,907,605 B2 | 2/2024 | Chang et al. | |
| 11,914,848 B2 | 2/2024 | Blatz et al. | |
| 11,941,683 B2* | 3/2024 | Matsuoka | G06Q 30/0631 |
| 11,948,563 B1 | 4/2024 | Liu et al. | |
| 11,962,554 B2 | 4/2024 | Matsuoka et al. | |
| 11,973,894 B2 | 4/2024 | Abdollahian et al. | |
| 12,002,010 B2 | 6/2024 | Toudji et al. | |
| 12,014,118 B2 | 6/2024 | Gruber et al. | |
| 12,087,308 B2 | 9/2024 | Gruber et al. | |
| 2007/0288283 A1* | 12/2007 | Fitzpatrick | G06Q 10/06 |
| | | | 705/7.17 |
| 2008/0091782 A1* | 4/2008 | Jakobson | G06Q 10/10 |
| | | | 709/206 |
| 2009/0157692 A1* | 6/2009 | Reinhardt | G06F 16/164 |
| | | | 707/999.102 |
| 2010/0100632 A1 | 4/2010 | Qureshi et al. | |
| 2010/0174578 A1* | 7/2010 | Duffy | G06Q 10/063112 |
| | | | 705/7.17 |
| 2013/0275983 A1* | 10/2013 | Horvitz | G06F 9/461 |
| | | | 718/100 |
| 2014/0195626 A1 | 7/2014 | Ruff et al. | |
| 2014/0200944 A1* | 7/2014 | Henriksen | G06Q 10/1095 |
| | | | 705/7.19 |
| 2015/0095086 A1 | 4/2015 | Gopinath et al. | |
| 2016/0313877 A1 | 10/2016 | Ha | |
| 2017/0330106 A1* | 11/2017 | Lindsley | G06N 5/043 |
| 2017/0337045 A1 | 11/2017 | Hills et al. | |
| 2017/0357716 A1 | 12/2017 | Bellegarda et al. | |
| 2018/0053121 A1 | 2/2018 | Gonzalez | |
| 2018/0189706 A1* | 7/2018 | Newhouse | G06Q 10/06316 |
| 2018/0322470 A1 | 11/2018 | Ferre et al. | |
| 2018/0375947 A1* | 12/2018 | Hodges | H04W 4/21 |
| 2019/0014070 A1 | 1/2019 | Mertvetsov et al. | |
| 2019/0050786 A1* | 2/2019 | Muser | G06Q 10/063116 |
| 2019/0122526 A1 | 4/2019 | Agnihotri et al. | |
| 2019/0340562 A1* | 11/2019 | Tayal | G06Q 10/06313 |
| 2019/0342252 A1 | 11/2019 | Dascola et al. | |
| 2020/0043087 A1 | 2/2020 | Burris et al. | |
| 2020/0210939 A1* | 7/2020 | Kolodner | G06Q 10/06315 |
| 2020/0311129 A1 | 10/2020 | Miller | H04N 21/472 |
| 2020/0364646 A1* | 11/2020 | Arar | G06Q 10/063112 |
| 2020/0372432 A1* | 11/2020 | Newhouse | G06Q 10/06316 |
| 2021/0019626 A1* | 1/2021 | Shazeer | G06N 3/08 |
| 2021/0176203 A1* | 6/2021 | Nizar | G06F 16/26 |
| 2021/0250311 A1 | 8/2021 | Luo | |
| 2022/0086271 A1* | 3/2022 | Luo | G06F 3/04817 |
| 2022/0165104 A1 | 5/2022 | Gardiner et al. | |
| 2022/0318698 A1* | 10/2022 | Matsuoka | G06Q 10/0633 |
| 2022/0368665 A1 | 11/2022 | Walters | |
| 2023/0012233 A1 | 1/2023 | Luo | |
| 2023/0014775 A1* | 1/2023 | Dotan-Cohen | H04L 51/046 |
| 2023/0022198 A1* | 1/2023 | Matsuoka | G06Q 10/06311 |
| 2023/0036167 A1 | 2/2023 | Yusuf | |
| 2023/0037392 A1* | 2/2023 | Matsuoka | G06Q 10/063116 |
| 2023/0047988 A1* | 2/2023 | Matsuoka | H04L 51/18 |
| 2023/0060753 A1* | 3/2023 | Matsuoka | G06Q 10/063114 |
| 2023/0063334 A1* | 3/2023 | Matsuoka | G06Q 10/06316 |
| 2023/0063603 A1* | 3/2023 | Matsuoka | H04L 51/212 |
| 2023/0064673 A1* | 3/2023 | Matsuoka | G06Q 10/1097 |
| 2023/0065120 A1* | 3/2023 | Hanby, IV | G06Q 10/06311 |
| 2023/0066403 A1* | 3/2023 | Matsuoka | G06F 40/20 |
| 2023/0077130 A1* | 3/2023 | Matsuoka | G06F 9/4831 |
| 2023/0077262 A1* | 3/2023 | Matsuoka | H04L 51/224 |
| 2023/0082188 A1 | 3/2023 | Gobburu et al. | |
| 2023/0085225 A1* | 3/2023 | Matsuoka | G06Q 10/06316 |
| | | | 704/9 |
| 2023/0146336 A1 | 5/2023 | Wang et al. | |
| 2024/0236022 A1 | 7/2024 | Matsuoka et al. | |

FOREIGN PATENT DOCUMENTS

| | | |
|---|---|---|
| WO | 2023034949 A1 | 3/2023 |
| WO | 2023034952 A1 | 3/2023 |

OTHER PUBLICATIONS

International Preliminary Report on Patentability mailed Mar. 18, 2024 in International Application PCT/US2022/075878.
Office Action mailed Apr. 23, 2024 in U.S. Appl. No. 17/929,438.
Suhaili, Sinarwati Mohamad et al., "Service chatbots: A systematic review," Elsevier, Expert Systems with Applications, vol. 184, Dec. 1, 2021.
Office Action mailed Jun. 7, 2024 in U.S. Appl. No. 17/929,332.
International Search Report and Written Opinion mailed Dec. 6, 2022 in International Application PCT/US2022/075882.

(56) References Cited

OTHER PUBLICATIONS

International Search Report and Written Opinion mailed Dec. 16, 2022 in International Application PCT/US2022/075878.
Office Action mailed Apr. 5, 2023 in U.S. Appl. No. 17/929,614.
Office Action mailed May 5, 2023 in U.S. Appl. No. 17/929,336.
Office Action mailed Jun. 8, 2023 in U.S. Appl. No. 17/929,332.
Notice of Allowance mailed Sep. 18, 2023 in U.S. Appl. No. 17/929,614.
Notice of Allowance mailed Dec. 14, 2023 in U.S. Appl. No. 17/929,336.
Office Action mailed Jan. 16, 2024 in U.S. Appl. No. 17/929,332.
Office Action mailed Jul. 31, 2024 in U.S. Appl. No. 17/929,438.
"Lee, Sunhwan et al., ""Making Personalized Recommendation through Conversation: Architecture Design and Recommendation Methods,"" The Workshops of the Thirty-Second AAAI Conference on Artificial Intelligence, 2018, pp. 727-730."
Extended European Search Report mailed Oct. 16, 2024 in European Application 24185819.0.
Notice of Allowance mailed Oct. 25, 2024 in U.S. Appl. No. 18/602,124.
Office Action mailed Nov. 14, 2024 in U.S. Appl. No. 17/929,438.

* cited by examiner

2100

```
┌─────────────────────────────────────────────────────────────────────────┐
│ RECEIVING ONE OR MORE PRE-FILTERING INPUTS FROM A MEMBER, WHEREIN THE   │
│ ONE OR MORE PRE-FILTERING INPUTS INCLUDE TASK ASSOCIATIONS TO IDENTIFY  │
│ A FIRST MESSAGE TYPE TO DISPLAY FROM A REAL-TIME CHAT INTERFACE BASED   │
│ ON THE TASK ASSOCIATIONS, AND A SECOND MESSAGE TYPE TO HIDE BASED ON    │
│ THE TASK ASSOCIATIONS                                                   │
│ 2102                                                                    │
└─────────────────────────────────────────────────────────────────────────┘
                                    │
                                    ▼
┌─────────────────────────────────────────────────────────────────────────┐
│ RECEIVING IN REAL-TIME A SET OF MESSAGES BETWEEN THE MEMBER AND A       │
│ REPRESENTATIVE AS THE SET OF MESSAGES ARE BEING EXCHANGED               │
│ 2104                                                                    │
└─────────────────────────────────────────────────────────────────────────┘
                                    │
                                    ▼
┌─────────────────────────────────────────────────────────────────────────┐
│ PROCESSING THE SET OF MESSAGES IN REAL-TIME USING A FILTERING ALGORITHM │
│ TO ASSOCIATE ONE OR MORE TASKS WITH MESSAGES OF THE SET OF MESSAGES,    │
│ WHEREIN THE ONE OR MORE TASKS CORRESPOND TO A SET OF TASKS PERFORMABLE  │
│ BY THE REPRESENTATIVE ON BEHALF OF THE MEMBER                           │
│ 2106                                                                    │
└─────────────────────────────────────────────────────────────────────────┘
                                    │
                                    ▼
┌─────────────────────────────────────────────────────────────────────────┐
│ DISPLAYING A FIRST MESSAGE OF THE SET OF MESSAGES IN THE REAL-TIME CHAT │
│ INTERFACE BASED ON THE ONE OR MORE PRE-FILTERING INPUTS AND A FIRST     │
│ TASK ASSOCIATION WITH THE FIRST MESSAGE                                 │
│ 2108                                                                    │
└─────────────────────────────────────────────────────────────────────────┘
                                    │
                                    ▼
┌─────────────────────────────────────────────────────────────────────────┐
│ HIDING A SECOND MESSAGE OF THE SET OF MESSAGES IN THE REAL-TIME CHAT    │
│ INTERFACE BASED ON THE ONE OR MORE PRE-FILTERING INPUTS AND A SECOND    │
│ TASK ASSOCIATION WITH THE SECOND MESSAGE                                │
│ 2110                                                                    │
└─────────────────────────────────────────────────────────────────────────┘
```

FIGURE 21

SYSTEMS AND METHODS FOR MESSAGE FILTERING

CROSS-REFERENCE TO RELATED APPLICATIONS

The present application is a continuation of U.S. patent application Ser. No. 17/929,614 filed Sep. 2, 2022, which claims the benefit of U.S. Provisional Application No. 63/240,090 filed Sep. 2, 2021, titled "SYSTEMS AND METHODS FOR DYNAMIC CHAT STREAMS," which are hereby incorporated by reference, in their entireties and for all purposes.

FIELD

The present disclosure relates to systems and methods for generating and curating projects and tasks based on messages exchanged between members and assigned representatives. In various examples example, the systems and methods described herein may be used for dynamic analysis and presentation of messages in a real-time chat stream. In some such examples, dynamic machine learning intelligence can be applied to facilitate identification and creation of tasks, and chat stream presentation of information related to the tasks that may be performed for the benefit of a member using information from the chat streams.

SUMMARY

Disclosed examples provide systems, methods, and other implementations for facilitating task completion using a communication system.

On implementation is a method for filtering messages in a chat stream. The method involves receiving one or more pre-filtering inputs from a member, where the one or more pre-filtering inputs include task associations to identify a first message type to display from a real-time chat interface based on the task associations, and a second message type to hide based on the task associations, receiving in real-time a set of messages between the member and a representative as the set of messages are being exchanged, processing the set of messages in real-time using a filtering algorithm to associate one or more tasks with messages of the set of messages, where the one or more tasks correspond to a set of tasks performable by the representative on behalf of the member, displaying a first message of the set of messages in the real-time chat interface based on the one or more pre-filtering inputs and a first task association with the first message, and hiding a second message of the set of messages in the real-time chat interface based on the one or more pre-filtering inputs and a second task association with the second message.

Some such methods can operate where the one or more tasks are selected from a set of approved project recommendations generated by a task proposal creation sub-system and approved using a task creation sub-system.

Some such methods can operate where the filtering algorithm uses a natural language processing (NLP) system with machine learning to select the one or more tasks.

Some such methods can operate where the displaying the first message and hiding the second message comprises sorting the first message into a first chat flow interface for the first task association, and sorting the second message into a second chat flow interface for the second task association.

Some such methods can operate where the filtering algorithm calculates messaging metrics for each task of the one or more tasks, where the filtering algorithm generates one or more chat flow interfaces for the one or more tasks based on the messaging metrics, and where the filtering algorithm dynamically generates a new chat flow interface for a sub-task of the one or more tasks based on the messaging metrics for the sub-task exceeding a threshold as the first message is displayed in the real-time chat interface.

Some such methods can further involve receiving an updated pre-filtering input, and dynamically adjusting the real-time chat interface to display the second message and one or more additional real-time messages associated with the second task association.

Some such methods can further involve receiving updated pre-filtering inputs as the messages are displayed, and updating displaying of the first message and the second message in real time in response to the updated pre-filtering inputs.

This summary is not intended to identify key or essential features of the claimed subject matter, nor is it intended to be used in isolation to determine the scope of the claimed subject matter. The subject matter should be understood by reference to appropriate portions of the entire specification of this patent application, any or all drawings, and each claim.

The foregoing, together with other examples and features, will be described in more detail below in the following specification, claims, and accompanying drawings.

BRIEF DESCRIPTION OF THE DRAWINGS

FIG. 21 shows a flowchart for a method for managing a dynamic chat flow interface used to facilitate interactions between a service member and a representative in accordance with some embodiments.

Figure 1:
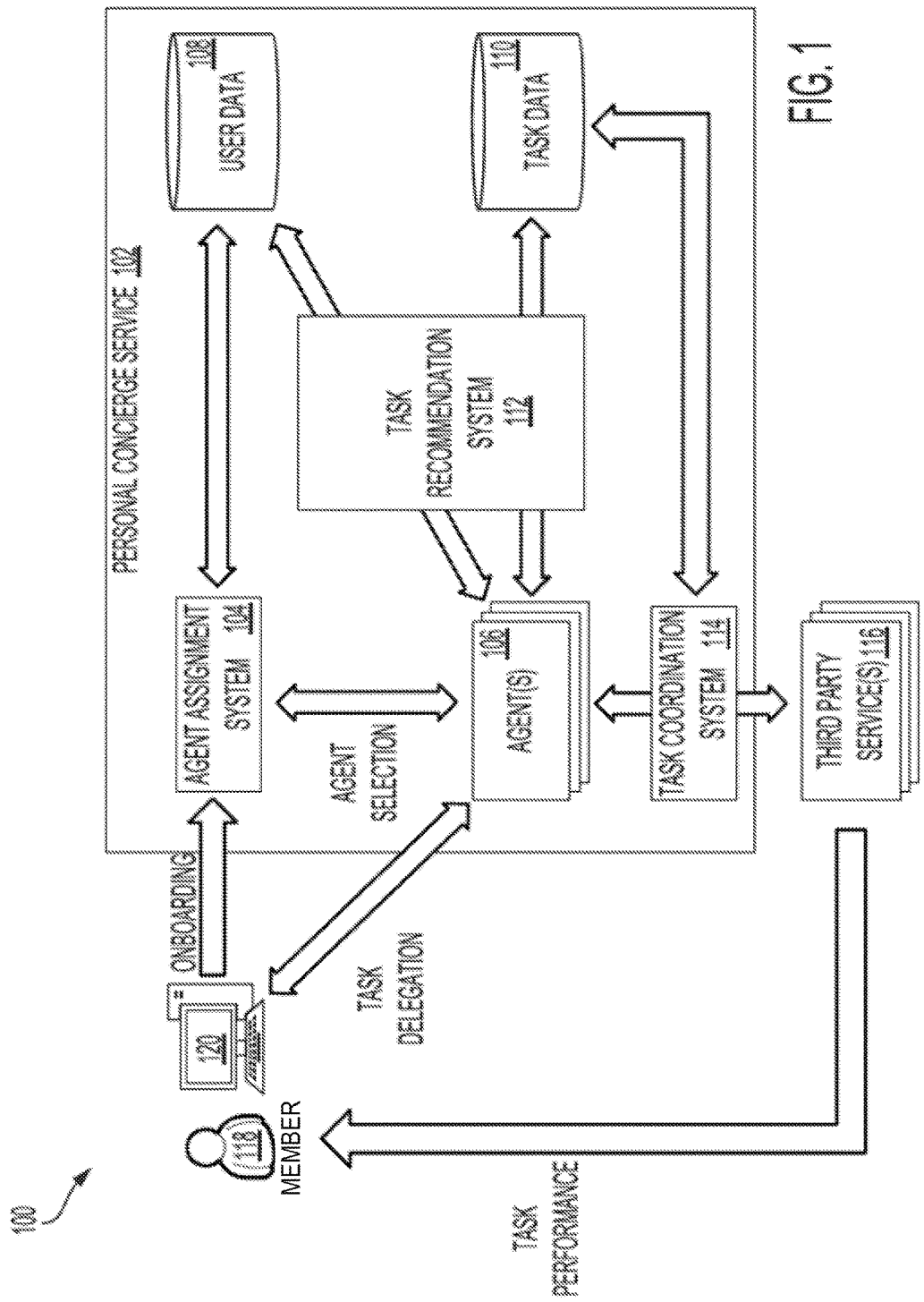
FIG. 1 shows an illustrative example of an environment in which a task facilitation service assigns a representative to a member through which various tasks performable for the benefit of the member can be recommended for performance by one or more third party services in accordance with various embodiments.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Disclosed embodiments describe devices, methods, instructions, and other examples including a chat flow interface used to facilitate interactions between a service member and a representative assigned to the member to perform tasks on behalf of the member. In various embodiments, the chat flow can receive messages prior to tasks being identified and assigned within a system. In some examples, the chat messages can be analyzed using natural language processing (NLP) or machine learning systems to automatically identify and assign tasks. In some examples, the real-time chat flow interface can include both automatic and non-automatic mechanisms for tagging messages with task tags and labels. Such tags can be used for both filtering of messages and alters within the real-time chat flow interface, and for continuous real-time feedback to a dynamic machine learning system used to manage and assign tasks.

As described herein, a task facilitation system can include aspects for proposing projects, managing tasks for accepted projects, automatically identifying and organizing tasks and projects based on communications between a member (e.g., system user) and a representative (e.g., a system operator or task manager). Aspects described herein include task facilitation services with a chat forward interface. Managing large numbers of chat messages between a member and a representative can be time consuming and difficult. Aspects described herein can use descriptions of tasks with system knowledge databases, and various analysis systems (e.g., NLP with task associations, etc.) to match messages with existing or anticipated tasks or subtasks for projects associated with a member.

Filtering systems associated with the message matching then allow the limited user interface space to be optimized with targeted information. Such filtering can include task tag based filtering to limit message display to a particular task or sub-task targeted for review. Such filters can additionally be used to review the appropriateness of tags associated with one or more tasks or subtasks in a system. Automated systems can process filtering metrics to perform operations such as automated generation of new chat flow interfaces when filtering metrics for existing chat flow interfaces exceed a threshold, to automate improvements to interface usability, and to prevent existing interfaces from being flooded. In some implementations, such automated interface adjustments can be managed by machine learning algorithms based on an individual user data set or based on data sets associated with groups of users or systemwide data.

In addition to improving the operation of a system by facilitating interfaces around filterable tasks structures, such tags can improve the operation of a system by limiting the amount of information presented in a user interface, facilitating efficient training of system algorithms around specific tasks or task types with associated reductions in energy usage, memory usage, and processor access time. Such task tagging as described herein can additionally be used to improve the operation of automated systems that identify new tasks or task proposals.

Additional details of various implementations of such systems are described in more detail below.

FIG. 1 shows an illustrative example of an environment 100 in which a task facilitation service 102 assigns a representative 106 to a member 118 through which various tasks performable for the benefit of the member 118 can be recommended for performance by the representative 106 and/or one or more third-party services 116 in accordance with various embodiments. The task facilitation (e.g., personal concierge service) 102 can be integrated with a chat flow interface of device 120 or other devices of member 118 as described below to provide task assistance and performance in a variety of ways. The chat flow integration can include both onboarding via device 120, as well as task delegation, task performance, and automated or non-automated data gathering and machine learning feedback through a chat interface of device 120.

The task facilitation service 102 may be implemented to reduce the cognitive load on members and their families in performing various tasks in and around their homes by identifying and delegating tasks to representatives 106 that may coordinate performance of these tasks for the benefit of these members. In some aspects, a real-time chat interface of one or more devices 120 for the member(s) 118 (e.g., an individual, family, or team group) is a primary interface for communications associated with task generation, task delegation, and status reports regarding task performance. In some embodiments, a member 118, via a computing device 120 (e.g., laptop computer, smartphone, etc.), may submit a request to the task facilitation service 102 to initiate an onboarding process for assignment of a representative 106 to the member 118 and to initiate identification of tasks that are performable for the benefit of the member 118. For instance, the member 118 may access the task facilitation service 102 via an application provided by the task facilitation service 102 and installed onto a computing device 120. Additionally, or alternatively, the task facilitation service 102 may maintain a web server (not shown) that hosts one or more websites configured to present or otherwise make available an interface through which the member 118 may access the task facilitation service 102 and initiate the onboarding process.

During the onboarding process, the task facilitation service 102 may collect identifying information of the member 118, which may be used by a representative assignment system 104 to identify and assign a representative 106 to the member 118. In some aspects, a real-time chat interface can integrate with task facilitation service 102 to harvest information automatically from real-time chat communications by a member 118 associated with a service. In other examples, other interfaces can be used in conjunction with or as a supplement to information gathered via a real-time chat interface. For instance, the task facilitation service 102 may provide, to the member 118, a survey or questionnaire through which the member 118 may provide identifying information usable by the representative assignment system 104 to select a representative 106 for the member 118. Links or interface elements to access the survey can be provided to member 118 via a real-time chat interface that enables a direct link to the survey or associated information from within a chat flow interface. Reminders, prompts for missing or supplemental information, and other such communications can be provided via a real-time chat interface using communications between member 118 via device 120 and service 102. For instance, the task facilitation service 102 may prompt the member 118 to provide detailed information with regard to the composition of the member's family (e.g., number of inhabitants in the member's home, the number of children in the member's home, the number and types of pets in the member's home, etc.), the physical location of the member's home, any special needs or requirements of the member 118 (e.g., physical or emotional disabilities, etc.), and the like using communications initiated by service 102 and presented to member 118 via a real-time chat flow interface of device 120. In some instances, the member 118 may be prompted to provide demographic information (e.g., age, ethnicity, race, languages written/spoken, etc.) or other such information. In some examples, a natural language processing (NLP) service integrated with personal concierge service 102 can process information in a real-time chat flow interface of device 120 for member 118, and initiate requests for information based on triggers or prompts associated with information identified in the chat flow interface that can facilitate existing tasks or potential new tasks for member 118 using assistance from service 102. The member 118 may also be prompted to indicate any personal interests or hobbies that may be used to identify possible experiences that may be of interest to the member 118 (described in greater detail below). In various aspects, such prompts can be initiated as part of an onboarding process, a new task process, an automated task suggestion process, or a prompt to provide information that can assist with an in-process task.

In some embodiments, the task facilitation service 102 can prompt the member 118 to indicate a level or other measure of trust in delegating tasks to others, such as a representative and/or third-party. In some aspects, the prompt can be presented as a message in a chat flow interface, with an option to access a separate interface, or to provide feedback via the chat flow interface. In some aspects, the task facilitation service 102 may utilize the identifying information submitted by the member 118 via a chat flow interface to identify initial categories of tasks that may be relevant to the member's day-to-day life. In some instances, the task facilitation service 102 can utilize a machine learning algorithm or artificial intelligence processing data received via the chat flow interface or via other data collection sources to identify the categories of tasks that may be of relevance to the member 118. For instance, the task facilitation service 102 may implement a clustering algorithm to identify similarly situated members based on one or more vectors (e.g., geographic location, demographic information, likelihood to delegate tasks to others, family composition, home composition, etc.). In some instances, a dataset of input member characteristics corresponding to responses to prompts provided by the task facilitation service 102 provided by sample members (e.g., testers, etc.) may be analyzed using a clustering algorithm to identify different types of members that may interact with the task facilitation service 102. Example clustering algorithms that may trained using sample member datasets (e.g., historical member data, hypothetical member data, etc.) to classify a member in order to identify categories of tasks that may be of relevance to the member may include a k-means clustering algorithms, fuzzy c-means (FCM) algorithms, expectation-maximization (EM) algorithms, hierarchical clustering algorithms, density-based spatial clustering of applications with noise (DBSCAN) algorithms, and the like. Based on the output of the machine learning algorithm generated using the member's identifying information, the task facilitation service 102 may prompt the member 118 to provide responses as to a comfort level in delegating tasks corresponding to the categories of tasks provided by the machine learning algorithm. This may reduce the number of prompts provided to the member 118 and better tailor the prompts to the member's needs.

In some embodiments, the member's identifying information, as well as any information related to the member's level of comfort or interest in delegating different categories of tasks to others, is provided to a representative assignment system 104 of the task facilitation service 102 to identify a representative 106 that may be assigned to the member 118. The representative assignment system 104 may be implemented using a computer system or as an application or other executable code implemented on a computer system of the task facilitation service 102. The representative assignment system 104, in some embodiments, uses the member's identifying information, any information related to the member's level of comfort or interest in delegating tasks to others, and any other information obtained during the onboarding process as input to a classification or clustering algorithm configured to identify representatives that may be well-suited to interact and communicate with the member 118 in a productive manner. For instance, representatives 106 may be profiled based on various criteria, including (but not limited to) demographics and other identifying information, geographic location, experience in handling different categories of tasks, experience in communicating with different categories of members, and the like. Using the classification or clustering algorithm, the representative assignment system 104 may identify a set of representatives 106 that may be more likely to develop a positive, long-term relationship with the member 118 while addressing any tasks that may need to be addressed for the benefit of the member 118.

Once the representative assignment system 104 has identified a set of representatives 106 that may be assigned to the member 118 to serve as an assistant or concierge for the member 118, the representative assignment system 104 may evaluate data corresponding to each representative of the set of representatives 106 to identify a particular representative that can be assigned to the member 118. For instance, the representative assignment system 104 may rank each representative of the set of representatives 106 according to degrees or vectors of similarity between the member's and representative's demographic information. For instance, if a member and a particular representative share a similar background (e.g., attended university in the same city, are from the same hometown, share particular interests, etc.), the representative assignment system 104 may rank the particular representative higher compared to other representatives that may have less similar backgrounds. Similarly, if a member and a particular representative are within geographic proximity to one another, the representative assignment system 104 may rank the particular representative higher compared to other representatives that may be further away from the member 118. Each factor, in some instances, may be weighted based on the impact of the factor on the creation of a positive, long-term relationship between members and representatives. For instance, based on historical data corresponding to member interactions with representatives, the representative assignment system 104 may identify correlations between different factors and the polarities of these interactions (e.g., positive, negative, etc.). Based on these correlations (or lack thereof), the representative assignment system 104 may apply a weight to each factor.

In some instances, each representative of the identified set of representatives 106 may be assigned a score corresponding to the various factors corresponding to the degrees or vectors of similarity between the member's and representative's demographic information. For instance, each factor may have a possible range of scores corresponding to the weight assigned to the factor. As an illustrative example, the various factors used to obtain representative scores may each have a possible score between 1 and 10. However, based on the weight assigned to each factor, the possible score may be multiplied by a weighting factor such that a factor having greater weight may be multiplied by a higher weighting factor compared to a factor having a lesser weight. The result is a set of different scoring ranges corresponding to the importance or relevance of the factor in determining a match between a member 118 and a representative. The scores determined for the various factors may be aggregated to obtain a composite score for each representative of the set of representatives 106. These composite scores may be used to create the ranking of the set of representatives 106.

In some embodiments, the representative assignment system 104 uses the ranking of the set of representatives 106 to select a representative that may be assigned to the member 118. For instance, the representative assignment system 104 may select the highest ranked representative and determine the representative's availability to engage the member 118 in identifying and recommending tasks, coordinating resolution of tasks, and otherwise communicating with the member 118 to assure that their needs are addressed. If the selected representative is unavailable (e.g., the representative is already engaged with one or more other members, etc.), the representative assignment system 104 may select another representative according to the aforementioned ranking and determine the availability of this representative to engage the member 118. This process may be repeated until a representative is identified from the set of representatives 106 that is available to engage the member 118.

In some embodiments, the representative 106 can be an automated process, such as a bot, that may be configured to automatically engage and interact with the member 118 via a chat flow interface. For instance, the representative assignment system 104 may utilize the responses provided by the member 118 during the onboarding process as input to a machine learning algorithm or artificial intelligence to generate a member profile and a bot that may serve as a representative 106 for the member 118. The bot may be configured to autonomously chat with the member 118 to gather supplemental information from member 118, generate tasks and proposals, perform tasks on behalf of the member 118 in accordance with any approved proposals, and the like as described herein. The bot may be configured according to the parameters or characteristics of the member 118 as defined in the member profile. As the bot communicates with the member 118 over time, the bot may be updated to improve the bot's interaction with the member 118. In some aspects, automatic chat communications (e.g., bot based) can be combined with non-automatic chat communications (e.g., human based), such that a chat flow interface can combine presentation to member 118 of both automatic and non-automatic communications from service 102. In some aspects, such communication can be presented in an undistinguished fashion within the chat flow. In other aspects, color or source indicators can be associated with communications in a chat flow interface to identify them as automatic, in addition to other categorizations that can have color, font, size, flag, or other identifying characteristics. For example, an automatic communication can be presented in a first color with text flagging the message as automatic, and a non-automatic communication can be presented in a different color with text associating the message with a particular human representative. In some aspects, automatic messages can identify a particular function, task, or other grouping associated with a particular bot. Messages from human representatives can similarly include identifying information or distinguishing characteristics for a certain task or task type, to provide instant context information to member 118 prior to the member 118 understanding or providing detailed focus to message specifics. Additionally, as described herein, any such categorization can be used for searching or filtering with in a chat flow interface in some implementations.

Data associated with the member 118 collected during the onboarding process, as well as any data corresponding to the selected representative, may be stored in a user datastore 108. The user datastore 108 may include an entry corresponding to each member 118 of the task facilitation service 102. The entry may include identifying information of the corresponding member 118, as well as an identifier or other information corresponding to the representative assigned to the member 118. As described in greater detail herein, an entry in the user datastore 108 may further include historical data corresponding to communications between the member 118 and the assigned representative made over time. For instance, as a member 118 interacts with a representative 106 over a chat session or stream, messages exchanged over the chat session or stream may be recorded in the user datastore 108.

In some embodiments, once the representative assignment system 104 has assigned a particular representative to the member 118, the representative assignment system 104 notifies the member 118 and the particular representative of the pairing. Further, the representative assignment system 104 may establish a chat session or other communications session between the member 118 and the assigned representative to facilitate communications between the member 118 and representative. For instance, via an application provided by the task facilitation service 102 and installed on the computing device 120, the member 118 may exchange messages with the assigned representative over the chat session or other communication session. Similarly, the representative may be provided with an interface through which the representative may exchange messages with the member 118.

In some instances, the member 118 may initiate or otherwise resume a chat session with an assigned representative. For example, via the application provided by the task facilitation service 102, the member may transmit a message to the representative over the chat session or other communication session to communicate with the representative. The member 118 can submit a message to the representative to indicate that the member 118 would like assistance with a particular task. As an illustrative example, the member 118 can submit a message to the representative to indicate that the member 118 would like the representative's assistance with regard to an upcoming move in the coming months. The representative, via an interface provided by the task facilitation service 102, may be presented with the submitted message. Accordingly, the representative may evaluate the message and generate a corresponding task that is to be performed to assist the member 118. For instance, the representative, via the interface provided by the task facilitation service 102, may access a task generation form, through which the representative may provide information related to the task. The information may include information related to the member 118 (e.g., member name, member address, etc.) as well as various parameters of the task itself (e.g., allocated budget, timeframe for completion of the task, and the like). The parameters of the task may further include any member preferences (e.g., preferred brands, preferred third-party services 116, etc.).

In some embodiments, the representative can provide the information obtained from the member 118 for the task specified in the one or more messages exchanged between the member 118 and representative to a task recommendation system 112 of the task facilitation service 102 to dynamically, and in real-time, identify any additional task parameters that may be required for generating one or more proposals for completion of the task. The task recommendation system 112 may be implemented using a computer system or as an application or other executable code implemented on a computer system of the task facilitation service 102. The task recommendation system 112, in some embodiments, provides the representative with an interface through which the representative may generate a task that may be presented to the member over the chat session (e.g., via the application utilized by the member 118, etc.) and that may be completed by the representative and/or one or more third-party services 116 for the benefit of the member 118. For instance, the representative may provide a name for the task, any known parameters of the task as provided by the member (e.g., budgets, timeframes, task operations to be performed, etc.), and the like. As an illustrative example, if the member 118 transmits the message "Hey Russell, can you help with our move in 2 months," the representative may evaluate the message and generate a task entitled "Move to new home." For this task, the representative may indicate that the timeframe for completion of the task is two months, as indicated by the member 118. Further, the representative may add additional information known to the representative about the member. For example, the representative may indicate any preferred moving companies, any budgetary constraints, and the like.

In some embodiments, the representative can provide the generated task to the task recommendation system 112 to determine whether additional member input is needed for creation of a proposal that may be presented to the member for completion of the task. The task recommendation system 112, for instance, may process the generated task and information corresponding to the member 118 from the user datastore 108 using a machine learning algorithm or artificial intelligence to automatically identify additional parameters for the task, as well as any additional information that may be required from the member 118 for the generation of proposals. For instance, the task recommendation system 112 may use the generated task, information corresponding to the member 118, and historical data corresponding to tasks performed for other similarly situated members as input to the machine learning algorithm or artificial intelligence to identify any additional parameters that may be automatically completed for the task and any additional information that may be required of the member 118 for defining the task. For example, if the task is related to an upcoming move to another city, the task recommendation system 112 may utilize the machine learning algorithm or artificial intelligence to identify similarly situated members (e.g., members within the same geographic area of member 118, members having similar task delegation sensibilities, members having performed similar tasks, etc.). Based on the task generated for the member 118, characteristics of the member 118 from the user datastore 108 and data corresponding to these similarly situated members, the task recommendation system 112 may provide additional parameters for the task. As an illustrative example, for the aforementioned task, "Move to New home," the task recommendation system 112 may provide a recommended budget for the task, one or more moving companies that the member 118 may approve of (as used by other similarly situated members with positive feedback), and the like. The representative may review these additional parameters and select one or more of these parameters for inclusion in the task.

If the task recommendation system 112 determines that additional member input is required for the task, the task recommendation system 112 may provide the representative with recommendations for questions that may be presented to the member 118 regarding the task. Returning to the "Move to New home" task example, if the task recommendation system 112 determines that it is important to understand one or more parameters of the member's home (e.g., square footage, number of rooms, etc.) for the task, the task recommendation system 112 may provide a recommendation to the representative to prompt the member 118 to provide these one or more parameters. The representative may review the recommendations provided by the task recommendation system 112 and, via the chat session, prompt the member 118 to provide the additional task parameters. This process may reduce the number of prompts provided to the member 118 in order to define a particular task, thereby reducing the cognitive load on the member 118. In some instances, rather than providing the representative with recommendations for questions that may be presented to the member 118 regarding the task, the task recommendation system 112 can automatically present these questions to the member 118 via the chat session. For instance, if the task recommendation system 112 determines that a question related to the square footage of the member's home is required for the task, the task recommendation system 112 may automatically prompt the member 118, via the chat session, to provide the square footage for the member's home.

In some embodiments, once the representative has obtained the necessary task-related information from the member 118 and/or through the task recommendation system 112 (e.g., task parameters garnered via evaluation of tasks performed for similarly situated members, etc.), the representative can utilize a task coordination system 114 of the task facilitation service 102 to generate one or more proposals for resolution of the task. The task coordination system 114 may be implemented using a computer system or as an application or other executable code implemented on a computer system of the task facilitation service 102. In some examples, the representative may utilize a resource library maintained by the task coordination system 114 to identify one or more third-party services 116 and/or resources (e.g., retailers, restaurants, websites, brands, types of goods, particular goods, etc.) that may be used for performance the task for the benefit of the member 118 according to the one or more task parameters identified by the representative and the task recommendation system 112, as described above. A proposal may specify a timeframe for completion of the task, identification of any third-party services 116 (if any) that are to be engaged for completion of the task, a budget estimate for completion of the task, resources or types of resources to be used for completion of the task, and the like. The representative may present the proposal to the member 118 via the chat session to solicit a response from the member 118 to either proceed with the proposal or to provide an alternative proposal for completion of the task.

In some embodiments, the task recommendation system 112 can provide the representative with a recommendation as to whether the representative should provide the member 118 with a proposal or instead provide the member with an option to defer to the representative with regard to completion of the defined task. For instance, in addition to providing member and task-related information to the task recommendation system 112 to identify additional parameters for the task, the representative may indicate its recommendation to the task recommendation system 112 to either present the member 118 with one or more proposals for completion of the task or to present the member 118 with an option to defer to the representative for completion of the task. The task recommendation system 112 may utilize the machine learning algorithm or artificial intelligence to generate the aforementioned recommendation. The task recommendation system 112 may utilize the information provided by the representative, as well as data for similarly situated members from the user datastore 108 and task data corresponding to similar tasks from a task datastore 110 (e.g., tasks having similar parameters to the submitted task, tasks performed on behalf of similarly situated members, etc.), to determine whether to recommend presentation of one or more proposals for completion of the task or to present the member 118 with an option to defer to the representative for completion of the task.

If the representative determines that the member is to be presented with an option to defer to the representative for completion of the task, the representative may present this option to the member over the chat session. The option may be presented in the form of a button or other graphical user interface (GUI) element that the member may select to indicate its approval of the option. In some aspects, such a GUI element can be presented in a chat flow interface, or in any other such interface. For example, the member may be presented with a button or similar functionality to provide the member with an option to defer all decisions related to performance of the task to the representative. If the member 118 selects the option, the representative may forego generation of a proposal for the member 118 and instead proceeds to coordinate with one or more third-party services 116 for performance and completion of the task. Any actions taken by the representative on behalf of the member 118 for completion of the task may be recorded in an entry corresponding to the task in the task datastore 110. Alternatively, if the member 118 rejects the option and instead indicates that the representative is to provide one or more proposals for completion of the task, the representative may generate one or more proposals, as described above.

The task recommendation system 112, in some embodiments, records the member's reaction to being presented with an option to defer to the representative for completion of a task for use in training the machine learning algorithm or artificial intelligence used to make recommendations to the representative for presentation of the option. For instance, if the representative opted to present the option to the member 118, the task recommendation system 112 may record whether the member 118 selected the option or declined the offer and requested presentation of proposals related to the task. Similarly, if the representative opted to present one or more proposals instead of presenting the option to defer to the representative, the task recommendation system 112 may record whether the member 118 was satisfied with the presentation of these one or more proposals or requested that the representative select a proposal on the member's behalf, thus deferring to the representative for completion of the task. These member reactions, along with data corresponding to the task, the representative's actions (e.g., presentation of the option, presentation of proposals, etc.), and the recommendation provided by the task recommendation system 112 may be stored in the task datastore 110 for use by the task recommendation system 112 in training and/or reinforcing the machine learning algorithm or artificial intelligence.

In some embodiments, the representative can suggest one or more tasks based on member characteristics, task history, and other factors. For instance, as the member 118 communicates with the representative over the chat session, the representative may evaluate any messages from the member 118 to identify any tasks that may be performed to reduce the member's cognitive load. As an illustrative example, if the member 118 indicates, over the chat session, that its spouse's birthday is coming up, the representative may utilize its knowledge of the member 118 to develop one or more tasks that may be recommended to the member 118 in anticipation of its spouse's birthday. The representative may recommend tasks such as purchasing a cake, ordering flowers, setting up a unique travel experience for the member 118, and the like. In some embodiments, the representative can generate task suggestions without member input. For instance, as part of the onboarding process, the member 118 may provide the task facilitation service 102 with access to one or more member resources, such as the member's calendar, the member's Internet-of-Things (IoT) devices, the member's personal fitness devices (e.g., fitness trackers, exercise equipment having communication capabilities, etc.), the member's vehicle data, and the like. Data collected from these member resources may be monitored by the representative, which may parse the data to generate task suggestions for the member 118.

In some embodiments, the data collected from a member 118 over a chat session with the representative may be evaluated by the task recommendation system 112 to identify one or more tasks that may be presented to the member 118 for completion. For instance, the task recommendation system 112 may utilize natural language processing (NLP) or other artificial intelligence to evaluate received messages or other communications from the member 118 to identify possible tasks that may be recommended to the member 118. For instance, the task recommendation system 112 may process any incoming messages from the member 118 using NLP or other artificial intelligence to detect a new task or other issue that the member 118 would like to have resolved. In some instances, the task recommendation system 112 may utilize historical task data and corresponding messages from the task datastore 110 to train the NLP or other artificial intelligence to identify possible tasks. If the task recommendation system 112 identifies one or more possible tasks that may be recommended to the member 118, the task recommendation system 112 may present these possible tasks to the representative, which may select tasks that can be shared with the member 118 over the chat session.

In some embodiments, the task recommendation system 112 can utilize computer vision or other artificial intelligence to process images or video recordings provided by the member 118 to identify potential tasks that may be recommended to the member 118 for completion. For instance, the representative may prompt the member 118 to record images or video during a walkthrough of the member's home to identify potential tasks that may be completed for the benefit of the member 118. As an illustrative example, the member 118 may use a mobile device (e.g., smartphone, digital video recorder, etc.) to record digital images or video related to a damaged baseboard that is in need of repair. These digital images or video may be processed by the task recommendation system 112 in real-time to detect the damaged baseboard, identify the possible scope of repairs required to the baseboard, and possible tasks that may be performed to repair the damaged baseboard. Additionally, while the digital images or video may be related to the damaged baseboard, the task recommendation system 112 may further process the digital images or video to identify additional and/or alternative issues for which tasks may be recommended. For example, if the task recommendation system 112 detects that, in addition to a damaged baseboard, the member 118 may be experiencing a termite issue within the baseboard, the task recommendation system 112 may recommend a task corresponding to extermination of the detected termites. Thus, the task recommendation system 112, using computer vision or other artificial intelligence, may detect possible issues that the member 118 may not be aware of.

In some embodiments, the task recommendation system 112 can generate a list of possible tasks that may be presented to the member 118 for completion to reduce the member's cognitive load. For instance, based on an evaluation of data collected from different member sources (e.g., IoT devices, personal fitness or biometric devices, video and audio recordings, etc.), the task recommendation system 112 may identify an initial set of tasks that may be completed for the benefit of the member 118. Additionally, the task recommendation system 112 can identify additional and/or alternative tasks based on external factors. For example, the task recommendation system 112 can identify seasonal tasks based on the member's geographic location (e.g., foliage collection, gutter cleaning, etc.). As another example, the task recommendation system 112 may identify tasks performed for the benefit of other members within the member's geographic region and/or that are otherwise similarly situated (e.g., share one or more characteristics with the member 118). For instance, if various members within the member's neighborhood are having their gutters cleaned or driveways sealed for winter, the task recommendation system 112 may determine that these tasks may be performed for the benefit of the member 118 and may be appealing to the member 118 for completion.

In some embodiments, the task recommendation system 112 can use the initial set of tasks, member-specific data from the user datastore 108 (e.g., characteristics, demographics, location, historical responses to recommendations and proposals, etc.), data corresponding to similarly-situated members from the user datastore 108, and historical data corresponding to tasks previously performed for the benefit of the member 118 and the other similarly-situated members from the task datastore 110 as input to a machine learning algorithm or artificial intelligence to identify a set of tasks that may be recommended to the member 118 for performance. For instance, while an initial set of tasks may include a task related to gutter cleaning, based on the member's preferences, the member 118 may prefer to perform this task itself. As such, the output of the machine learning algorithm or artificial intelligence (e.g., the set of tasks that may be recommended to the member 118) may omit this task. Further, in addition to the set of tasks that may be recommended to the member 118, the output of the machine learning algorithm or artificial intelligence may specify, for each identified task, a recommendation for presentation of the button or other GUI element that the member 118 may select to indicate that it would like to defer to the representative for performance of the task, as described above.

A listing of the set of tasks that may be recommended to the member 118 may be provided to the representative for a final determination as to which tasks may be presented to the member 118 via the chat session. In some embodiments, the task recommendation system 112 can rank the listing of the set of tasks based on a likelihood of the member 118 selecting the task for delegation to the representative for performance and/or coordination with third-party services 116. Alternatively, the task recommendation system 112 may rank the listing of the set of tasks based on the level of urgency for completion of each task. The level of urgency may be determined based on member characteristics (e.g., data corresponding to a member's own prioritization of certain tasks or categories of tasks) and/or potential risks to the member 118 if the task is not performed. For example, a task corresponding to replacement or installation of carbon monoxide detectors within the member's home may be ranked higher than a task corresponding to the replacement of a refrigerator water dispenser filter, as carbon monoxide filters may be more critical to member safety. As another illustrative example, if a member 118 places significant importance on the maintenance of their vehicle, the task recommendation system 112 may rank a task related to vehicle maintenance higher than a task related to other types of maintenance. As yet another illustrative example, the task recommendation system 112 may rank a task related to an upcoming birthday higher than a task that can be completed after the upcoming birthday.

The representative may review the set of tasks recommended by the task recommendation system 112 and select one or more of these tasks for presentation to the member 118 via the chat session. Further, as described above, the representative may determine whether a task is to be presented with an option to defer to the representative for performance of the task (e.g., with a button or other GUI element to indicate the member's preference to defer to the representative for performance of the task). In some instances, the one or more tasks may be presented to the member 118 according to the ranking generated by the task recommendation system 112. Alternatively, the one or more tasks may be presented according to the representative's understanding of the member's own preferences for task prioritization. Through an interface associated with the chat session, the member 118 may select one or more tasks that may be performed with the assistance of the representative. The member 118 may alternatively dismiss any presented tasks that the member 118 would rather perform personally or that the member 118 does not otherwise want performed.

In some embodiments, the task recommendation system 112 can automatically select one or more of the tasks for presentation to the member 118 via the chat session without representative interaction. For instance, the task recommendation system 112 may utilize a machine learning algorithm or artificial intelligence to select which tasks from the listing of the set of tasks previously ranked by the task recommendation system 112. As an illustrative example, the task recommendation system 112 may use the member's profile (which can include historical data corresponding to member-representative communications, member feedback corresponding to representative performance and presented tasks/proposals, etc.), from the user datastore 108, tasks currently in progress for the member 118, and the listing of the set of tasks as input to the machine learning algorithm or artificial intelligence. The output generated by the machine learning algorithm or artificial intelligence may indicate which tasks of the listing of the set of tasks are to be presented automatically to the member 118 via the interface associated with the chat session. As the member 118 interacts with these newly presented tasks, the task recommendation system 112 may record these interactions and use these interactions to further train the machine learning algorithm or artificial intelligence to better determine which tasks to present to member 118 and other similarly-situated members.

In some embodiments, the task recommendation system 112 can monitor the chat session between the member 118 and the representative to collect data with regard to member selection of tasks for delegation to the representative for performance. For instance, the task recommendation system 112 may process messages corresponding to tasks presented to the member 118 by the representative over the chat session to determine a polarity or sentiment corresponding to each task. For instance, if a member 118 indicates, in a message to the representative, that it would prefer not to receive any task recommendations corresponding to vehicle maintenance, the task recommendation system 112 may ascribe a negative polarity or sentiment to tasks corresponding to vehicle maintenance. Alternatively, if a member 118 selects a task related to gutter cleaning for delegation to the representative and/or indicates in a message to the representative that recommendation of this task was a great idea, the task recommendation system 112 may ascribe a positive polarity or sentiment to this task. In some embodiments, the task recommendation system 112 can use these responses to tasks recommended to the member 118 to further train or reinforce the machine learning algorithm or artificial intelligence utilized to generate task recommendations that can be presented to the member 118 and other similarly situated members of the task facilitation service 102.

In some embodiments, in addition to recommending tasks that may be performed for the benefit of the member 118, a representative may recommend one or more curated experiences that may be appealing to the member 118 to take their mind off of urgent matters and to spend more time on themselves and their families. As noted above, during an onboarding process, a member 118 may be prompted to indicate any of its interests or hobbies that the member 118 finds enjoyable. Further, as the representative continues its interactions with the member 118 over the chat session, the representative may prompt the member 118 to provide additional information regarding its interests in a natural way. For instance, a representative may ask the member 118 "what will you be doing this weekend?" Based on the member response, the representative may update the member's profile to indicate the member's preferences. Thus, over time, the representative and the task facilitation service 102 may develop a deeper understanding of the member's interests and hobbies.

In some embodiments, the task facilitation service 102 generates, in each geographic market in which the task facilitation service 102 operates, a set of experiences that may be available to members. For instance, the task facilitation service 102 may partner with various organizations within each geographic market to identify unique and/or time-limited experience opportunities that may be of interest to members of the task facilitation service. Additionally, for experiences that may not require curation (e.g., hikes, walks, etc.), the task facilitation service 102 may identify popular experiences within each geographic market that may be appealing to its members. The information collected by the task facilitation service 102 may be stored in a resource library or other repository accessible to the task recommendation system 112 and the various representatives 106.

In some embodiments, for each available experience, the task facilitation service 102 can generate a template that includes both the information required from a member 118 to plan the experience on behalf of the member 118 and a skeleton of what the proposal for the experience recommendation will look like when presented to the member 118. This may make it easier for a representative to complete definition of task(s) associated with the experience. In some instances, the template may incorporate data from various sources that provide high-quality recommendations, such as travel guides, food and restaurant guides, reputable publications, and the like.

In some embodiments, the task recommendation system 112, periodically (e.g., monthly, bi-monthly, etc.) or in response to a triggering event (e.g., a set number of tasks are performed, member request, etc.), selects a set of experiences that may be recommended to the member 118. For instance, similar to the identification of tasks that may be recommended to the member 118, the task recommendation system 112 may use at least the set of available experiences and the member's preferences from the user datastore 108 as input to a machine learning algorithm or artificial intelligence to obtain, as output, a set of experiences that may be recommended to the member 118. The task recommendation system 112, in some instances, may present this set of experiences to the member 118 over the chat session on behalf of the representative. Each experience recommendation may specify a description of the experience and any associated costs that may be incurred by the member 118. Further, for each experience recommendation presented, the task recommendation system 112 may provide a button or other GUI element that may be selectable by the member 118 to request curation of the experience for the member 118.

If the member 118 selects a particular experience recommendation corresponding to an experience that the member 118 would like to have curated on its behalf, the task recommendation system 112 or representative may generate one or more new tasks related to the curation of the selected experience recommendation. For instance, if the member 118 selects an experience recommendation related to a weekend picnic, the task recommendation system 112 or representative may add a new task to the member's tasks list such that the member 118 may evaluate the progress in completion of the task. Further, the representative may ask the member 118 particularized questions related to the selected experience to assist the representative in determining a proposal for completion of tasks associated with the selected experience. For example, if the member 118 selects an experience recommendation related to the curation of a weekend picnic, the representative may ask the member 118 as to how many adults and children will be attending, as this information may guide the representative in curating the weekend picnic for all parties and to identify appropriate third-party services 116 and possible venues for the weekend picnic.

Similar to the process described above for the completion of a task for the benefit of a member 118, the representative can generate one or more proposals for curation of a selected experience. For instance, the representative may generate a proposal that provides, amongst other things, a list of days/times for the experience, a list of possible venues for the experience (e.g., parks, movie theaters, hiking trails, etc.), a list of possible meal options and corresponding prices, options for delivery or pick-up of meals, and the like. The various options in a proposal may be presented to the member 118 over the chat session and via the application provided by the task facilitation service 102. Based on the member responses to the various options presented in the proposal, representative may indicate that it is starting the curation process for the experience. Further, the representative may provide information related to the experience that may be relevant to the member 118. For example, if the member 118 has selected an option to pick-up food from a selected restaurant for a weekend picnic, the representative may provide detailed driving directions from the member's home to the restaurant to pick up the food (this would not be presented if the member 118 had selected a delivery option), detailed driving directions from the restaurant to the selected venue, parking information, a listing of the food that is to be ordered, and the total price of the food order. The member 118 may review this proposal and may determine whether to accept the proposal. If the member 118 accepts the proposal, the representative may proceed to perform various tasks to curate the selected experience.

Once a member 118 has selected a particular proposal for a particular task, or has selected a button or other GUI element associated with the particular task to indicate that it wishes to defer to the representative for performance of the task, if the task is to be completed using third-party services 116, the representative may coordinate with one or more third-party services 116 for completion of the task for the benefit of the member 118. For instance, the representative may utilize a task coordination system 114 of the task facilitation service 102 to identify and contact one or more third-party services 116 for performance of a task. As noted above, the task coordination system 114 may include a resource library that includes detailed information related to third-party services 116. For example, an entry for a third-party service in the resource library may include contact information for the third-party service, any available price sheets for services or goods offered by the third-party service, listings of goods and/or services offered by the third-party service, hours of operation, ratings or scores according to different categories of members, and the like. The representative may query the resource library to identify the one or more third-party services that are to perform the task and determine an estimated cost for performance of the task. Further, the representative may contact the one or more third-party services 116 to coordinate performance of the task for the benefit of the member 118.

In some instances, if the task is to be completed by the representative 106, the representative 106 may utilize the task coordination system 115 of the task facilitation service 102 to identify any resources that may be utilized by the representative 106 for performance of the task. The resource library may include detailed information related to different resources available for performance of a task. As an illustrative example, if the representative 106 is tasked with purchasing a set of filters for the member's home, the representative 106 may query the resource library to identify a retailer that may sell filters of a quality and/or price that is acceptable to the member 118 and that corresponds to the proposal accepted by the member 118. Further, the representative 106 may obtain, from the user datastore 108, available payment information of the member 118 that may be used to provide payment for any resources required by the representative 106 to complete the task. Using the aforementioned example, the representative 106 may obtain payment information of the member 118 from the user datastore 108 to complete a purchase with the retailer for the set of filters that are to be used in the member's home.

In some embodiments, the task coordination system 114 uses a machine learning algorithm or artificial intelligence to select one or more third-party services 116 and/or resources on behalf of the representative for performance of a task. For instance, the task coordination system 114 may utilize the selected proposal or parameters related to the task (e.g., if the member 118 has deferred to the representative for determination of how the task is to be performed), as well as historical task data from the task datastore 110 corresponding to similar tasks as input to the machine learning algorithm or artificial intelligence. The machine learning algorithm or artificial intelligence may produce, as output, a listing of one or more third-party services 116 that may perform the task with a high probability of satisfaction to the member 118. If the task is to be performed by the representative 106, the machine learning algorithm or artificial intelligence may produce, as output, a listing of resources (e.g., retailers, restaurants, brands, etc.) that may be used by the representative 106 for performance of the task with a high probability of satisfaction to the member 118. As noted above, the resource library may include, for each third-party service 116, a rating or score associated with the satisfaction with the third-party service 116 as determined by members of the task facilitation service 102. Further, the resource library may include a rating or score associated with the satisfaction with each resource (e.g., retailers, restaurants, brands, goods, materials, etc.) as determined by members of the task facilitation service 102. For example, when a task is completed, the representative may prompt the member 118 to provide a rating or score with regard to the performance of a third-party service in completing a task for the benefit of the member 118. As another example, if the task is performed by the representative 106, the representative may prompt the member 118 to provide a rating or score with regard to the representative's performance and to the resources utilized by the representative for completion of the task. Each rating or score is associated with the member that provided the rating or score, such that the task coordination system 114 may determine, using the machine learning algorithm or artificial intelligence, a likelihood of satisfaction for performance of a task based on the performance of the third-party service or of the satisfaction with the resources utilized by representatives with regard to similar tasks for similarly-situated members. The task coordination system 114 may generate a listing of recommended third-party services 116 and/or resources for performance of a task, whereby the listing may be ranked according to the likelihood of satisfaction (e.g., score or other metric) assigned to each identified third-party service and/or resource.

If the representative is able to coordinate with one or more third-party services 116 for performance of the task (e.g., schedule a time for performance of the task, agree upon a price for performance of the task, etc.), the representative may provide an update to the member 118 to indicate when the task is expected to be completed and the estimated cost for completion of the task. If any of the information provided in the update does not correspond to the estimates provided in the proposal, the member 118 may be provided with an option to cancel the particular task or otherwise make changes to the task. For instance, if the estimated cost for performance of the task exceeds the maximum amount specified in the proposal, the member 118 may ask the representative to find an alternative third-party service for performance of the task within the budget specified in the proposal. Similarly, if the timeframe for completion of the task is not within the timeframe indicated in the proposal, the member 118 can ask the representative to find an alternative third-party service for performance of the task within the original timeframe. The member's interventions may be recorded by the task recommendation system 112 and the task coordination system 114 to retrain their corresponding machine learning algorithms or artificial intelligence to define more accurate proposal parameters for the member 118 and to better identify third-party services 116 that may perform tasks within the defined proposal parameters, respectively.

In some embodiments, once the representative has contracted with one or more third-party services 116 for performance of a task, the task coordination system 114 may monitor performance of the task by these third-party services 116. For instance, the task coordination system 114 may record any information provided by the third-party services 116 with regard to the timeframe for performance of the task, the cost associated with performance of the task, any status updates with regard to performance of the task, and the like. The task coordination system 114 may associate this information with the data record in the task datastore 110 corresponding to the task being performed. Status updates provided by third-party services 116 may be provided automatically to the member 118 via the application provided by the task facilitation service 102 and to the representative.

In some embodiments, if the task is to be performed by the representative 106, the task coordination system 114 can monitor performance of the task by the representative 106. For instance, the task coordination system 114 may monitor, in real-time, any communications between the representative 106 and the member 118 regarding the representative's performance of the task. These communications may include messages from the representative 106 indicating any status updates with regard to performance of the task, any purchases or expenses incurred by the representative 106 in performing the task, the timeframe for completion of the task, and the like. The task coordination system 114 may associate these messages from the representative 106 with the data record in the task datastore 110 corresponding to the task being performed.

In some instances, the representative may automatically provide payment for the services and/or goods provided by the one or more third-party services 116 on behalf of the member 118 or for purchases made by the representative for completion of a task. For instance, during an onboarding process, the member 118 may provide payment information (e.g., credit card numbers and associated information, debit card numbers and associated information, banking information, etc.) that may be used by a representative to provide payment to third-party services 116 or for purchases to be made by the representative 106 for the benefit of the member 118. Thus, the member 118 may not be required to provide any payment information to allow the representative 106 and/or third-party services 116 to initiate performance of the task for the benefit of the member 118. This may further reduce the cognitive load on the member 118 to manage performance of a task.

As noted above, once a task has been completed, the member 118 may be prompted to provide feedback with regard to completion of the task. Just as with any other information or message described herein, such a prompt can be communicated from service 102 to device 120 and presented to member 118 within a chat flow interface. For instance, the member 118 may be receive a notification of a task milestone or task completion via device 120 from service 102. The notification can be presented in a chat flow interface, with a prompt to confirm completion of the milestone, and to provide feedback with regard to the performance and professionalism of the selected third-party services 116 in performance of the task. Further, the member 118 may be prompted to provide feedback with regard to the quality of the proposal provided by the representative and as to whether the performance of the task has addressed the underlying issue associated with the task. Using the responses provided by the member 118, the task facilitation service 102 may train or otherwise update the machine learning algorithms or artificial intelligence utilized by the task recommendation system 112 and the task coordination system 114 to provide better identification of tasks, creation of proposals, identification of third-party services 116 for completion of tasks for the benefit of the member 118 and other similarly-situated members, identification of resources that may be provided to the representative 106 for performance of a task for the benefit of the member 118, and the like.

It should be noted that for the processes described herein, various operations performed by the representative 106 may be additionally, or alternatively, performed using one or more machine learning algorithms or artificial intelligence. For example, as the representative 106 performs or otherwise coordinates performance of tasks on behalf of a member 118 over time, the task facilitation service 102 may continuously and automatically update the member's profile according to member feedback related to the performance of these tasks by the representative 106 and/or third-party services 116. In some embodiments, the task recommendation system 112, after a member's profile has been updated over a period of time (e.g., six months, a year, etc.) or over a set of tasks (e.g., twenty tasks, thirty tasks, etc.), may utilize a machine learning algorithm or artificial intelligence to automatically and dynamically generate new tasks based on the various attributes of the member's profile (e.g., historical data corresponding to member-representative communications, member feedback corresponding to representative performance and presented tasks/proposals, etc.) with or without representative interaction. The task recommendation system 112 may automatically communicate with the member 118 to obtain any additional information required for new tasks and automatically generate proposals that may be presented to the member 118 for performance of these tasks. The representative 106 may monitor communications between the task recommendation system 112 and the member 118 to ensure that the conversation maintains a positive polarity (e.g., the member 118 is satisfied with its interaction with the task recommendation system 112 or other bot, etc.). If the representative 106 determines that the conversation has a negative polarity (e.g., the member 118 is expressing frustration, the task recommendation system 112 or bot is unable to process the member's responses or asks, etc.), the representative 106 may intervene in the conversation. This may allow the representative 106 to address any member concerns and perform any tasks on behalf of the member 118.

Thus, unlike automated customer service systems and environments, wherein these systems and environment may have little to no knowledge of the users interacting with agents or other automated systems, the task recommendation system 112 can continuously update the member profile to provide up-to-date historical information about the member 118 based on the member's automatic interaction with the system or interaction with the representative 106 and on the tasks performed on behalf of the member 118 over time. This historical information, which may be automatically and dynamically updated as the member 118 or the system interacts with the representative 106 and as tasks are devised, proposed, and performed for the member 118 over time, may be used by the task recommendation system 112 to anticipate, identify, and present appropriate or intelligent responses to member 118 queries, needs, and/or goals.

Figure 2:
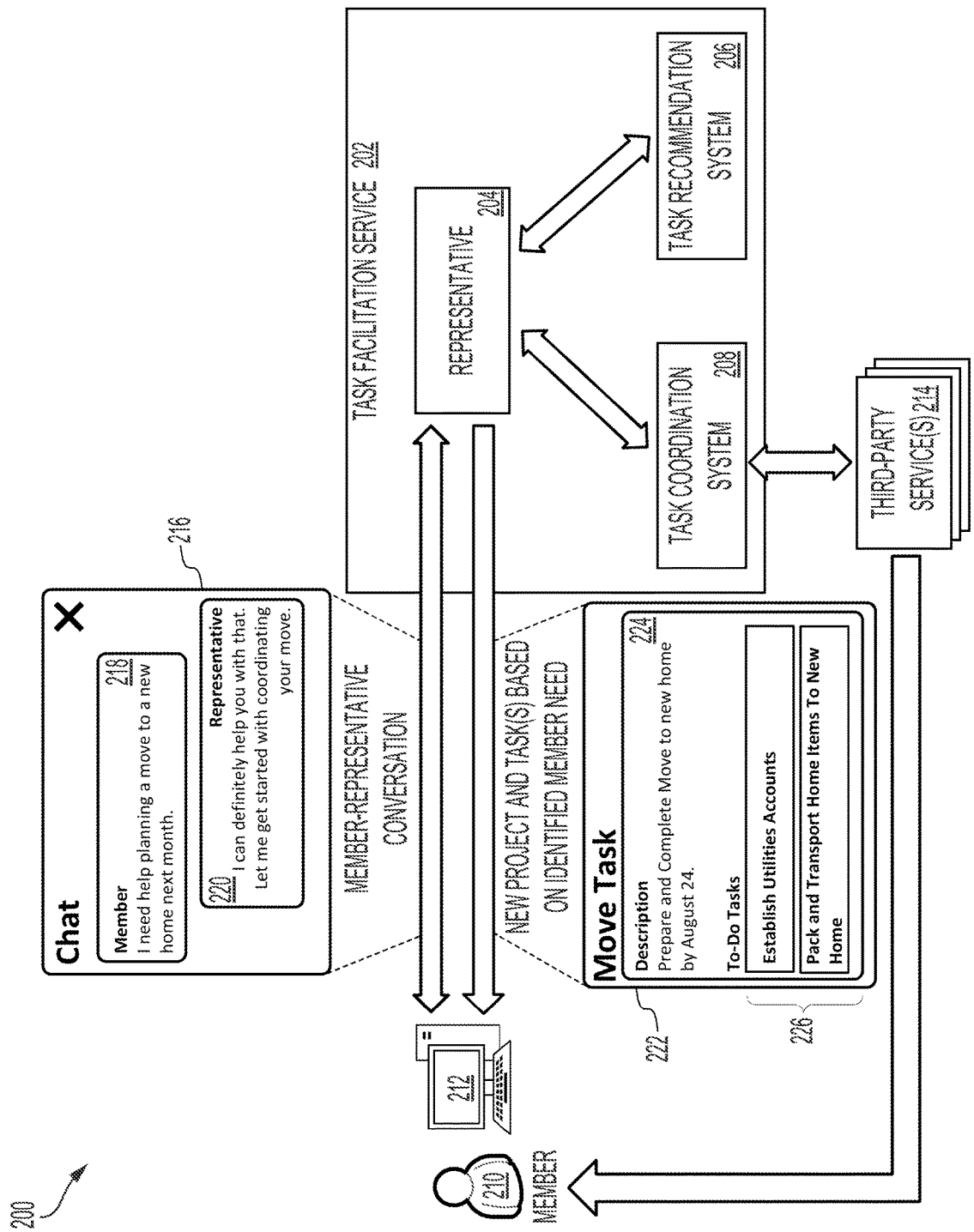
FIG. 2 shows an illustrative example of an environment in which a project and corresponding tasks are generated and provided by a task facilitation service in accordance with at least one embodiment.

FIG. 2 shows an illustrative example of an environment 200 including a chat flow interface in which a project 224 and corresponding tasks 226 are generated and provided by a task facilitation service 202 in accordance with at least one embodiment. In the environment 200, a member 210 of the task facilitation service 202 may be engaged in a communication session with messages of the communication session presented in chat flow interfaces for communication session 216. The communication session represented in interfaces for communication session 216 and task interface 222 are between member 210 using device 212 to display the interfaces for session 216 with an assigned representative 204. The member 210, through the communications session, may transmit one or more messages 218 to the representative 204 to indicate that the member 210 requires assistance in completing a project and/or task for the benefit of the member 210 using the chat flow interface(s) for communication session 216. For example, as illustrated in FIG. 2, the member 210 may indicate that a request for the representative 204's assistance in planning a move to a new city in the next month. The representative 204, in response to these one or more messages 218 may indicate, via one or more messages 220, that the representative may be able to assist the member 210 in completing the particular project and/or task through various methods available to the representative 204 and/or implemented by the task facilitation service 202, as described herein.

The task facilitation service 202 may be implemented to reduce the cognitive load on members and their families in performing various tasks in and around their homes by identifying and delegating tasks to representatives that may coordinate performance of these tasks for the benefit of these members. A member, such as member 210, may be paired with a representative 204 during an onboarding process, through which the task facilitation service 202 may collect identifying information of the member 210. For instance, as described above, an interface or element of the chat flow provided by the task facilitation service 202 may present, to the member 210, a survey or questionnaire through which the member 210 may provide identifying information usable to select a representative 204 for the member 210. The task facilitation service 202 may prompt the member 210, via an element presented in the chat flow interfaces, to provide detailed information with regard the task, such as a number of inhabitants in the member's home, the number of children in the member's home, the number and types of pets in the member's home, etc.), the physical location of the member's home, any special needs or requirements of the member 210 (e.g., physical or emotional disabilities, demographic information, or any other information related to one or more tasks that the member 210 wishes to possibly delegate to a representative 204. This information may specify the nature of these tasks (e.g., gutter cleaning, installation of carbon monoxide detectors, party planning, etc.), a level of urgency for completion of these tasks (e.g., timing requirements, deadlines, date corresponding to upcoming events, etc.), any member preferences for completion of these tasks, and the like.

The collected identifying information may be used by the task facilitation service 202 to identify and assign a representative 204 to the member 210. For instance, the task facilitation service 202 may use the identifying information of a member 210, as well as any information related to the member's level of comfort or interest in delegating tasks to others, and any other information obtained during the onboarding process as input to a classification or clustering algorithm configured to identify representatives that may be well-suited to interact and communicate with the member 210 in a productive manner. Using the classification or clustering algorithm, the task facilitation service 202 may identify a representative 204 that may be more likely to develop a positive, long-term relationship with the member 210 while addressing any tasks that may need to be addressed for the benefit of the member 210.

The representative 204 may be an individual that is assigned to the member 210 according to degrees or vectors of similarity between the member's and representative's demographic information. For instance, if the member 210 and the representative 204 share a similar background (e.g., attended university in the same city, are from the same hometown, share particular interests, etc.), the task facilitation service 202 may be more likely to assign the representative 204 to the member 210. Similarly, if the member 210 and the representative 204 are within geographic proximity to one another, the task facilitation service 202 may be more likely to assign the representative 204 to the member 210. Just as above, in some embodiments, the representative 204 can be an automated process, such as a bot, that may be configured to automatically and dynamically engage and interact with the member 210 (e.g., to interact with member 210 without human intervention involved in representative 204 operations). Such automatic interactions can be dynamically performed in conjunction with real-time feedback to a machine learning algorithm that manages aspects of an automatic representative 204. In other examples, representative 204 is associated with individual operations performed non-automatically using human interaction to initiate, modify, and or generate communications and operations associated with representative 204. When a representative 204 is assigned to the member 210 by the task facilitation service 202, the task facilitation service 202 may notify the member 210 and the representative 204 of the pairing. Further, the task facilitation service 202 may establish a chat session or other communications session between the member 210 and the assigned representative 204 to facilitate communications between the member 210 and the representative 204.

In some embodiments, the representative 204 can suggest one or more tasks based on details from messages in a real-time chat flow, task flags associated with such messages, member characteristics, task history, and other factors. For instance, as the member 210 communicates with the representative 204 over the communications session 216, the representative 204 may evaluate any messages from the member 210 provided via a real-time chat flow to identify any tasks that may be performed to reduce the member's cognitive load.

In some embodiments, the task facilitation service 202, via a task recommendation system 206, can monitor the communications session 216 associated with a chat flow between the member 210 and the representative 204 in real-time and as messages are exchanged to identify any projects and/or tasks that the member 210 may wish to have performed by the representative 204 and/or one or more third-party services 214 for the member's benefit. The task recommendation system 206 may be implemented using a computer system or as an application or other executable code implemented on a computer system of the task facilitation service 202. In some embodiments, the task recommendation system 206 utilizes a machine learning algorithm with NLP, or other artificial intelligence to process these messages exchanged between the member 210 and the representative 204 over the communications session 216 to identify possible projects and/or tasks that may be recommended to the member 210. For instance, the task recommendation system 206 may process any incoming messages 218 from the member 210 using NLP or other artificial intelligence to detect a new project and/or task that the member 210 would like to have resolved or otherwise performed for the benefit of the member 210. The task recommendation system 206 can then generate alerts, task recommendations for new tasks to be added to a member 210 or representative 204 system, or initiate other such actions including placing data in the chat flow associated with analysis of real-time chat flow messages as well as other context information (e.g., data from one or more member resources, such as the member's calendar, the member's Internet-of-Things (IOT) devices, the member's personal fitness devices including fitness trackers and exercise equipment having communication capabilities, the member's vehicle data, data from time and task management software, to-do lists, and the like).

Data from the chat flows and other resources associated with a member can be used with dynamic automated decision making and feedback systems. Such a machine learning algorithm or other artificial intelligence may be trained using supervised training techniques. For instance, a dataset of input messages and corresponding projects and tasks (and corresponding parameters) can be selected for training of the machine learning algorithm or other artificial intelligence. The machine learning algorithm or artificial intelligence may be evaluated to determine, based on the sample inputs supplied to the machine learning algorithm or artificial intelligence, whether the machine learning algorithm or artificial intelligence is accurately identifying projects and tasks based on the supplied messages. Based on this evaluation, the machine learning algorithm or artificial intelligence may be modified to increase the likelihood of the machine learning algorithm or artificial intelligence to accurate identify projects and/or tasks corresponding to the sample messages provided as input. The machine learning algorithm or artificial intelligence may further be dynamically trained by soliciting feedback from members and representatives of the task facilitation service 202 with regard to the identification of projects and tasks based on communications sessions between these members and representatives. For instance, if the task recommendation system 206 determines that the machine learning algorithm or artificial intelligence has failed to identify projects and/or tasks that a member 210 would have liked to have completed to address an issue, the task recommendation system 206 may use this feedback, along with the corresponding messages submitted by the member 210 identifying the issue from which the project or task should have been created, to retrain the machine learning algorithm or artificial intelligence to better identify projects and/or tasks based on similar messages from members of the task facilitation service 202.

In some embodiments, if the task recommendation system 206 identifies one or more projects and/or tasks that may be performed for the benefit of the member 210, the task recommendation system 206 can present these one or more projects and/or tasks to the representative 204 via a representative console provided to the representative 204 by the task facilitation service 202. The representative 204, based on its knowledge of the member 210, may select any of the identified one or more projects and/or tasks for presentation to the member 210. In some instances, if the representative 204 selects any of the identified one or more projects and/or tasks, the task recommendation system 206 may provide, via the representative console, one or more task templates that may be used to further define the selected projects and/or tasks. The one or more task templates may correspond to the task type or category for the projects and/or tasks being defined.

The representative 204, via a task template for a particular project or task, may define various parameters associated with the new project or task that is to be presented and performed for the benefit of the member 210. For instance, via a task template, the representative 204 may define an assignment of the task (e.g., to the representative 204, to a third-party service 214, to the member 210, etc.). In some instances, the task recommendation system 206 may use a machine learning algorithm or artificial intelligence to identify which data fields are to be presented in the task template to the representative 204 for creation of a new task or project. For example, the task recommendation system 206 may use, as input to the machine learning algorithm or artificial intelligence, a member profile associated with the member 210 and the selected task template for the new project or task. The task recommendation system 206 may indicate which data fields may be omitted from the task when presented to the member 210. Thus, the representative 204 may be required to provide all necessary information for a new task or project regardless of whether all information is presented to the member 210 or not.

As described above, in some embodiments, the task recommendation system 206 can automatically generate a project and/or task without need for the representative 204 to interact with a corresponding task template to further define the project and/or task. For instance, the task recommendation system 206 can use the member's messages 218, member-specific data (e.g., characteristics, demographics, location, historical responses to recommendations and proposals, etc.), data corresponding to similarly-situated members, and historical data corresponding to tasks previously performed for the benefit of the member 210 and the other similarly-situated members as input to a machine learning algorithm or artificial intelligence to generate a new project and/or task that may be recommended to the member 210. For instance, if the member 210 has indicated, via the communications session 216 with the representative 204, that the member 210 needs assistance with repairing their gutters, the task recommendation system 206 can use the messages 218 corresponding to this request for assistance, as well as the other aforementioned data, as input to the machine learning algorithm or artificial intelligence to generate a new task for the member 210 corresponding to the needed repair.

The machine learning algorithm or artificial intelligence used to automatically generate new projects and/or tasks for members of the task facilitation service 202 may be trained using supervised training techniques. For instance, a dataset of input messages, corresponding member profiles of the provider of the messages and of similarly-situated members, and historical data corresponding to previously performed tasks/projects can be selected for training of the machine learning algorithm or other artificial intelligence. The machine learning algorithm or artificial intelligence may be evaluated to determine, based on the sample inputs supplied to the machine learning algorithm or artificial intelligence, whether the machine learning algorithm or artificial intelligence is accurately identifying and generating projects and tasks based on the supplied messages and identification of similarly-situated members. Based on this evaluation, the machine learning algorithm or artificial intelligence may be modified to increase the likelihood of the machine learning algorithm or artificial intelligence to accurate identify and generate projects and/or tasks corresponding to the provided input. The machine learning algorithm or artificial intelligence may further be dynamically trained by soliciting feedback from members and representatives of the task facilitation service 202 with regard to the identification and automatic generation of projects and tasks based on communications sessions between these members and representatives, as described above.

In some instances, the task recommendation system 206, utilizing the machine learning algorithm or artificial intelligence may identify similar tasks performed for other members of the task facilitation service 202 that may be used to generate the new task for the member 210. Using the aforementioned example of a member request for assistance with repairing their gutters, the task recommendation system 206 may identify any previously performed tasks for members within the member's 210 geographic area (e.g., same neighborhood, same city, same state, etc.) related to gutter repairs. Further, the task recommendation system 206 may evaluate member profiles of such members within the member's 210 geographic area to identify any similarly-situated members (e.g., members with similar preferences, members with similar characteristics, etc.). If the task recommendation system 206 identifies similar tasks previously performed for similarly-situated members of the task facilitation service 202, the task recommendation system 206 may utilize these similar tasks to automatically generate a new task for the member 210. For example, the task recommendation system 206, for the new task, may use a similar task description, select the same or similar third-party services 214 for performance of the task, provide an estimated budget for completion of the task, define a priority for the task, assign an estimated deadline or time for completion of the task, and the like.

In some embodiments, if the task recommendation system 206 automatically generates one or more new projects and/or tasks for the member 210 based on the messages 218 submitted by the member 210 over the communications session 216, the task recommendation system 206 provides the one or more new projects and/or tasks to the representative 204 to allow the representative 204 to evaluate the one or more new projects and/or tasks and determine which projects and/or tasks to present to the member 210. For instance, a listing of the one or more projects and/or tasks that may be recommended to the member 210 may be provided to the representative 204 for a final determination as to which projects and/or tasks may be presented to the member 210 via the communications session 216 and/or through a project interface 222 provided to the member 210. In some embodiments, the task recommendation system 206 can rank the new projects and/or tasks based on a likelihood of the member 210 selecting the project and/or task for delegation to the representative 204 for performance and/or coordination with third-party services 214. Alternatively, the task recommendation system 206 may rank the projects and/or tasks based on the level of urgency for completion of each project and/or task. The level of urgency may be determined based on member characteristics (e.g., data corresponding to a member's own prioritization of certain tasks or categories of tasks) and/or potential risks to the member 210 if the project and/or task is not performed.

In some embodiments, the task recommendation system 206 can automatically determine whether additional information is required from the member 210 for the creation of a new project or task. For instance, the task recommendation system 206 may process the generated project and/or task and information corresponding to the member 210 using a machine learning algorithm or artificial intelligence to automatically identify additional parameters for the task, as well as any additional information that may be required from the member 210 for the generation of proposals. For instance, the task recommendation system 206 may use the generated project or task, information corresponding to the member 210, and historical data corresponding to projects and/or tasks performed for other similarly-situated members as input to the machine learning algorithm or artificial intelligence to identify any additional information that may be required of the member 210 for defining the project and/or task. If the task recommendation system 206 determines that additional member input is required for the project or task, the task recommendation system 206 may provide the representative 204 with recommendations for questions that may be presented to the member 210 regarding the project or task. Returning to the "Move to New home" project 224 example discussed above with respect to FIG. 1, if the task recommendation system 206 determines that it is important to understand one or more parameters of the member's home (e.g., square footage, number of rooms, etc.) for the project, the task recommendation system 206 may provide a recommendation to the representative 204 to prompt the member 210 to provide these one or more parameters. The representative 204 may review the recommendations provided by the task recommendation system 206 and, via the communications session 216, prompt the member 210 to provide the additional project parameters. This process may reduce the number of prompts provided to the member 210 in order to define a particular project or task, thereby reducing the cognitive load on the member 210. In some instances, rather than providing the representative with recommendations for questions that may be presented to the member 210 regarding the project or task, the task recommendation system 206 can automatically present these questions to the member 210 via the communications session 216. For instance, if the task recommendation system 206 determines that a question related to the square footage of the member's home is required for the project 224, the task recommendation system 206 may automatically prompt the member 210, via the communications session 216, to provide the square footage for the member's home.

In some embodiments, the task recommendation system 206 can further provide the representative 204 with recommendations for questions that may be presented to the member 210 regarding the project or task based on the member's preferences. For example, if the member 210 is known to be budget conscious, and the representative 204 and/or the task recommendation system 206 has not defined any budgets or budget restrictions for the task or project, the task recommendation system 206 may prompt the representative 204 to communicate with the member 210 via the communications session 216 to inquire about the member's budget for completion of the project or task. In some embodiments, the task recommendation system 206 can use a machine learning algorithm or artificial intelligence to determine what questions may be provided to the member 210. For instance, the task recommendation system 206 may use the parameters defined for the new project or task, the member's profile, and historical data corresponding to projects and/or tasks previously performed for the benefit of the member 210 as input to the machine learning algorithm or artificial intelligence to determine the member's preferences and to identify questions that may be provided to the member 210 based on these preferences to further define the parameters of the new project or task.

In some embodiments, once the representative 204 has obtained the necessary task and/or project-related information from the member 210 and/or through the task recommendation system 206 (e.g., task parameters garnered via evaluation of tasks performed for similarly situated members, etc.), the representative can utilize a task coordination system 208 of the task facilitation service 202 to generate one or more proposals for resolution of the project and/or task. The task coordination system 208 may be implemented using a computer system or as an application or other executable code implemented on a computer system of the task facilitation service 202. In some examples, the representative 204 may utilize a resource library maintained by the task coordination system 208 to identify one or more third-party services 214 and/or resources (e.g., retailers, restaurants, websites, brands, types of goods, particular goods, etc.) that may be used for performance of the project and/or task for the benefit of the member 210 according to the one or more parameters identified by the representative 204 and the task recommendation system 206, as described above. A proposal may specify a timeframe for completion of the project and/or task, identification of any third-party services 214 (if any) that are to be engaged for completion of the project and/or task, a budget estimate for completion of the project and/or task, resources or types of resources to be used for completion of the project and/or task, and the like. The representative 204 may present the proposal to the member 210 via the communications session 216 to solicit a response from the member 210 to either proceed with the proposal or to provide an alternative proposal for completion of the project and/or task.

Once a member 210 has selected a particular proposal option for a particular project or task, the new project and any corresponding tasks are presented to the member 210 via a project interface 222, through which the member 210 can review the project 224 corresponding to the stated issue and the tasks 226 corresponding to the selected proposal option from the proposal for the particular project 224. Through the project interface 222, the member 210 may review a description of the project 224 that is to be performed for the benefit of the member 210, as well as details regarding the corresponding tasks 226 that are to be performed in order to complete the project 224. For example, as illustrated in FIG. 2, the representative 204 or the task recommendation system 206 may update the project interface 222 to present the new project 224 related to the member's upcoming move to New home and one or more tasks 226 corresponding to the project 224. The number of tasks 226 presented via the project interface 222 and the details provided for these tasks 226 and the project 224 itself may be determined based on the member's preferences or attributes specified in the member's profile. For instance, the amount of detail provided and the number of tasks 226 presented may be determined such that the member 210 is adequately informed with regard to the project 224 and corresponding tasks 226 while considering the member's cognitive load (e.g., the presentation of information does not add stress to the member 210, thereby maintaining the member's cognitive load). For each aspect, communications between member 210 via device 212 or another member device can occur between human and automated representatives, with both automatic and non-automatic analysis and responses occurring at various points to facilitate task progress and completion.

If the representative 204 is able to coordinate with one or more third-party services 214 such as third party services described with respect to FIG. 1 (e.g., for performance of the project or task such as operations to schedule a time for performance of the project or task, agree upon a price for performance of the project or task, etc.), the representative 204 may update the project interface 222 to indicate when the project 224 and any associated tasks 226 are expected to be completed and the estimated cost for completion of the project 224 and the associated tasks 226. Certain project interface 222 updates can also trigger automatic chat interface of the communication session 216 updates, such as notifications of milestones for a task, completion updates (e.g., percentage completion updates, next step timing updates, etc.). Certain aspects of planning interface 222, such as reminders to a member 210 that additional information or decision information (e.g., associated with alternative decisions that can impact task completion) are needed from member 210 for task progress.

In some embodiments, if the task is to be performed by the representative 204, the task coordination system 208 can monitor performance of the project or task by the representative 204. Once a task or the corresponding project has been completed, the member 210 may be prompted to provide feedback with regard to completion of the project or task. Using the responses provided by the member 210, the task facilitation service 202 may train or otherwise update the machine learning algorithms or artificial intelligence utilized by the task recommendation system 206 and the task coordination system 208 to provide better identification of projects and tasks, creation of proposals and corresponding proposal options, identification of third-party services 214 for completion of projects and tasks for the benefit of the member 210 and other similarly-situated members, identification of resources that may be provided to the representative 204 for performance of a project or task for the benefit of the member 210, and the like.

Figure 3:
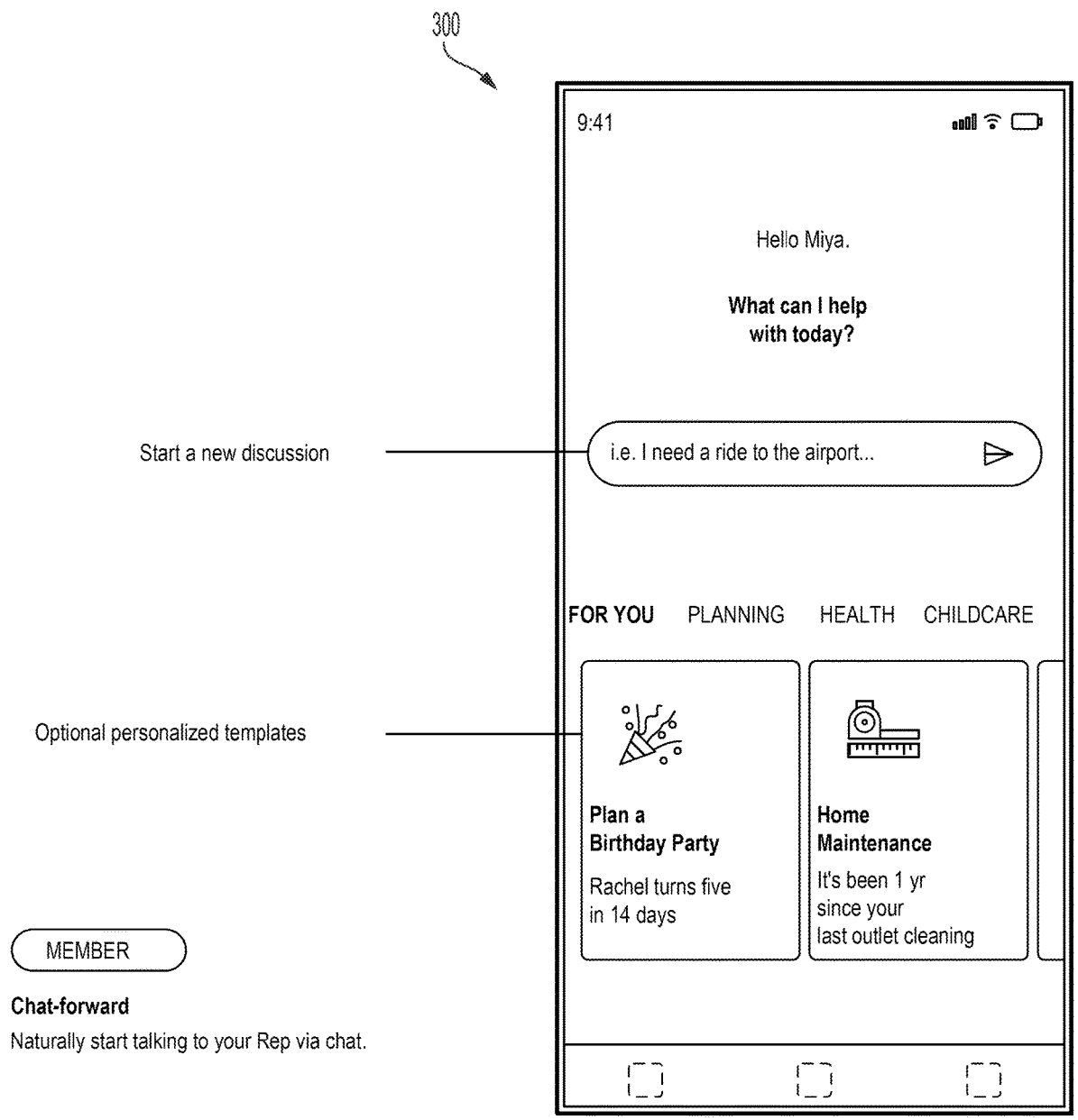
FIG. 3 illustrates aspect of a chat stream interface in accordance with at least one embodiment.

FIG. 3 illustrates an example chat flow interface 300 in accordance with some examples. Chat flow interface 300 can, for example, be presented on a device 120 or 212 presented to a member as part of an interaction with a task facilitation service 102 or 202. Interface 300 illustrates a chat interface for initiating a new task with a representative, with template elements for initiating specific tasks, and a text interface for customized communications. The interface 300 can be part of an onboarding operation for new tasks, or an interface used as a landing position prior to checking on existing tasks for an onboarded member. The template elements can launch additional chat flow interfaces with specially designed information gathering representatives or interfaces as part of a chat flow for organizing a new tasks, or can lead to additional interfaces for existing tasks. For example, a selection and corresponding communication associated with a birthday party template interface can be received by a task facilitation service 202, which responds with communications from an automated representative to gather information about a birthday, and tasks the member will generate for the birthday. The automated representative can determine whether the member will be hosting the party, or attending a party hosted by another person, details associated with the party, and tasks, subtasks, deadlines, communications with other attendees, or other items to be part of party related tasks. Selection of the template can also generate a task specific chat interface for the task, or a task flag that can be used in a general real-time chat interface to indicate communications in the real-time chat flow associated with the birthday party task.

In another example, the home maintenance interface template can be associated with reminders from a previous task. For example, a completed home maintenance task can end with a reminder for a future related maintenance task. The template for the reminder task can be surfaced in an interface 300 close to or at the reminder deadline associated with the previous task.

A discussion or text input interface can be part of interface 300 for general or customized initiation of interactions not sufficiently related to templates presented in interface 300. The new discussion interface can be used to receive text or voice inputs from a member to initiate a new task, or check on the status of ongoing tasks. The new discussion interface can, in some aspects, be part of a chat forward home interface, with previous real-time chat flow interfaces accessible from the new discussion interface. In some aspects, the birthday party template can retrieve information, and then begin both automatic and non-automatic messaging in a real-time chat flow interface between human and non-human representatives to help with planning the birthday party. The message details can be part of a chat flow that can be accessed by entering a message to review party planning details in the new discussion interface from the home page.

In some aspects, interface 300 has a default structure to interact with a representative assigned to a member, such as a human representative "Miya", an automated NLP based representative, or a hybrid representative when a human representative is supported by an automated representative or automated assistant. In some aspects, the representative can modify or update templates and template categories presented to a specific member. For example, an automated representative can access a member's calendar and add a birthday party template when a family member's birthday is a target or threshold time from a current time. Similarly, a home maintenance template can be automatically presented at an anniversary or reminder time. Such selections can also, in some aspects, be made manually by a human representative based on chat messaging with a member, or based on review of member data aggregated from different sources, including a member calendar, representative notes, machine learning analysis of data with selectable options presented to a human representative, or other such options. Similarly template categories, home page customizations, and other such chat flow interface 300 elements can be managed automatically or manually by representatives based on system information in different implementations.

Figure 4:
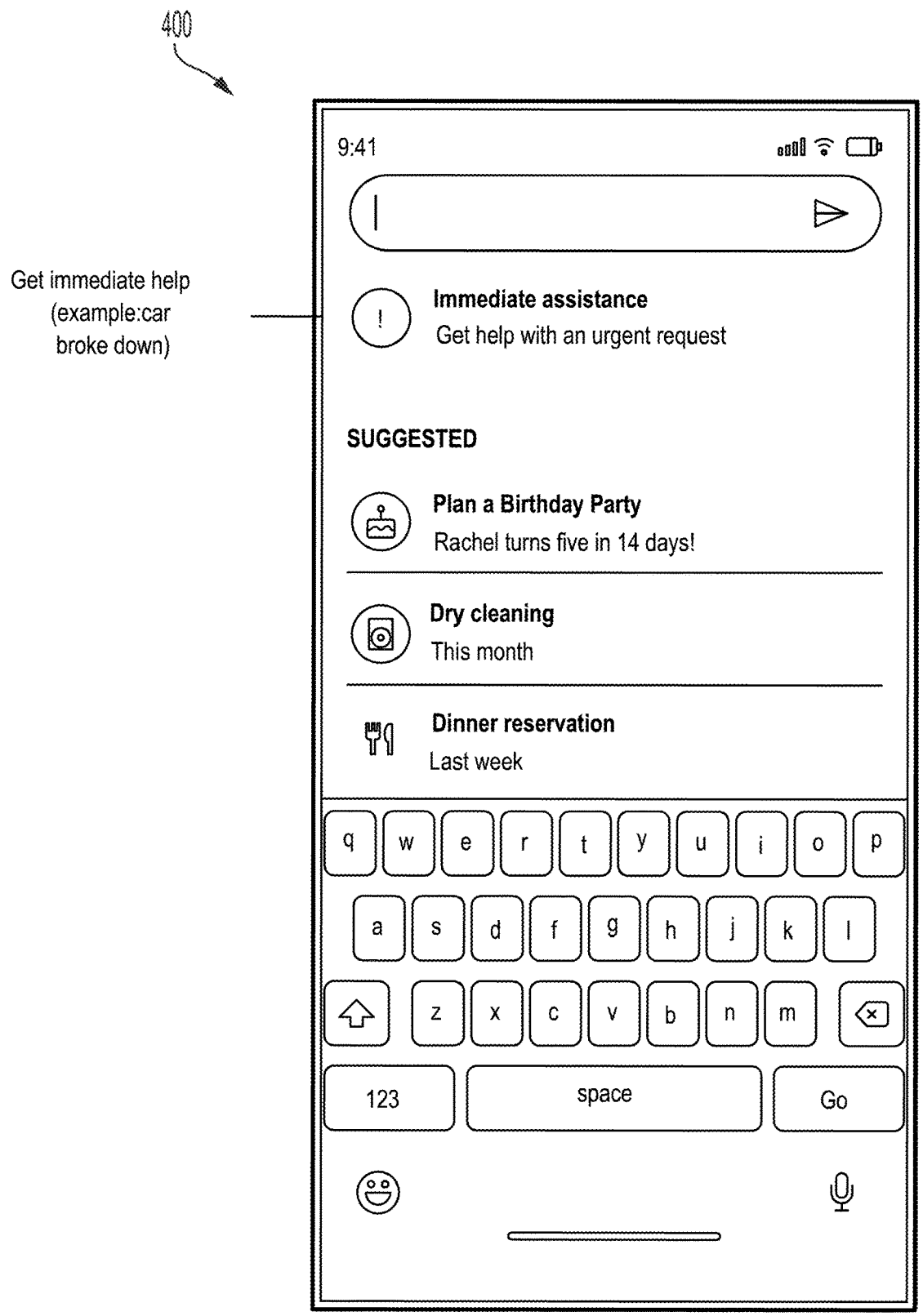
FIG. 4 illustrates aspect of a chat stream interface in accordance with at least one embodiment.

FIG. 4 illustrates an example interface 400 that can be used in some aspects of implementations described herein. Interface 400 can be, in some aspects, an interface presented upon selection of a text input element for a new discussion in interface 300. The interface 400 includes both a text keyboard interface for inputting data (e.g., via a touchscreen), as well as additional interface elements. The interface 400 includes an urgent request button, that can be associated with a priority request to interact with a human representative, or to initiating a data gathering automated representative customized for urgent requests, and to alert a task facilitation service 202 that priority communications for an urgent request will be provided soon by a member. The interface 400 also includes a separate set of suggested templates. In some aspects, these can be the same suggested templates from interface 300, or can be a mix of suggestions, most recent or most repeated requests, or any other such priority. For example, if a member regularly requests dinner reservation assistance, a template associated with making dinner reservations can be presented with the keyboard interface. In some aspects, machine learning systems can analyze member selections, both for an individual member, and for other members, to predict the most useful interface elements or templates to present in interface 300 and 400. Selection of interface elements can be used as feedback data to update selection of such elements. In some aspects, the feedback system can be integrated as part of an automated representative of task facilitation service 202, which can automatically select and update the presentation of such templates in the chat flow interface 400 of a member's device, as well as initiate chat communications with the member to request information about the members template preferences.

Figure 5:
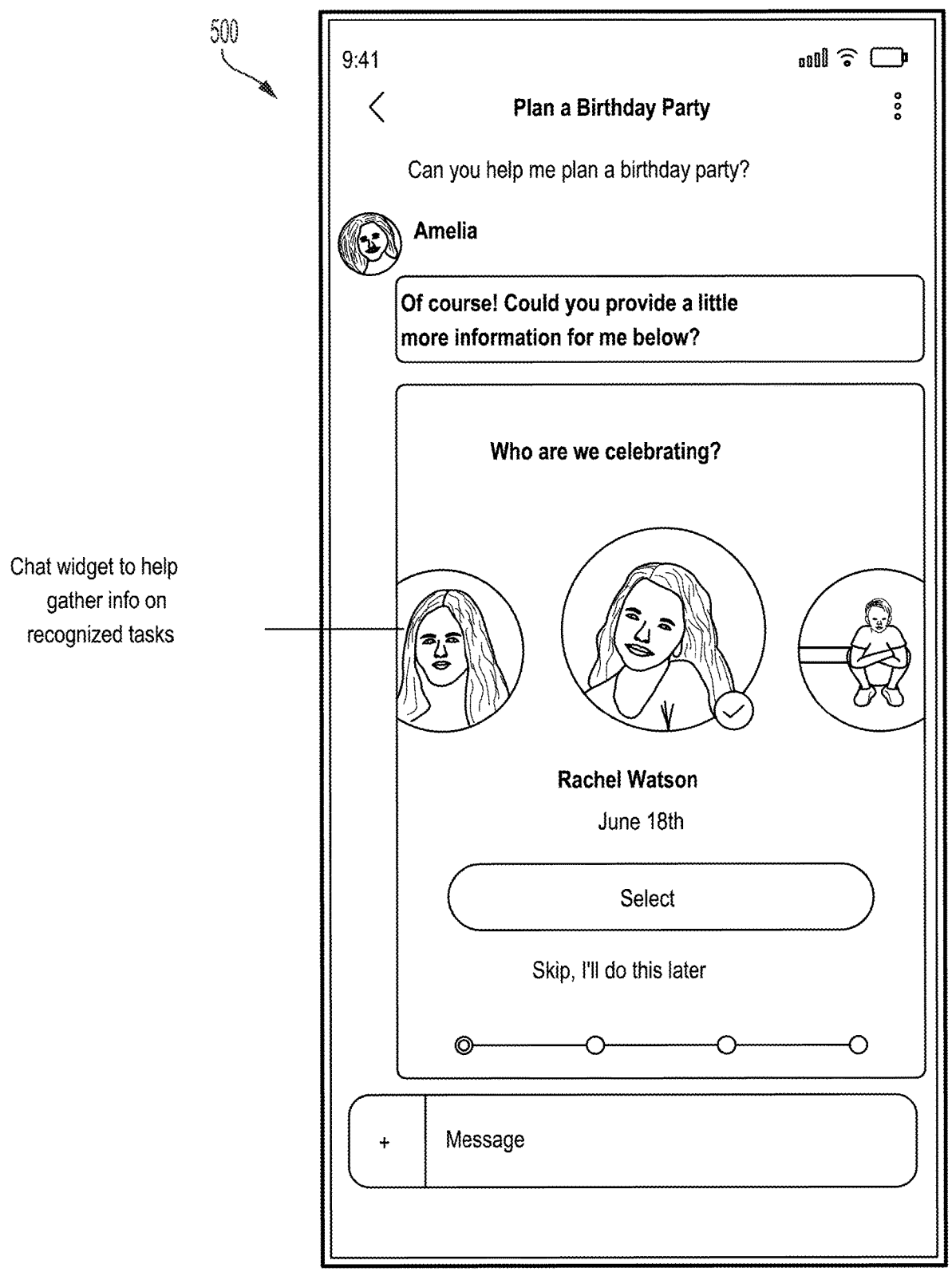
FIG. 5 shows an example of an interface for facilitating task interaction and chat initiation in accordance with at least one embodiment.

FIG. 5 illustrates aspects of a chat flow interface 500 in accordance with some aspects. Interface 500 illustrates a customized chat flow associated with selection of a birthday party planning template. As illustrated, the interface 500 can be initiated from a template element selection in the chat flow interfaces 300 or 400 of FIG. 3 or 4. The interface 500 can then begin a chat-flow interface with a request for information, and presentation of an information gathering element in the chat flow. The example information gathering element in the chat flow interface 500 provides a side scrollable list of individuals associated with the member that the part planning may be associated with. In some aspects, a machine learning algorithm can analyze the birthdates, history data associated with party celebration for the members contacts, or other such information to categorize and sort the member's contacts based on a likelihood of the contact being the party recipient, with the likeliest contacts displayed first in the list. The chat flow element allows selection of a party recipient, or an option to identify the party recipient at a later time. If a party recipient is identified, available information about the party recipient can be used in suggesting subtasks for party planning. The information can include demographic or preference information gathered from a member or from representative interactions with a member's contacts. In some implementations, as part of tasks for a member, the representative can interact with a member's contacts, can gather information about the member's contacts (e.g., children's ages, preferences, food allergies, etc.). Such information can then be stored by the task facilitation service 202 and used when the contact is associated with a task. For example, previous tasks for a member's child can result in the system 202 storing information indicating a preference for the color green and a specific celebrity and a favorite fictional character. Identifying that child as the party target can result in the system using this information to suggest party themes, games, music, gift recommendations, or other such information relevant to a party.

Figure 6:
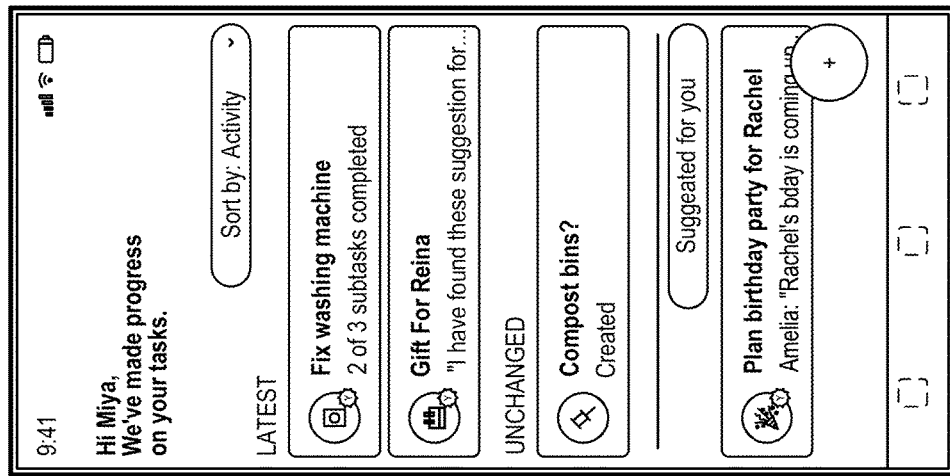
FIG. 6 shows an example of an interface for summarizing task interaction status as part of a system for facilitating task interactions and management in accordance with at least one embodiment.

FIGS. 6-11 illustrate additional aspects of chat flow interfaces that can be used with systems described herein, such as systems integrating task facilitation services 102 or 202. FIG. 6 illustrates chat flow interface 600 that includes a sortable chat flow with messages sorted by activity, as well as a representative message associated with multiple tasks at the top of the chat flow. In the example of interface 600, messages in the chat flow are sorted and grouped by activity. Other sorting options for messages in the chat flow include sorting by chronological message, by task priority, by most recent subtask completion time, or other such sorting options. In the example of interface 600, a special grouping can be presented for AI or machine learning algorithm selected messages in a suggested interface area at the bottom of the display.

In some aspects, to support filtering, tasks and subtasks can be tagged with a system identifier. When a user sends a message to a representative, NLP can be used to associated with message automatically with one or more system tasks, and the message can then be flagged with identifiers for all relevant tasks. In some instances, a message or message group can be associated with multiple tasks, and can be associated with multiple tags. Similarly, in some instances, an individual message may not be related to a task, but can be part of a group of messages that go together. The service 102, 202 can identify the separate messages as part of a group, and either flag the messages with a shared set of identifiers, or treat the group of messages as a single message. Sorting, filtering, reminders, and other such message presentation can then be based on system identifiers. In some implementations, a user can provide feedback indicating that messages appear to be miscategorized or associated with an incorrect task. In some such systems, this information can both be used to adjust message tags, and be provided as feedback to a NLP machine learning algorithm that automatically characterizes or assigns identifiers to messages to dynamically update the automatic assignment process.

A machine learning algorithm, in addition to flagging messages with existing task identifiers, can also operate to automatically suggest tasks based on NLP processing if a task does not exist. Similarly, if a task exists, but NLP of a message identified as associated with a task indicates an appropriate subtask that does not exist, the machine learning algorithm can flag the message with an id for the existing task, and recommend a new subtask based on analysis of message details. Further, machine learning analysis of multiple messages from a real-time chat flow may identify task suggestions or subtask updates that would not be apparent from individual messages. In some aspects, a system can periodically or continuously analyze real-time chat messages to suggest alerts, new task suggestions, new subtasks for existing tasks, or other such member communications or assistance for a human representative.

Some such machine learning analysis can be performed by servers implementing service 102, 202. Other such analysis can be a widget or algorithm operating on a member's device 120 or 212. Such a widget can be a customized algorithm designed to target member specific details or flags. In some aspects, this can involve gathering information from a member's device 120, 212 and tracking keywords or triggers in a real-time chat flow. For example, if a meeting for a task topic is in a calendar, such a widget can link chat flow messages tagged with the task id to the calendar message to provide data for the meeting automatically.

Figure 7:
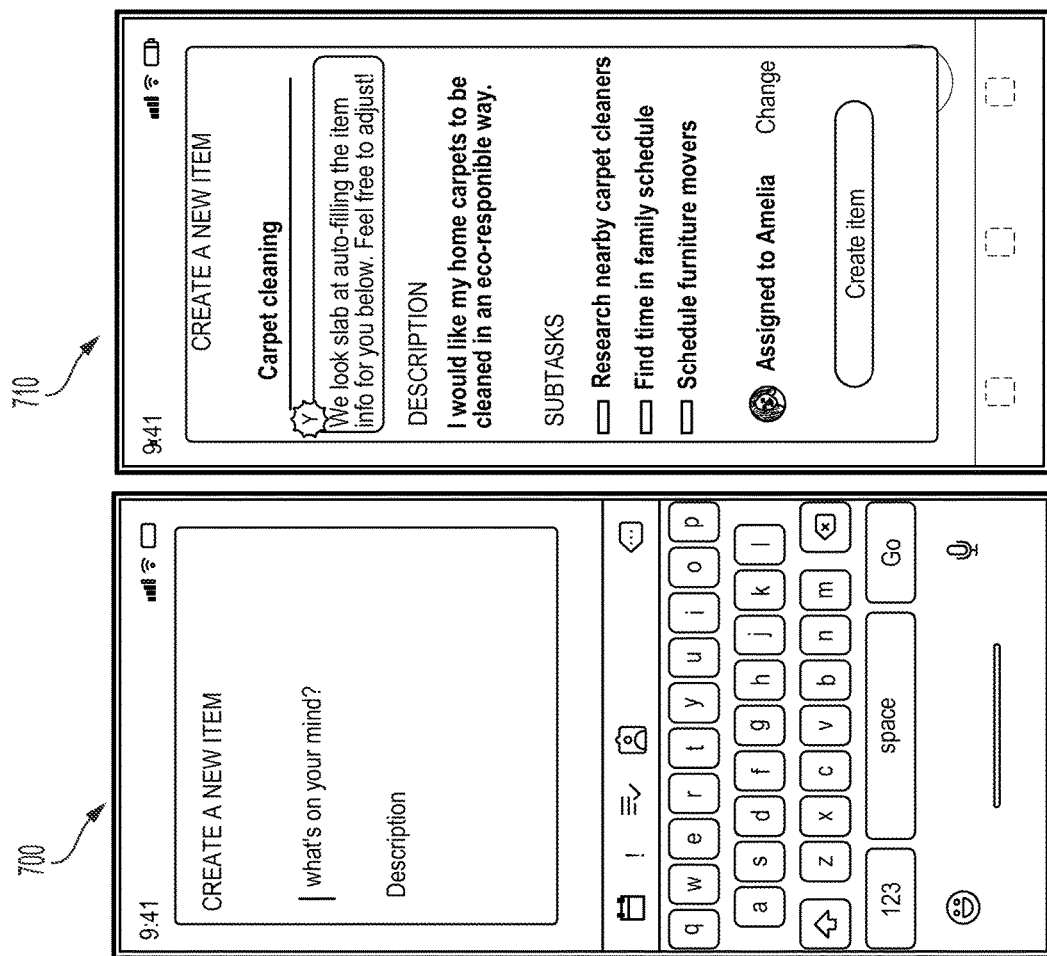
FIG. 7 shows an example of an interface for facilitating task interaction and chat initiation in accordance with at least one embodiment.

FIG. 7 illustrates multiple interfaces 700, 710 that can be implemented using a real-time chat flow interface as part of an implementation in accordance with aspects described herein. Interface 700 includes a keyboard interface with an area for editing a message that can then be presented with other messages in the chat flow interface based on the current sorting characteristics selected for the chat flow. Interface 710 illustrates details that can be created using interface 700 for a new task, including text describing the task, subtasks to be generated as part of the task, and clarifying details on the task. A task creation element can, when selected, communicate the task details to a task facilitation service 102 or 202. When the task details are received, they can be processed by systems described herein to assign a representative to the task, and to take further actions associated with the task. Such further actions can be responsive chat flow messages requesting additional information, indicating an expected task implementation time, or confirming a representative assignment.

Figure 8:
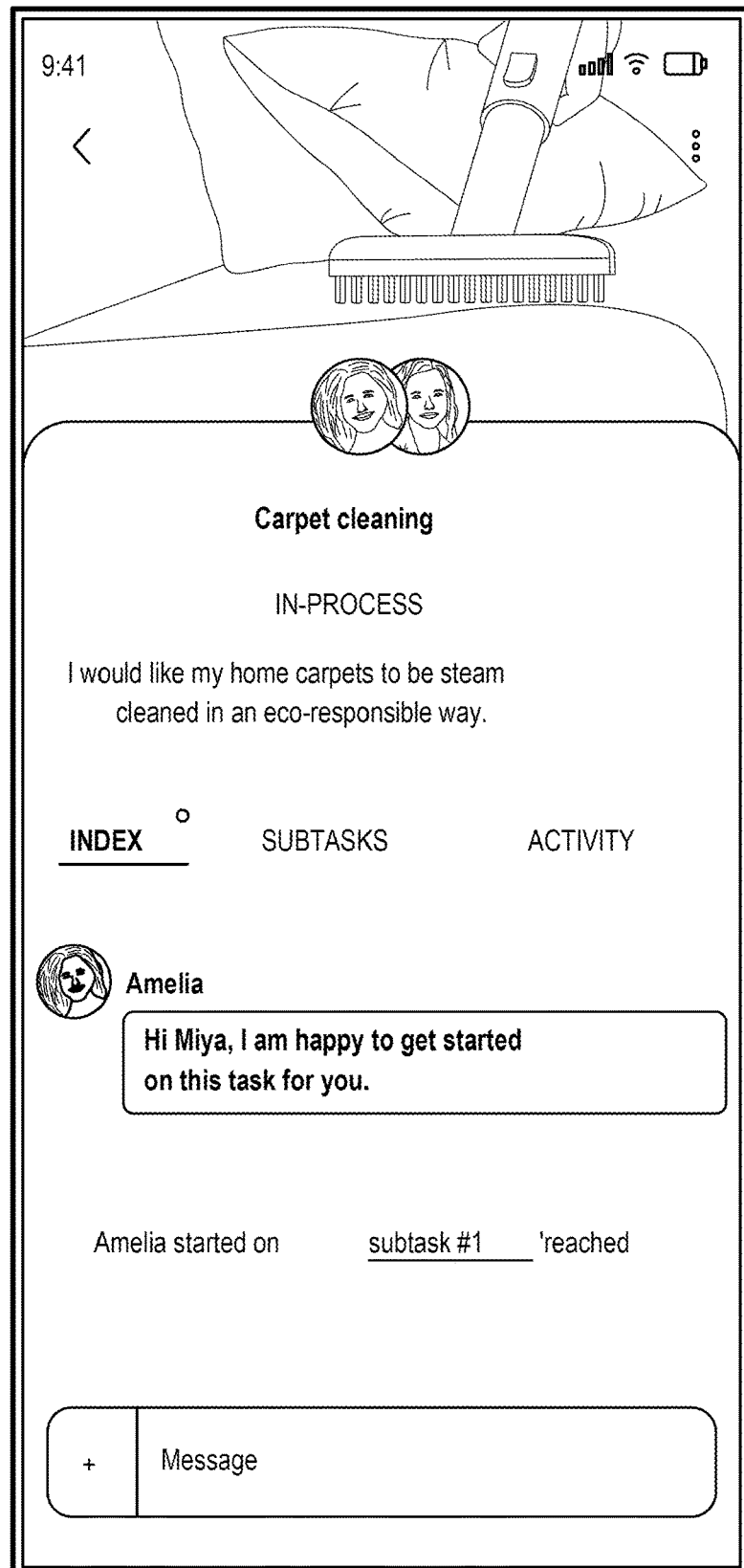
FIG. 8 shows an example of a chat interface for facilitating task management in accordance with at least one embodiment.

FIG. 8 illustrates an additional interface 800 that can flow from the interface 700 or the interface 710 of FIG. 7. Interface 800 illustrates a chat flow interface with chat communications associated with a task. In some aspects, chat messages and other details for a given task can be structured in different ways for different chat flows associated with a given task. In some aspects, a machine learning system of service 102, or 202 can analyze messages and task details to generate an index of key items for a task. Another interface directly accessible via interface 800 can indicate subtasks and details for each subtask, and a third interface can be a chronological flow of messages associated with the task, including milestone alerts, reminders, and messages between a member and one or more representatives. Interface 800 illustrates a chat flow task interface including a milestone alert in a chat flow interface for a task.

In some implementations, chat interface elements associated with a task can include specific feedback elements to provide information to service 102, 202. In one example, this includes an element specifically to delay follow-up on a task. Such an element can include a "talk about it later" or "snooze" indication. Such a selection can cause messages associated with a task to be hidden from a chat flow for a fixed amount of default time, an amount of time provided with selection of the element, or indefinitely. In some aspects, machine learning algorithms can be used to provide reminder messages associated with a snoozed task, requesting the member to confirm whether the task should be canceled, reintegrated with interfaces (e.g., placing messages back in a real-time chat flow interface with information for other tasks or task prioritization), or delayed further. Responses to such reminder messages can then be used to update details of when reminders are presented to a member. In some respects, machine learning algorithms can determine that certain members like reminders at a certain time of day, a certain day of the week, or at certain member specific intervals. Such algorithms can additionally determine that a member prefers not to receive more than a threshold number of reminders in a given period, or prefers to process all reminders together. Changing feedback can dynamically update such reminders, so that reminder processes for a single member can change over time based on member interactions with reminder messages and feedback on preferences.

Figure 9:
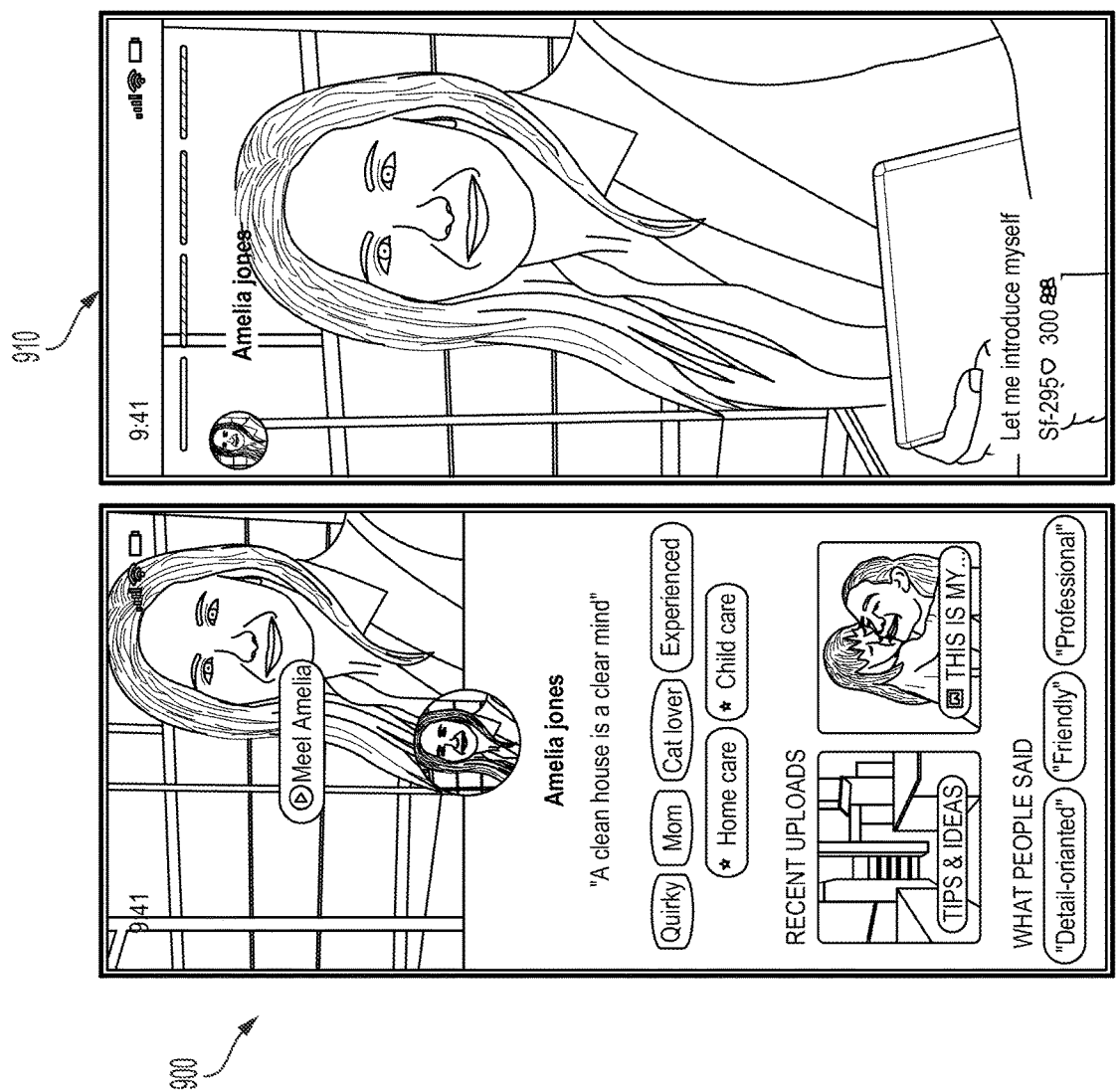
FIG. 9 shows an illustrative example of an environment in which a task recommendation system generates and ranks recommendations for different projects and/or tasks that can be presented to a member in accordance with at least one embodiment.

FIG. 9 illustrates aspects of representative selection in association with some implementations. As described above, a member can use interfaces presented on a device to initiate tasks with a service 102 or 202. The service can then process the received task details in various ways. Some aspects analyze the available representatives for the services 102 or 202, and select a representative for the task. The selection can be based on representatives previous interactions with a member, representative expertise, representative availability, or other such aspects to match a representative to a member and/or the member's task. Interface 900 includes details about a suggested representative recommended for a task, and interface 910 is a chat flow interface for a representative recommended for an initial task with a member. The member can communicate with the recommended representative, and assign or manage subtasks or task details, or the member can request an alternate representative. In some aspects, any such details can be used by a machine learning feedback system to impact future assignments. Such data can include both member characteristics, representative characteristics, details of the task, and details of communications between the member and representatives. In some aspects, AI representatives can be directly involved in initial communications for a task, and machine learning algorithms can revise selection and interaction processes for initial representative contacts based on feedback from previous interactions to dynamically update processes for task interactions.

Figure 10:
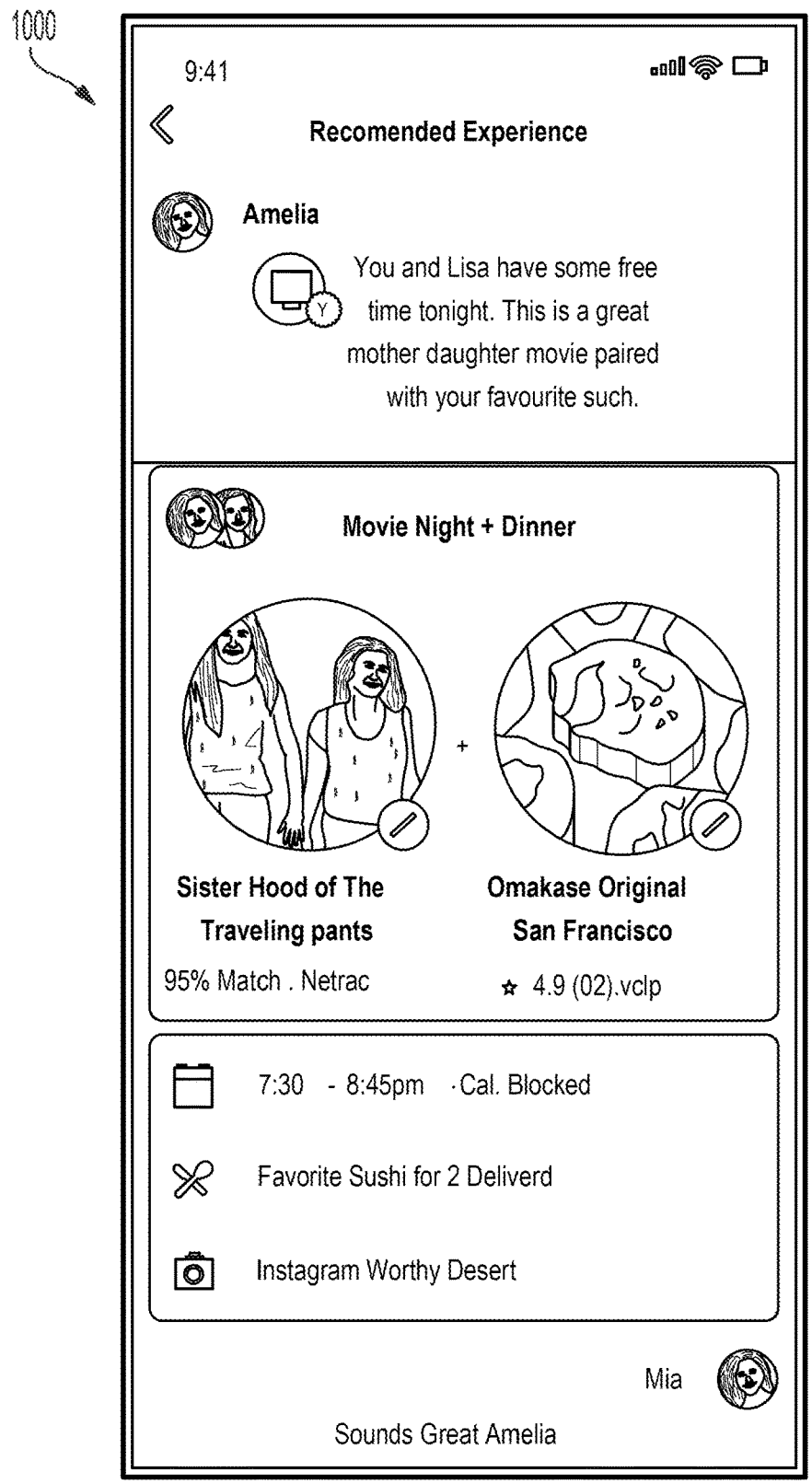
FIG. 10 shows an illustrative example of an environment in which a machine learning algorithm or artificial intelligence is implemented to assist in the identification and creation of new projects and tasks in accordance with at least one embodiment.

FIG. 10 illustrates an interface 1000 for task recommendations presented by a task service 102 or 202. In the chat flow interfaces above, many aspects described are for member initiated tasks. In some implementations, a member can interact with a representative over the course of multiple tasks, and the service can use information about the member provided during onboarding as well as during task interactions to generate recommended tasks. Interface 1000 illustrates a recommendation for an experience (e.g., organization task) that can be based on a non-automatic representative analysis of a member's information, or based on a dynamic machine learning analysis. For example, a service can have access to information from a member's calendar as well as calendars of a member's contacts. Chat messages from a real-time chat flow can include indications that the member would like to schedule more time with a specific contact (e.g., the member's daughter). Machine learning analysis of available data, including the member's calendar, the chat message information, onboarding information, and any other such information can be used to recommend an event. The details of the event can be based on history data from other similar events recommended by the system, along with feedback received for those events, as well as other information. For example, a recommendation for dinner and a movie based on calendar free time for event participants can use movie recommendations from a third party service targeted to the event attendees, and a dinner or food recommendation can be based on a separate third party service matching food recommendations to the event attendees. Further revisions to the suggested event details can be performed by machine learning algorithms of the service 102, 202, and can be manually edited by the member when reviewing or accepting the event suggestion. Acceptance of the event suggestion can result in follow-on communications, automatic generation of subtasks (e.g., purchasing movie tickets or access to the movie for a home display, restaurant reservations or take-out purchase and scheduling, etc.). In some aspects, a member can provide specific details for subtasks, or can delegate to a representative to provide a best available option within parameters determined by onboarding or member selection. For example, dinner and the movie can be associated with target times of 6 PM and 8 PM respectively, with options to adjust the times by up to 30 minutes for each sub-event based on reservation or showtime availability. Changes outside such parameters can trigger subsequent communications to be presented to a member for approval, event cancelation, or further task refinement.

Figure 11:
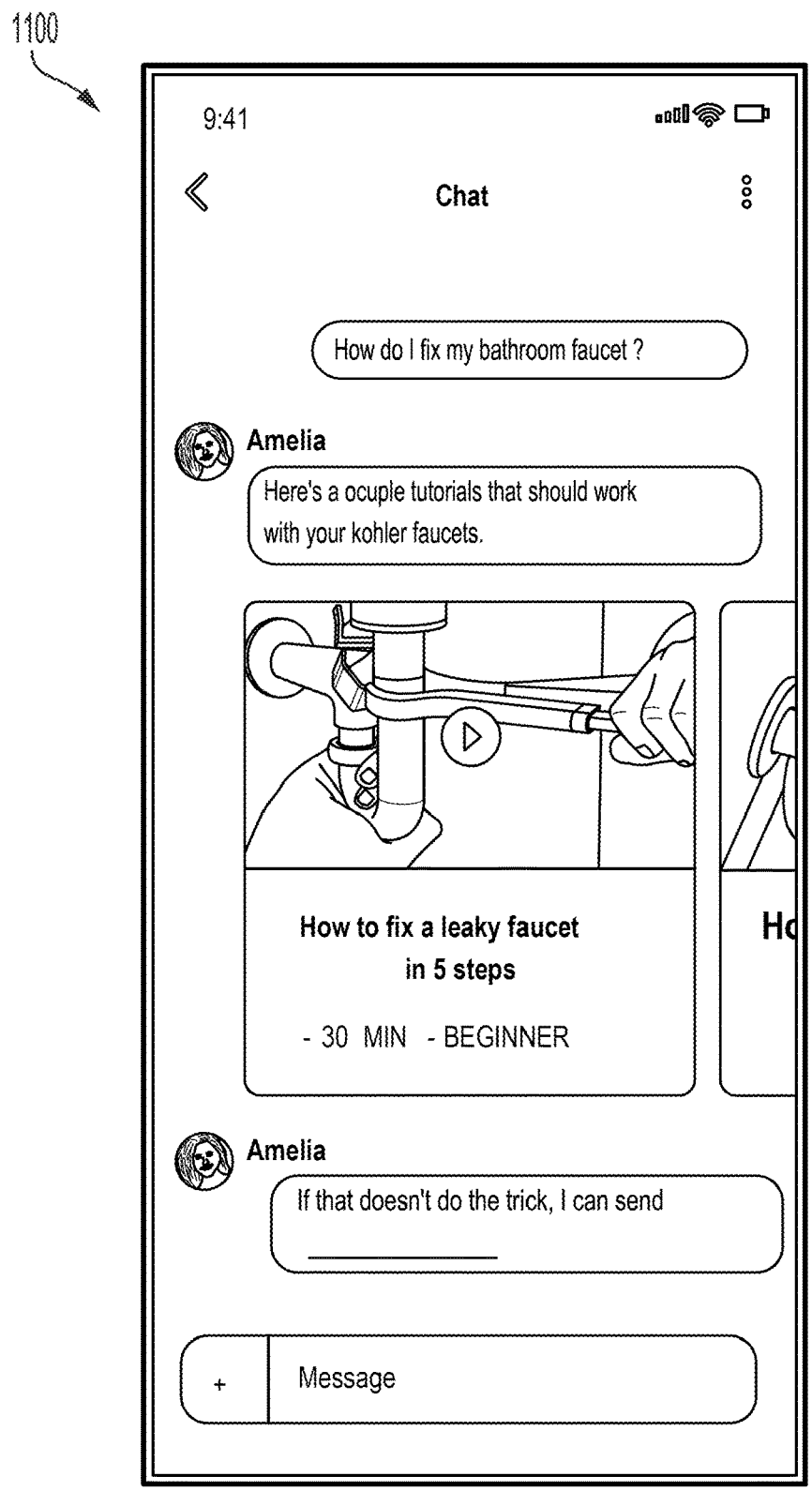
FIG. 11 shows an illustrative example of an environment in which a machine learning algorithm or artificial intelligence is implemented to process messages exchanged between a member and a representative to inform a representative of new projects and tasks in accordance with at least one embodiment.

FIG. 11 illustrates a chat flow interface for a task that may be identified as urgent in some aspects. For example, if a member has a faucet leak, the member can request assistance from service 102, 202 on an urgent basis. A representative with experience related to the emergency task of repairing the leak can be assigned on a priority basis, and communicate text, image, or video data in a chat flow interface 1100. An initial assessment can allow a representative to recommend on-site emergency assistance from a third-party, or can provide assistance via additional video, image, or text communications. In some aspects, third party information can be linked in the chat flow interface, and the representative can provide clarifying information to the member based on the member attempting to use information provided by a representative. Feedback from the emergency task interaction can be used by service 102, 202 to analyze the information provided to the member, the performance of the representative (e.g., automatic or non-automatic), triggers for suggesting on-site or other third party assistance, feedback from a member, or any other such feedback data. Such data can be used to dynamically alter subsequent interactions associated with similar tasks.

Figure 12:
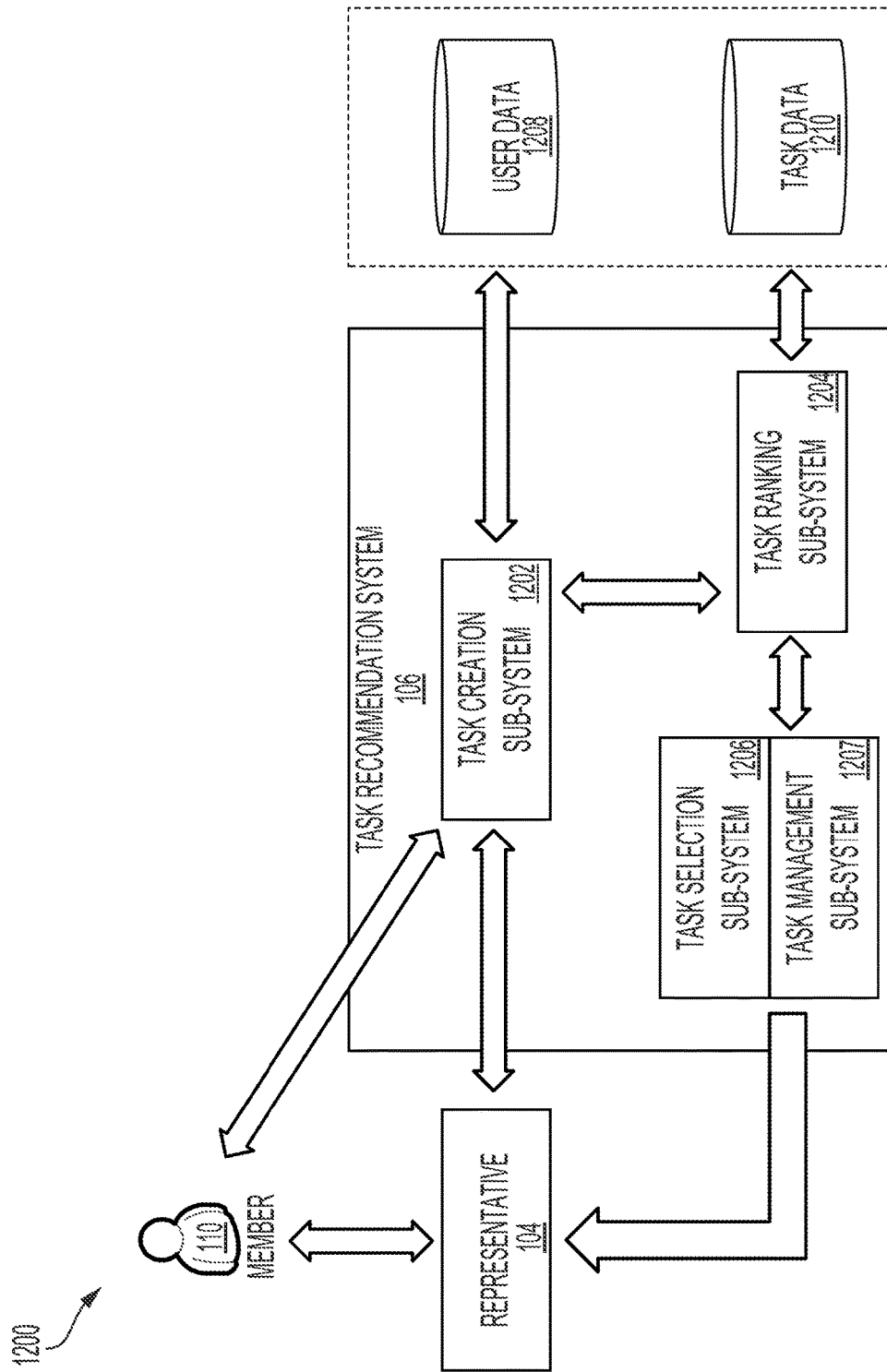
FIG. 12 shows an illustrative example of an environment in which a task coordination system assigns and monitors performance of a task for the benefit of a member by a representative and/or one or more third-party services in accordance with at least one embodiment.

FIG. 12 shows an illustrative example of an environment 1200 in which a task recommendation system 206 generates and ranks recommendations for different projects and/or tasks that can be presented to a member 210 in accordance with at least one embodiment. In the environment 1200, a member 210 and/or representative 204 interacts with a task creation sub-system 1202 of the task recommendation system 206 to generate a new task or project that can be performed for the benefit of the member 210. The task creation sub-system 1202 may be implemented using a computer system or as an application or other executable code implemented on a computer system of the task recommendation system 206.

In some embodiments, a member 210 can access the task creation sub-system 1202 to manually generate a new task or project that may be assigned to a representative 204 and/or one or more third-party services for performance of the new task or project for the benefit of the member 210. For instance, a member 210 may explicitly indicate to the representative 204 that it requires assistance with regard to a particular issue. As an illustrative example, the member 210 may indicate, in a message to the representative 204 over the communications session, that it would like assistance with an upcoming move to a new town. The representative 204 may evaluate this message and determine that the member 210 has defined an issue for which a project and corresponding tasks may be generated to address the issue. Alternatively, the member 210 may directly access the task creation sub-system 1202 to request creation of a project corresponding to a particular issue that the member 210 would like assistance with. For instance, the task facilitation service may provide, via an application or web portal of the task facilitation service, a widget or other user interface element through which a member 210 may submit a request to create a project corresponding to the member's issue. In response to this request, the task creation sub-system 1202 may transmit a notification to the representative 204 indicating the member's request to create a project for the stated issue. The task creation sub-system 1202 may provide the representative 204 with a description of the issue, as provided by the member 210.

In some embodiments, the task creation sub-system 1202 provides various templates that may be used by the representative 204 and/or the member 210 to generate a new project and/or task for a stated issue. The task creation sub-system 1202 may maintain, in a task datastore 1210, project and task templates for different project/task types or categories. Each project or task template may include different data fields for defining the project or task, whereby the different project or task fields may correspond to the project/task type or category for the project or task being defined. The representative 204 and/or the member 210 may provide information related to the issue that is to be addressed via these different fields to define the project or task that may be submitted to the task creation sub-system 1202 for processing.

In some embodiments, the task creation sub-system 1202 can monitor, automatically and in real-time, messages as they are exchanged between the member 210 and the representative 204 over a communications session to identify a project or task that can be performed for the benefit of the member 210 in order to address an issue specified by the member 210 over the communication session. For instance, the task creation sub-system 1202 may process messages between the member 210 and the representative 204 as these messages are being exchanged using a machine learning algorithm or artificial intelligence to automatically identify any projects and/or tasks for which the representative 204 and the task facilitation service may provide assistance to the member 210 for addressing a stated issue. The task creation sub-system 1202 may utilize NLP or other artificial intelligence to evaluate these exchanged messages or other communications from the member 210 to identify any projects and/or tasks that may be performed in order to address an issue expressed by the member 210. In some instances, the task creation sub-system 1202 may utilize historical data corresponding to previously identified projects and tasks for similarly situated members and corresponding messages from these members from a user datastore 1210 to train the NLP or other artificial intelligence to identify possible projects and tasks. If the task creation sub-system 1202 identifies one or more projects and/or tasks that may be performed to address a specified issue, the task creation sub-system 1202 may present these projects and/or tasks to the representative 204, which may communicate with the member 210 over the communications session to indicate that it has identified these projects and/or tasks and that it will accordingly assist the member 210 in addressing the member's specified issue.

In some embodiments, the task creation sub-system 1202 provides, for each identified project and/or task, a template through which the representative 204 may define various parameters for the project and/or task. The task creation sub-system 1202 may provide various task templates that may be used by the representative 204 to further define a project and/or task identified by the task creation sub-system 1202. The task creation sub-system 1202 may maintain, in a task datastore 1210, task templates for different project and task types or categories. Each task template may include different data fields for defining the project or task, whereby the different task fields may correspond to the project or task type or category for the project or task being defined. The representative 204 may provide project or task information via these different data fields to define the project or task that may be submitted to the task creation sub-system 1202 for processing.

In some embodiments, the data fields presented in a template for a project or task can be selected based on a determination generated using a machine learning algorithm or artificial intelligence. For example, the task creation sub-system 1202 can use, as input to the machine learning algorithm or artificial intelligence, a member profile from the user datastore 1208 and the selected template from the task datastore 1210 to identify which data fields may be omitted from the template when presented to the representative 204 for definition of a new task or project. For instance, if the member 210 is known to delegate maintenance tasks to a representative 204 and is indifferent to budget considerations, the task creation sub-system 1202 may present, to the representative 204, a task template that omits any budget-related data fields and other data fields that may define, with particularity, instructions for completion of the task. In some instances, the task creation sub-system 1202 may allow the representative 204 to add, remove, and/or modify the data fields for the template. For example, if the task creation sub-system 1202 removes a data field corresponding to the budget for the task based on an evaluation of the member profile, the representative 204 may request to have the data field added to the template to allow the representative 204 to define a budget for the task based on its knowledge of the member 210. The task creation sub-system 1202, in some instances, may utilize this change to the template to retrain the machine learning algorithm or artificial intelligence to improve the likelihood of providing templates to the representative 204 without need for the representative 204 to make any modifications to the template for defining a new project or task.

In some embodiments, the task creation sub-system 1202 can automatically populate the data fields presented in a template based on parameters of the new project or task as identified from member messages exchanged over the communications session. For instance, the task creation sub-system 1202 may use NLP or other artificial intelligence to evaluate messages or other communications from the member 210 to identify various parameters for the new project or task. As an illustrative example, if the member 210 states, in a message to the representative 204, that it does not want to spend over $500 to address an identified issue, the task creation sub-system 1202, using NLP or other artificial intelligence, may determine that the budget cap for the new project or task is $500 and input this value into the corresponding data field for the project or task. This may reduce the burden on the representative 204 to provide the required information for the new project or task.

In some embodiments, the task creation sub-system 1202 can utilize computer vision or other artificial intelligence to process images or video recordings provided by the member 210 to identify potential projects and/or tasks that may be recommended to the member 210 for completion. For instance, the representative 204 may prompt the member 210 to record images or video during a walkthrough of the member's home to identify potential projects and/or tasks that may be completed for the benefit of the member 210. These images or video may be processed by the task creation sub-system 1202 in real-time to detect issues within the member's home and identify possible projects and/or tasks that may be performed to address these issues. Additionally, while the digital images or video may be related to a particular issue, the task creation sub-system 1202 may further process the digital images or video to identify additional and/or alternative issues for which projects and/or tasks may be recommended. Thus, the task creation sub-system 1202, using computer vision or other artificial intelligence, may detect possible issues that the member 210 may not be aware of.

In some embodiments, the task creation sub-system 1202 can further provide, to the representative 204, with recommendations for questions that may be presented to the member 210 regarding the project or task based on the member's preferences. For example, if the representative 204 has not defined any budgets or budget restrictions for a new task or project, and the task creation sub-system 1202 determines that the member 210 is budget conscious, the task creation sub-system 1202 may prompt the representative 204 to communicate with the member 210 via the communications session to inquire about the member's budget for completion of the project or task. In some embodiments, the task creation sub-system 1202 can use a machine learning algorithm or artificial intelligence to determine what questions may be provided to the member 210. For instance, the task creation sub-system 1202 may use the parameters defined for the new project or task, the member's profile, and historical data corresponding to projects and/or tasks previously performed for the benefit of the member 210 as input to the machine learning algorithm or artificial intelligence to determine the member's preferences and to identify questions that may be provided to the member 210 based on these preferences to further define the parameters of the new project or task.

The task recommendation system 206 may further include a task ranking sub-system 1204, which may be configured to rank the tasks and/or projects associated with a member 210, including projects and/or tasks that may be recommended to the member 210 for completion by the member 210, the representative 204, or other third-party services. The task ranking sub-system 1204 may be implemented using a computer system or as an application or other executable code implemented on a computer system of the task recommendation system 206. In some embodiments, the task ranking sub-system 1204 can rank the member's projects and/or tasks based on a likelihood of the member 210 selecting the project or task for delegation to the representative 204 for performance and coordination with third-party services. Alternatively, the task ranking sub-system 1204 may rank the member's projects and/or tasks based on the level of urgency for completion of each project or task. The level of urgency may be determined based on member characteristics from the user datastore 1208 (e.g., data corresponding to a member's own prioritization of certain projects/tasks or categories of projects/tasks) and/or potential risks to the member 210 if the project or task is not performed.

In some embodiments, the task ranking sub-system 1204 provides the ranked list of the projects and/or tasks that may be recommended to the member 210 to a task selection sub-system 1206. The task selection sub-system 1206 may be implemented using a computer system or as an application or other executable code implemented on a computer system of the task recommendation system 206. The task selection sub-system 1206 may be configured to select, from the ranked list of the projects and/or tasks, which projects and/or tasks may be recommended to the member 210 by the representative 204. For instance, if the application or web portal provided by the task facilitation service is configured to present, to the member 210, a limited number of task and/or project recommendations from the ranked list of the projects and/or tasks, the task selection sub-system 1206 may process the ranked list and the member's profile from the user datastore 1208 to determine which project and/or task recommendations should be presented to the member 210. In some instances, the selection made by the task selection sub-system 1206 may correspond to the ranking of the projects and/or tasks in the list. Alternatively, the task selection sub-system 1206 may process the ranked list, as well as the member's profile and the member's existing projects and tasks (e.g., projects and tasks in progress, projects and tasks accepted by the member 210, etc.), to determine which projects and/or tasks may be recommended to the member 210. For instance, if the ranked list includes a task corresponding to gutter cleaning but the member 210 already has a task in progress corresponding to gutter repairs due to a recent storm, the task selection sub-system 1206 may forego selection of the task corresponding to gutter cleaning, as this may be performed in conjunction with the gutter repairs. Thus, the task selection sub-system 1206 may provide another layer to further refine the ranked list of the projects and/or tasks for presentation to the member 210.

The task selection sub-system 1206 may provide, to the representative 204, a new listing of projects and/or tasks that may be recommended to the member 210. The representative 204 may review this new listing of projects and/or tasks to determine which projects and/or tasks may be presented to the member 210 via the project interface provided by the task facilitation service (as illustrated herein at FIG. 2). For instance, the representative 204 may review the set of projects and/or tasks recommended by the task selection sub-system 1206 and select one or more of these projects and/or tasks for presentation to the member 210 via the communications session and/or the project interface. In some instances, the one or more projects and/or tasks may be presented to the member 210 according to the ranking generated by the task ranking sub-system 1204 and refined by the task selection sub-system 1206. Alternatively, the one or more projects and/or tasks may be presented according to the representative's understanding of the member's own preferences for project and task prioritization. Through the project interface, the member 210 may select one or more projects and/or tasks that may be performed with the assistance of the representative 204 or third-party services. The member 210 may alternatively dismiss any presented projects and/or tasks that the member 210 would rather perform personally or that the member 210 does not otherwise want performed.

In some embodiments, the task selection sub-system 1206 monitors the communications session between the member 210 and the representative 204, as well as member 210 interaction with the project interface through which projects and/or tasks are presented, to collect data with regard to member selection of projects and/or tasks for delegation to the representative 204 or third-party services for performance. For instance, the task selection sub-system 1206 may process messages corresponding to projects and/or tasks presented to the member 210 by the representative 204 over the communications session to determine a polarity or sentiment corresponding to each project and/or task. For example, if a member 210 indicates, in a message to the representative 204, that it would prefer not to receive any task or project recommendations corresponding to vehicle maintenance, the task selection sub-system 1206 may ascribe a negative polarity or sentiment to projects and tasks corresponding to vehicle maintenance. Alternatively, if a member 210 selects a task or project related to gutter cleaning for delegation to the representative 204 and/or indicates in a message to the representative 204 that recommendation of this task or project was a great idea, the task selection sub-system 1206 may ascribe a positive polarity or sentiment to this task or project. In some embodiments, the task selection sub-system 1206 can use these responses to tasks and/or projects recommended to the member 210 to further train or reinforce the machine learning algorithm or artificial intelligence utilized by the task ranking sub-system 1204 to generate project and task recommendations that can be presented to the member 210 and other similarly situated members of the task facilitation service. Further, the task selection sub-system 1206 may update the member's profile or model to update the member's preferences and known behavior characteristics based on the member's selection of projects and/or tasks from those recommended by the representative 204 and/or sentiment with regard to the projects and/or tasks recommended by the representative 204.

In some implementations, the task selection sub-system 1206 can operate in conjunction with a task management sub-system 1207 to process a real-time chat flow, and to balance task ranking for existing (e.g., approved) tasks against new tasks from the proposal or task selection sub-system 1206. In some such implementations, a chat flow processing system (e.g., as described below in FIGS. 16, 17, etc.) can analyze real-time messages and a message history between a member (e.g., a client) and a representative, and can process the messages to tag messages with one or more task tags. The system can provide information for analysis by both task selection sub-system(s) 1206 for proposal of new tasks, as well as analysis by task management sub-system(s) 1207 involved in managing existing approved tasks. In either case, the sub-systems can be provided metadata associated with message data that identifies existing or proposed tasks that is matched to the message.

Figure 13:
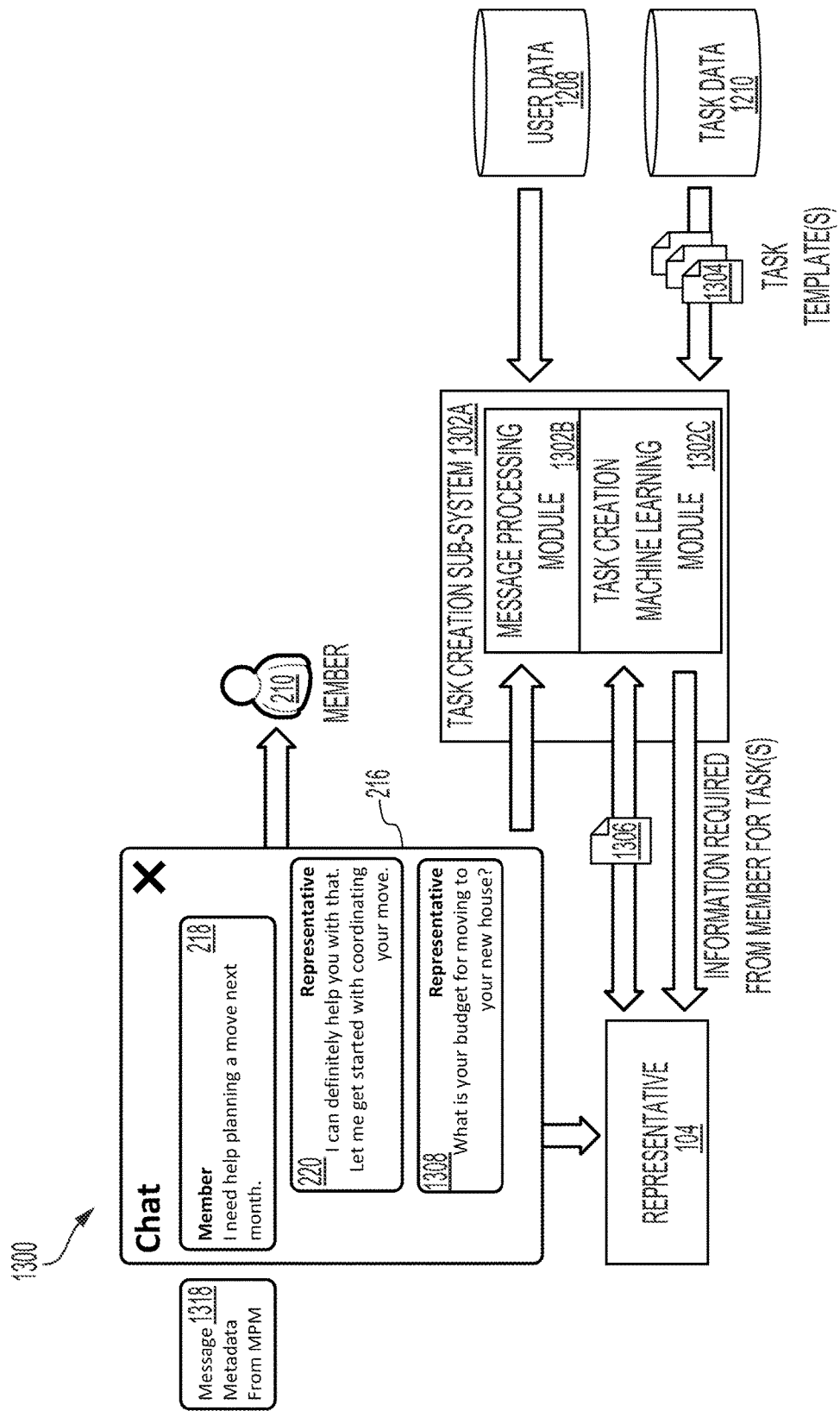
FIG. 13 shows an illustrative example of a system for chat flow management and message filtering in accordance with some embodiments.

FIG. 13 shows an illustrative example of an environment 1300 in which various algorithms (e.g., which can include selection algorithms as well as machine learning algorithm or artificial intelligence systems) are implemented to assist in the identification and creation of new projects and tasks in accordance with at least one embodiment. As indicated above, such systems can use message or chat flow processing to tag messages with existing or proposed task tags. Messages tagged with task tags can then be used in various ways by the system, such as presentation within a filtered chat flow, proposal of new tasks based on message tags, proposal of new subtasks based on message tags and message content, improvement of tagging, task creation, or other such algorithms, or any other such system use of tagged messages.

In the environment 1300, the task creation sub-system 1302A can include various systems for gathering information used in task creation, including message processing module 1302B, and task creation learning module 1302C. The message processing module 1302B of the task creation sub-system 1302A can automatically, and in real-time, process messages 218, 220,1308 between a member 210 (e.g., a member device) and an assigned representative 204 (e.g., a representative device) as these messages 218, 220 are exchanged over a communications session 216 to identify any new tasks or projects that may be performed for the benefit of the member 210. As part of such analysis, the message processing module 1302B can implement real-time chat flow processing to tag messages with task tags as described in additional detail below. In various implementations, feedback from representatives, clients, third-parties, and any entity that interactions with the environment 1300 to provide feedback for improving message tagging, as well as improving algorithms or machine learning systems for task facilitation as described herein.

Such real-time chat flow analysis (e.g., by the message processing module 1302B or any aspect of the task creation sub-system 1302A) can be used in associating task tags with messages as part of message metadata (e.g., message metadata 1318). The message metadata may be stored with the user data 1208 in a local storage on each device participating in a chat flow, in a centralized database of an environment, or both, with the metadata 1318 propagated to the storage locations after creation (e.g., by a tagging algorithm of the message processing module 1302B, a machine learning algorithm, or any other such algorithm.) The task creation machine learning module 1302A may be implemented using a computer system or as an application or other executable code implemented on a computer system of the task recommendation system 206 for the task creation sub-system 1302A, as described above. Thus, the task creation machine learning module 1302C may serve as a component or other functionality of the task creation sub-system 1302A. In other implementations, such modules can be combined or separated into different modules to provide automated task tagging of messages as part of a task facilitation service to automatically generate new tasks and manage existing tasks.

In some implementations, the message metadata 1318 can be used with dynamic settings for the communication session 216. The communication session 216 can, in various implementations, include a chat flow for a particular task or sub-task. The message metadata 1318 can include task tags used to identify the messages within the communication session 216 as associated with a particular task (e.g., a move to new house task). As additional messages are received in the communication session 216, the message metadata 1318 for each message can be used to determine which chat flow display among one or more chat flows the message is associated with. In some implementations, a chat flow can have display settings or thresholds that are customized to a particular user or device. Such settings can, for example, include a number of messages in a UI display at a given time, with a chat flow limit, such that if more messages are received in a given time frame threshold (e.g., an hour, a day, etc.), then the system can divide the communication interface into multiple chat flow UI displays, so that the messages received in the time frame will have corresponding chat flow displays that allow recent messages to be viewed within a given chat flow. Such dynamic creation of new chat flow UI displays for a communication session can be determined using any combination of user settings, AI analysis of user interactions with interfaces, chat flow metrics for a given user or user group, or any other such criteria.

In some embodiments, the task creation machine learning module 1302A implements one or more machine learning algorithms or artificial intelligence to detect one or more possible projects and/or tasks based on messages 218, 220, 1308 exchanged over the communications session 216 and to further generate these projects and/or tasks automatically. For instance, the task creation machine learning module 1302A may utilize NLP or other artificial intelligence to evaluate these exchanged messages 218, 220 to identify any projects and/or tasks that may be performed in order to address an issue expressed by the member 210. For example, as illustrated in FIG. 13, the member 210, in a message 218 to the representative 204, has indicated that they require assistance with an upcoming move to a new city. The task creation machine learning module 1302A can use the message processing module 1302B, (e.g., using NLP, a tagging algorithm, or other artificial intelligence), may process this message 218 in real-time. The processing can identify existing tasks associated with the member, and determine if a task exists already that matches the data of the message 218. If a "move" task or another such task exists already, a task tag for that existing task can be added to the message metadata 1318 from the message processing module 1302B. If no such task exists, the message processing module 1302B can identify a proposed task tag, and attach the proposed task tag to the metadata 1318. Such task tag data can then be used in managing an existing task, or proposing a new task. For example, if a new task is proposed, a new representative may be associated with the proposed new task, and all messages within chat flow(s) with the member associated with the new proposed task can be forwarded to the representative. Similarly, if a task exists, the message tagged with the corresponding task tag can be added to data specific to the existing task. Depending on the type of message, automated priority can be added for the representative.

For example, if the message 218 is received and processed by the message processing module 1302B as associated with an existing task, the tagging of the message 218 may be further processed by the system to identify a sense of frustration or urgency associated with an existing task, and a representative may be alerted. In some situations, this can involve identifying whether one or more existing representatives associated with the existing task have failed to facilitate the task, or whether there is confusion or misunderstanding over the status of the existing task. In some such implementations, the system may automatically identify a member task that is delaying project progress, and can trigger a task reminder.

If a tag is associated with a new project, the tagged message may be placed in a group of messages with shared tags that are analyzed not only to identify a new project corresponding to the upcoming move, but also to identify any corresponding parameters for the new project or task, such as timeframes or deadlines for completing the move, any budgetary constraints defined by the member 210 in the one or more messages to the representative 204 over the communications session 216, and any other information that may be useful for defining the new project and any corresponding tasks (e.g., square footage of the member's home, preferred vendors or other third-party services, etc.).

The message processing module 1302B may analyze the messages in real time and place the analyzed (e.g., tagged or untagged) messages in a database of historical data as user data 1208 or task data 1210. The task creation sub-system 1302A may utilize historical data corresponding to previously identified projects and tasks for similarly situated members and corresponding messages from these members from a user datastore 1208 to train the NLP or other artificial intelligence used by the task creation machine learning module 1302A to identify possible projects and tasks that may be performed for the benefit of the member 210. If the task creation machine learning module 1302A identifies one or more projects and/or tasks that may be performed to address a specified issue, the task creation machine learning module 1302A may present these projects and/or tasks to the representative 204, which may communicate with the member 210 over the communications session 216 to indicate that it has identified these projects and/or tasks and that it will accordingly assist the member 210 in addressing the member's specified issue.

In some embodiments, the task creation machine learning module 1302A obtains, from a task datastore 1210, one or more task templates 1304 that may be used to define a new project and/or task(s) that may be assigned to the representative 204, member 210, and/or one or more third-party services in order to address an issue expressed by the member 210 or otherwise identified via messages 218 and other communications submitted via the communications session 216. A task template 1304 may correspond to a particular project or task type. For instance, when message is flagged with a new task tag, the tagged messages can be analyzed using custom criteria for the associated tag. Such criteria can, for example, be kept with task templates. Each task template 1304 may include different data fields for defining the project or task, whereby the different task fields may correspond to the project or task type or category for the project or task being defined. The representative 204 may provide project or task information via these different data fields to define the project or task that may be submitted to the task creation sub-system 1302A for processing. When the message processing module 1302B identifies a message to be tagged with task data, the task creation sub-system 1302A can then access template data to determine any criteria for automatically escalating the message or analysis of the message to further propose or create a new task for the member.

In some embodiments, the task creation machine learning module 1302A may select a particular task template 1306 from the one or more task templates 1304 based on the characteristics of the project or task identified by the task creation machine learning module 1302A from the messages 218, 220 exchanged between the member 210 and the representative 204. For instance, the task creation machine learning module 1302, in some embodiments, uses a classification or clustering algorithm to select a particular task template 1306 that may be provided to the representative 204 for defining the project or task corresponding to the identified issue that is to be addressed for the benefit of the member 210. The classification or clustering algorithm may generate correlations between different project or task characteristics and corresponding task templates such that, based on the characteristics of a particular project or task identified by the task creation machine learning module 1302A from the messages 218, 220 exchanged between the member 210 and the representative 204, the task creation machine learning module 1302A may identify an appropriate task template 1306 for the identified project or task using the classification or clustering algorithm. As input to this classification or clustering algorithm, the task creation machine learning module 1302A may use the corresponding parameters for the new project or task as input to identify, based on output provided by the classification or clustering algorithm, a particular task template 1306 that may be used to create the new project or task.

As noted above, the data fields presented in a task template for a project or task can be selected based on a determination generated using a machine learning algorithm or artificial intelligence. The task creation machine learning module 1302A may use, as input to the machine learning algorithm or artificial intelligence, a member profile from the user datastore 1208 and the task template 1306 identified using the classification or clustering algorithm to identify which data fields may be omitted from the task template 1306 when presented to the representative 204 for definition of a new task or project. For instance, if the member 210 is known to delegate maintenance tasks to a representative 204 and is indifferent to budget considerations, the task creation machine learning module 1302A may present, to the representative 204, a task template 1306 for the identified project or task that omits any budget-related data fields and other data fields that may define, with particularity, instructions for completion of the project or task.

In some instances, the task creation machine learning module 1302A may allow the representative 204 to add, remove, and/or modify the data fields for the task template 1306. For example, if the task creation machine learning module 1302A removes a data field corresponding to the budget for a project or task based on an evaluation of the member profile, the representative 204 may request to have the data field added to the task template 1306 to allow the representative 204 to define a budget for the project or task based on its knowledge of the member 210. The task creation machine learning module 1302, in some instances, may utilize this change to the task template 1306 to retrain the machine learning algorithm or artificial intelligence to improve the likelihood of providing task templates 1306 to the representative 204 without need for the representative 204 to make any modifications to the task template 1306 for defining a new project or task.

In some embodiments, the task creation machine learning module 1302A can further obtain feedback with regard to the selection of the task template 1306 to retrain the classification or clustering algorithm used to select task templates based on characteristics or parameters associated with particular project/task categories or types. For instance, if a representative 204 indicates that a particular task template 1306 provided by the task creation machine learning module 1302A is not relevant to the particular issue expressed by the member 210 or otherwise identified based on communications from the member 210, the task creation machine learning module 1302A may revise the classification or clustering algorithm to decrease the likelihood of this task template 1306 being selected for similar project/task categories or types. Further, if the representative 204 manually selects an alternative task template for the identified issue expressed by the member 210, the task creation machine learning module 1302A may use this selection to further revise the classification or clustering algorithm to increase the likelihood of the algorithm selecting this particular task template for similar projects and tasks.

As noted above, the task creation sub-system 1302A can automatically populate the data fields presented in a task template 1306 based on parameters of the new project or task as identified from messages 218, 220 exchanged over the communications session 216. For instance, the task creation machine learning module 1302A may use the parameters for the new project or task gleaned using NLP or other artificial intelligence to automatically populate one or more data fields of the selected task template 1306. This may reduce the representative's burden with regard to generating a new project or task using the provided task template 1306, as the representative 204 may only need to review the automatically populated information for accuracy.

Figure 14:
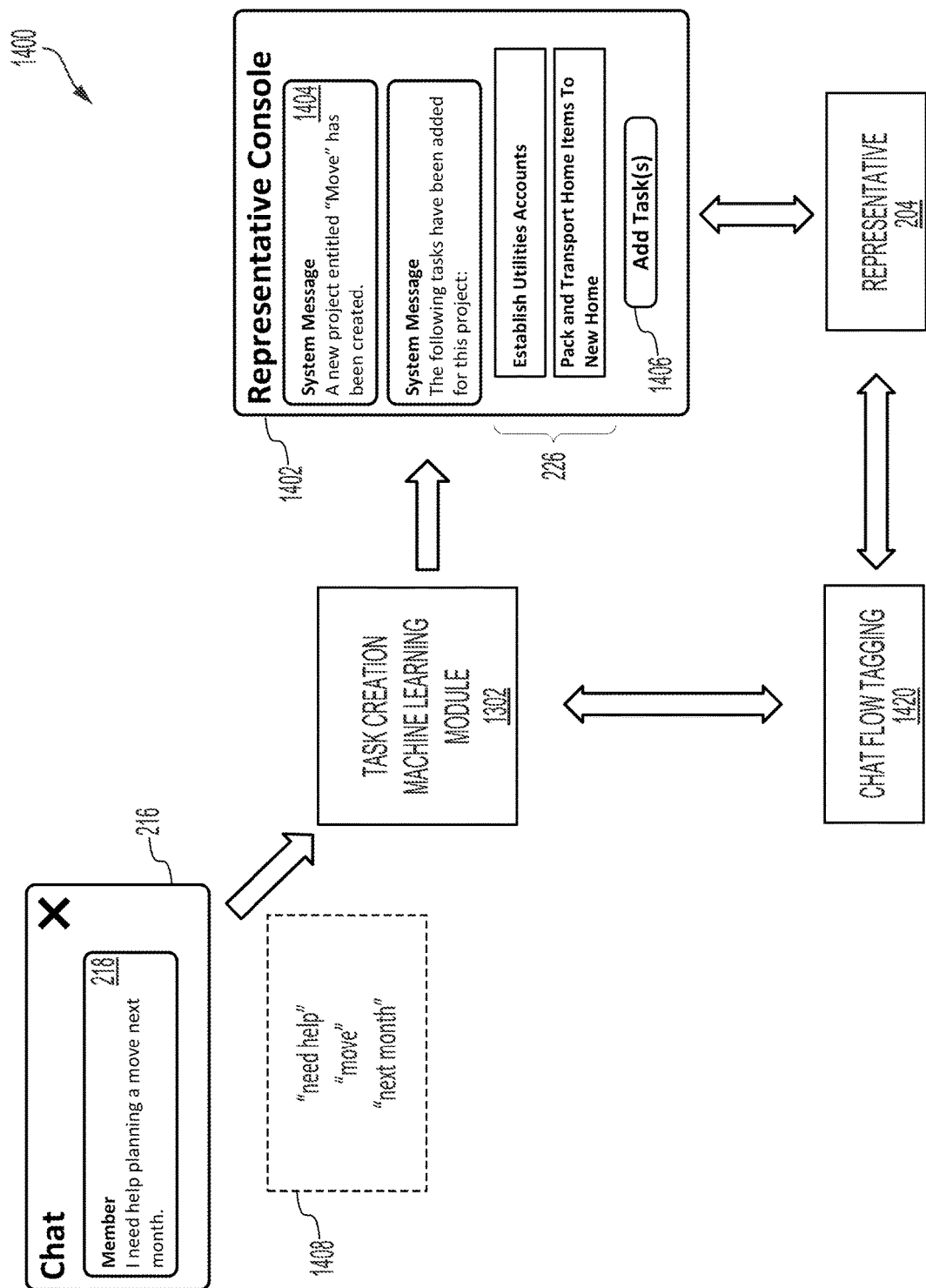
FIG. 14 shows an illustrative example of a system for chat flow management and message filtering in accordance with some embodiments.

FIG. 14 shows an illustrative example of an environment 1400 in which a machine learning algorithm or artificial intelligence is implemented to process messages 218 exchanged between a member and a representative to identify messages to associate with task tags. The task tags can be used for various additional systems, such as filtering of messages by task tags in a chat interface, facilitating an existing task with analysis of tagged messages to generate subtasks or reminders for existing tasks, informing a representative of new messages associated with a task the representative is assigned to, or creation of new tasks using the task creation learning module 1302.

As noted above, a member of the task facilitation service and an assigned representative may exchange messages over a communications session 216 to address any issues expressed by the member. For instance, a member may transmit one or more messages 218 over the communications session 216 to express that the member requires assistance from the representative to address a particular issue. As illustrated in FIG. 14, the member has expressed that it requires assistance with planning an upcoming move to a new city, which is to take place in the coming month.

In some embodiments, a task creation machine learning module 1302 of the task creation sub-system described above in connection with FIGS. 13-3 may utilize NLP or other artificial intelligence to automatically, and in real-time, process messages exchanged over the communications session 216 to identify one or more projects and/or tasks that may be performed for the benefit of the member. For instance, as illustrated in FIG. 14, the task creation machine learning module 1302 may process the message 218 using NLP or other artificial intelligence to identify anchor words or phrases of the message 1408 corresponding to a possible project or task that may be created and performed for the benefit of the member. For example, as illustrated in FIG. 14, the task creation machine learning module 1302 has identified the anchor phrases of the message 1408 "need help" "move" and "next month." The anchor phrase "need help" may correspond to a request from the member to create a new project or task. The anchor phrase "move" may correspond to the type or category of the new project or task that is to be created (e.g., "move to" may correspond to a moving category of project or task). Such phrases may be associated with a particular task tag by the chat flow tagging system 1420. Additionally, the anchor phrase "next month" may correspond to a temporal limitation for the new project or task, whereby "next month" may denote a deadline for completion of the project or task. Thus, based on the message 218 expressed by the member to request creation of a new project or task, the task creation machine learning module 1302 may automatically identify a new project or task, as well as different parameters for the new project or task that may be used to automatically populate a project or task template for the new project or task. The NLP described above can be used not only for generating tags for messages, but for creating metadata associated with additional aspects of a task associated with a tag type. For example, as described above with task templates, a task tag and an associated template may have predefined metadata structures. Information in a message such as "next month" can be used to determine data for such predefined metadata structures. Such structures can include timing, location, third-party business identification, budget ranges, level of independence or pre-authorization provided to a representative, or any other such data used for facilitating a task within a service as described herein.

In some embodiments, if the task creation machine learning module 1302 identifies a new project or task based on the messages exchanged between the member and the representative 204 over the communications session 216, the task creation machine learning module 1302 can select an appropriate project or task template for the identified project or task and begin definition of the new project or task that is to be performed for the benefit of the member.

In some embodiments, once the task creation machine learning module 1302 has defined a new project or task that is to be performed for the benefit of the member, the task creation machine learning module 1302 can transmit a notification to the representative 204 to indicate that a new project or task has been created for the member. For instance, as illustrated in FIG. 14, the task creation machine learning module 1302 may update a representative console 1402 utilized by the representative 204 to provide a new message 1404 indicating that a new project or task has been created for the member. The representative console 1402 may be implemented as an interface provided by the task facilitation service to representatives associated with the task facilitation service to prompt representatives with regard to available actions or suggestions for managing its relationship with the member. For instance, through the representative console 1402, the task facilitation service may provide a representative 204 with information that may assist the representative 204 in communicating with the member in order to assist the member with particular projects and tasks, to ask pertinent questions of the member with regard to performance of projects and tasks, and to indicate when new projects or tasks have been identified and created that are to be performed in order to assist the member with regard to a particular issue expressed by the member. Thus, the representative console 1402 may be provided to better guide the representative 204 in assisting the member in order to reduce the member's cognitive load and to better understand the member's needs.

In some embodiments, if the task creation machine learning module 1302 has identified a particular project that is to be performed for the benefit of the member, the task creation machine learning module 1302 can automatically create one or more tasks 226 that may be performed in order to complete the new project. For instance, the task creation machine learning module 1302 may access a resource library maintained by a task coordination system of the task facilitation service to identify one or more tasks that may be associated with the particular project category or type of the new project identified based on the member's message 218. As noted above, the resource library may include detailed information related to different resources available for performance of a project or task. Further, the resource library may specify common tasks that are typically performed in order to complete different projects. These common tasks may be categorized according to the corresponding project category or type. Thus, based on the category or type of the new project, the task creation machine learning module 1302 may query the resource library to identify one or more tasks 226 that may be performed for the benefit of the member in order to complete the new project.

In some instances, the task creation machine learning module 1302 may use a machine learning algorithm or artificial intelligence to identify and create tasks that may be performed for completion of the identified project. For example, the task creation machine learning module 1302 may utilize historical data corresponding to previously identified projects and tasks for similarly situated members, as well as the characteristics or parameters associated with the new project, as input to a machine learning algorithm or artificial intelligence to identify a set of possible tasks that may be performed in order to complete the new project. As an illustrative example, if the new project corresponds to a move to a new city, the task creation machine learning module 1302, based on historical data corresponding to previous projects completed for similarly situated members and associated with moves to new cities, may identify one or more tasks previously performed for these similarly situated members in order to complete their moves to new cities. Accordingly, based on the identified one or more tasks, the task creation machine learning module 1302 may automatically generate one or more tasks for the new project that are specific to the member's needs and in accordance with the member's preferences. In some instances, based on the identified one or more tasks, the task creation machine learning module 1302 may retrieve task templates corresponding to these identified one or more tasks and generate new tasks using these task templates. The task creation machine learning module 1302 may populate these task templates using the information garnered from the member's one or more messages 218 exchanged over the communications session 216.

In some embodiments, if the task creation machine learning module 1302 automatically generates one or more tasks 226 for the newly identified project, the task creation machine learning module 1302 can update the representative console 1402 to present these tasks 226 to the representative 204. Through the representative console 1402, the representative 204 may review the new tasks 226 generated for the project. For instance, the representative 204, through the representative console 1402, may select a particular task 226 in order to review the parameters associated with the task 226 (e.g., timeframe for completion of the task 226, any third-party services to be engaged for completion of the task 226, any budget requirements, actions to be performed for the task, etc.). Further, the representative 204 may access the task template for the particular task 226 to provide any additional information that may be required for the task 226. For instance, if the task 226 does not indicate a budget for performance of the task 226, but the representative 204 is privy to the budget set forth by the member for completion of the task 226, the representative 204 may update the task template for the task 226 to indicate the member's budget for completion of the task 226.

As noted above, the task creation machine learning module 1302 may automatically generate recommendations for questions that may be presented to the member regarding the presented tasks 226 based on the member's preferences. These recommendations may be provided to the representative 204 via the representative console 1402. For instance, when a representative 204 interacts with a particular task 226, the task creation machine learning module 1302, via the representative console 1402, may provide these recommendations to the representative 204. This may allow the representative 204 to readily determine what additional information may be required from the member in order to complete definition of the project and corresponding tasks 226.

Through the representative console 1402, the task creation machine learning module 1302 may provide the representative 204 with an option 1406 to define additional and/or alternative tasks for the new project. For instance, if the representative 204 identifies additional tasks that the member would like additional assistance with for the project, the representative 204 may select the option 1406 to access task templates for these additional tasks in order to define these additional tasks. If the representative 204 defines a new task for the project, the new task may be added to the tasks 226 presented via the representative console 1402 for the new project. In some instances, if the representative 204 creates a new task for the project, the task creation machine learning module 1302 can add this new task to the historical data that may be used by the task creation machine learning module 1302 to identify tasks for similar projects and for similarly situated members. Thus, if the representative 204 adds, removes, or modifies tasks for a particular project, the task creation machine learning module 1302 may automatically use this data to further train the machine learning algorithm or artificial intelligence used to automatically generate tasks for projects that are to be performed for the benefit of similarly situated members.

Additionally, while the example of FIG. 14 is discussed with respect to creation of new tasks using a task creation machine learning module 1302, the above described operations can be used in modification of an existing task, or creation of subtasks for an existing task. For example, if a text is received following message 1408 "my move has been delayed for 8 weeks", the NLP systems described above can tag the message as being associated with the existing "move" task, and can then further analyze the data in the message to modify existing data in a task template or metadata structure. In some such implementations, a notification can be sent to an assigned representative and/or to the member asking for confirmation that a deadline associated with a task is to be changed in the system's task data structures. Similarly, if there are multiple tasks with similar metadata (e.g., a personal move to a new home, and a business move to a new office location occurring simultaneously), the system can request confirmation within a chat flow to disambiguate the data in the message. Such confirmation can be used as feedback data to modify a tagging algorithm, to improve future automated tagging of messages. For example, a street name can be associated with one move, and a building name with another, such that "move to street A" can be associated with a first tag, and "move to building b" can be associated with a different tag. If the move to street A and building b are the same move to the same location, the updates to the tagging algorithm can similarly be used to identify messages with this information with a shared tag.

Figure 15:
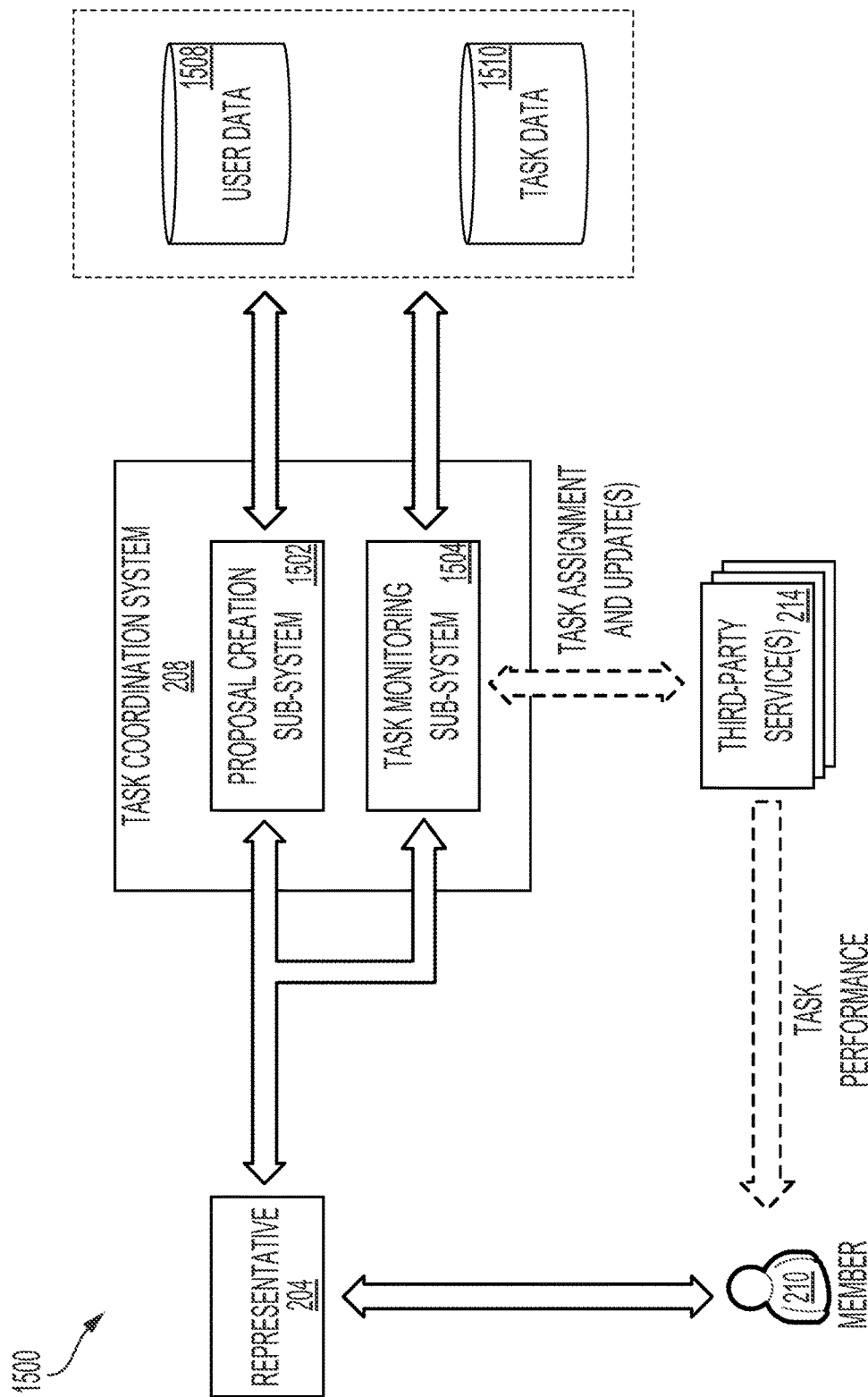
FIG. 15 shows an illustrative example of a system for chat flow management and message filtering in accordance with some embodiments.

FIG. 15 shows an illustrative example of an environment 1500 in which a task coordination system 208 assigns and monitors performance of a task for the benefit of a member 210 by a representative 204 and/or one or more third-party services 214 in accordance with at least one embodiment. As described above with FIG. 14, the task coordination system 208 can include systems for creating and managing tasks. The subsystems for each of these creation and monitoring operations can use NLP or other message processing systems to tag chat flow messages, and use the task tags generated by the analysis to improve the operation of various aspects of system and device function.

In the environment 1500, a representative 204 may access a proposal creation sub-system 1502 of the task coordination system 208 to generate a proposal for completion of a project or task for the benefit of the member 210. The proposal creation sub-system 1502 may be implemented using a computer system or as an application or other executable code implemented on a computer system of the task coordination system 208. Once the representative 204 has obtained the necessary project or task-related information from the member 210 and/or through the task recommendation system (e.g., task parameters garnered via evaluation of tasks performed for similarly situated members, etc.), the representative 204 can utilize the proposal creation sub-system 1502 to generate one or more proposals for resolution of the project or task.

A proposal may include one or more options presented to a member 210 that may be created and/or collected by a representative 204 while researching a given project or task. In some instances, a representative 204 may access, via the proposal creation sub-system 1502, one or more templates that may be used to generate these one or more proposal options. For example, the proposal creation sub-system 1502 may maintain, within the task datastore 1210 or internally, proposal templates for different project and task types, whereby a proposal template for a particular project or task type may include various data fields associated with the project or task type.

In some embodiments, the data fields within a proposal template can be toggled on or off to provide a representative 204 with the ability to determine what information is presented to the member 210 in a proposal. The representative 204, based on its knowledge of the member's preferences, may toggle on or off any of these data fields within the template. For example, if the representative 204 has established a relationship with the member 210 whereby the representative 204, with high confidence, knows that the member trusts the representative 204 in selecting reputable businesses for its projects and tasks, the representative 204 may toggle off a data field corresponding to the ratings/reviews for corresponding businesses from the proposal template. Similarly, if the representative 204 knows that the member 210 is not interested in the location/address of a business for the purpose of the proposal, the representative 204 may toggle off the data field corresponding to the location/address for corresponding businesses from the proposal template. While certain data fields may be toggled off within the proposal template, the representative 204 may complete these data fields to provide additional information that may be used by the proposal creation sub-system 1502 to supplement a resource library of proposals maintained by the task coordination system 208.

In some embodiments, the proposal creation sub-system 1502 utilizes a machine learning algorithm or artificial intelligence to generate recommendations for the representative 204 regarding data fields that may be presented to the member 210 in a proposal. The proposal creation sub-system 1502 may use, as input to the machine learning algorithm or artificial intelligence, a member profile or model associated with the member 210 from the user datastore 1208, historical task data for the member 210 from the task datastore 1210, and information corresponding to the project or task for which a proposal is being generated (e.g., a project/task type or category, etc.). The output of the machine learning algorithm or artificial intelligence may specify which data fields of a proposal template should be toggled on or off. The proposal creation sub-system 1502, in some instances, may preserve, for the representative 204, the option to toggle on these data fields in order to provide the representative 204 with the ability to present these data fields to the member 210 in a proposal. For example, if the proposal creation sub-system 1502 has automatically toggled off a data field corresponding to the estimated cost for completion of a project or task, but the member 210 has expressed an interest in the possible cost involved, the representative 204 may toggle on the data field corresponding to the estimated cost.

Once the representative 204 has generated a new proposal for the member 210, the representative 204 may present the proposal and any corresponding proposal options to the member 210. Further, the proposal creation sub-system 1502 may store the new proposal in the user datastore 1208 in association with a member entry in the user datastore 1208 for the member 210. In some instances, when a proposal is presented to a member 210, the proposal creation sub-system 1502 may automatically, and in real-time, monitor member interaction with the representative 204 and with the proposal to obtain data that may be used to further train the machine learning algorithm or artificial intelligence. For example, if a representative 204 presents a proposal without any ratings/reviews for a particular business based on the recommendation generated by the proposal creation sub-system 1502, and the member 210 indicates (e.g., through messages to the representative 204, through selection of an option in the proposal to view ratings/reviews for the particular business, etc.) that they are interested in ratings/reviews for the particular business, the proposal creation sub-system 1502 may utilize this feedback to further train the machine learning algorithm or artificial intelligence to increase the likelihood of recommending presentation of ratings/reviews for businesses selected for similar projects/tasks or project/task types.

The task coordination system 208 may maintain a resource library that may be used to automatically populate one or more data fields of a particular proposal template, along with generation of task tags for instances of a particular proposal. For example, in some implementations, multiple proposals to deal with the same issue may be generated, and a member may communicate via a chat flow to select between the different options. Each option can be assigned a different task tag, and the chat flow monitoring systems with the task coordination system 208 can use the different task tags to facilitate communications and updates associated with task approval. The resource library may include entries corresponding to businesses and/or products previously used by representatives for proposals related to particular projects/tasks or project/task types or that are otherwise associated with particular projects/tasks or project/task types. For instance, when a representative 204 generates a proposal for a task related to repairing a roof near "Town A", the proposal creation sub-system 1502 may obtain information associated with the roofer selected by the representative 204 for the task. The proposal creation sub-system 1502 may generate an entry corresponding to the roofer in the resource library and associate this entry with "roof repair" and "Town A." Thus, if another representative receives a task corresponding to repairing a roof for a member located near the identified location, the other representative may query the resource library for roofers near the location. The resource library may return, in response to the query, an entry corresponding to the roofer previously selected by the representative 204. If the other representative selects this roofer, the proposal creation sub-system 1502 may automatically populate the data fields of the proposal template with the information available for the roofer from the resource library.

In conjunction with the task creation system, the task monitoring sub-system 1504 may be implemented using a computer system or as an application or other executable code implemented on a computer system of the task coordination system 208. If the coordination with a third-party service 214 may be performed automatically (e.g., third-party service 214 provides automated system for ordering, scheduling, payments, etc.), the task monitoring sub-system 1504 may interact directly with the third-party service 214 to coordinate performance of the project or task according to the selected proposal option. The task monitoring sub-system 1504 may provide any information from a third-party service 214 to the representative 204. The representative 204, in turn, may provide this information to the member 210 via the communications session between the member 210 and the representative 204 and/or through the application or web portal utilized by the member 210 to access the task facilitation service. Alternatively, the representative 204 may transmit the information to the member 210 via other communication methods (e.g., e-mail message, text message, etc.) to indicate that the third-party service 214 has initiated performance of the project or task according to the selected proposal option. If the project or task is to be performed by the representative 204 for the benefit of the member 210, the task monitoring sub-system 1504 may monitor and interact with the representative 204 to coordinate performance of the project or task according to the parameters defined in the proposal option accepted by the member 210. For instance, the task monitoring sub-system 1504 may provide the representative 204 with any resources (e.g., payment information, task information, preferred sources for purchases, etc.) that may be required for performance of the project or task. If, for example, the proposal above for the roofer is accepted, the task monitoring sub-system can be used for tracking the task through completion or cancelation. Task tags can be used throughout such operations to filter communications to representatives and members involved in the task, and to perform automated analysis and suggestion generation for facilitating task completion, such as managing reminders for a particular subtask (e.g., and an associated task tag), filtering chat or generating message summaries for a given task or subtask, or other such operations.

As noted above, the representative 204, via a proposal template, may generate additional proposal options for businesses and/or products that may be used for completion of a project or task. For instance, for a particular proposal, the representative 204 may generate a recommended option, which may correspond to the business or product that the representative 204 is recommending for completion of a task. Additionally, in order to provide the member 210 with additional options or choices, the representative 204 can generate additional options corresponding to other businesses or products that may complete the task. In some instances, if the representative 204 knows that the member 210 has delegated the decision-making with regard to completion of a project or task to the representative 204, the representative 204 may forego generation of additional proposal options outside of the recommended option. However, the representative 204 may still present, to the member 210, the selected proposal option for completion of the project or task in order to keep the member 210 informed about the status of the project or task. Each of such proposals can be assigned a task tag by a system, and the unique task tags can be used to monitor the status of such proposals. Additionally, acceptance, rejection, or no action status information for such proposals can be used with task tags to provide feedback to algorithms used in generating the task proposals.

For any aspect of the task proposals above, reminders can be created for any aspect of the task. Such reminders can involve data related to sub-tasks, elements of a task proposal, costs, timing, or any such details. Reminders can involve follow-up information related to member questions, or information request from a member. For example, a system can generate a tentative proposal can identify aspects of a task that require clarification from a member before a completed proposal is ready. A user can generate questions about task pricing or subtasks which can result in requests for clarification from a representative, and reminders can be generated in association with any request for action or information from the member.

Member interaction with reminders generated as part of a provided proposal, or any aspect of member interaction with a provided proposal, can be accessed by a feedback system of the proposal creation sub-system 1502 or a feedback system of the task monitoring sub-system 1504. Such feedback systems may be used to further train a machine learning algorithm or artificial intelligence used to determine or recommend what information should be presented to the member 210 and to similarly-situated members for similar projects/tasks or project/task types. Additionally, as described below, the feedback systems can update or alter an algorithm used in associated with task reminders that are presented within a task chat flow. Such feedback systems as part of any aspect of the task coordination system 208 may automatically, and in real-time, monitor or track member interaction with the proposal, task reminders, or interactions with an application on a member 210 device to determine the member's preferences regarding the information presented in the proposal for the particular project or task, as well as timing or placement of reminder prompts within a chat flow. Such feedback systems may further involve tracking any messages exchanged between the member 210 and the representative 204 related to the proposal to further identify the member's preferences. As described herein, a task coordination system 208 can perform such tracking and system preference updates in real-time for thousands of users simultaneously as part of task coordination system 208 operation. This feedback and information garnered through member interaction with the representative 204, task interfaces, or chat flow reminders for actions regarding the proposal and tasks or sub-tasks as part of task implementation may be used to retrain the machine learning algorithm or artificial intelligence to provide more accurate or improved recommendations for information that should be presented to the member 210 and to similarly situated members in proposals for similar projects/tasks or project/task types.

In some embodiments, if a member 210 accepts a proposal option from the presented proposal, the task coordination system 208 moves the project or task associated with the presented proposal to an executing state and the representative 204 can proceed to execute on the proposal according to the selected proposal option. For instance, the representative 204 may contact one or more third-party services 214 to coordinate performance of the project or task according to the parameters defined in the proposal accepted by the member 210. Alternatively, if the representative 204 is to perform the project or task for the benefit of the member 210, the representative 204 may begin performance of the project or task according to the parameters defined in the proposal accepted by the member 210. Execution of an accepted task can initiate task monitoring sub-system 1504 to create a timeline for a task, and associated reminder operations for maintaining a task timeline. Such operations can create reminders at execution of the proposal, or can dynamically create reminder criteria that can be executed and updated by the task monitoring sub-system 1504. Such criteria can be based on a timeline for a proposal, a set of general time thresholds, or other such criteria. For example, if a task has a hard deadline, the reminder system may increase reminder frequency or reminder types as the deadline approaches. Other systems may use a set of reminder criteria, where a reminder is sent if a response has not occurred within a fixed timeframe, with reminders at fixed intervals if no action is taken.

In some embodiments, the representative 204 utilizes the task monitoring sub-system 1504 of the task coordination system 208 to manually monitor task progression and the performance of actions by a member needed as part of a task flow. In such an implementation, the representative can select reminder criteria and modify the reminder criteria during progression of a task flow, and set automated reminders to occur within a chat flow for a task in addition to any reminders sent by the representative. Task tags automatically generated by the system can be used in managing such reminders.

Once a project or task has been completed, the member 210 may provide feedback with regard to the performance of the representative 204 and/or third-party services 214 that performed the project or task according to the proposal option selected by the member 210. For instance, the member 210 may exchange one or more messages with the representative 204 over the communications session to indicate its feedback with regard to the completion of the project or task. Additionally, the user may provide feedback on the reminder system and the workload placed on the member. Such feedback may indicate whether reminders at a different frequency rate or a different time of day or day of the week would be preferable. In some embodiments, the task monitoring sub-system 1504 provides the feedback to the proposal creation sub-system 1502, which may use a machine learning algorithm or artificial intelligence to process feedback provided by the member 210 to improve the member interactions with the task coordination system 208, third-party services 214 that may perform projects and tasks, and/or processes that may be performed by a representative 204 and/or third-party services 214 for completion of similar projects and tasks. For instance, if the proposal creation sub-system 1502 detects that the member 210 is unsatisfied with the result provided by a third-party service 214 for a particular project or task, the proposal creation sub-system 1502 may utilize this feedback to further train the machine learning algorithm or artificial intelligence to reduce the likelihood of the third-party service 214 being recommended for similar projects or tasks and to similarly-situated members. As another example, if the proposal creation sub-system 1502 detects that the member 210 is pleased with the result provided by a representative 204 for a particular project or task, the proposal creation sub-system 1502 may utilize this feedback to further train the machine learning algorithm or artificial intelligence to reinforce the operations performed by representatives for similar projects and tasks and/or for similarly-situated members. Automatically generated task tags as described herein can be used for segmenting such analysis to provide feedback based on tasks and subtasks within a larger project, as well as to provide system feedback on task and subtask generation.

Figure 16:
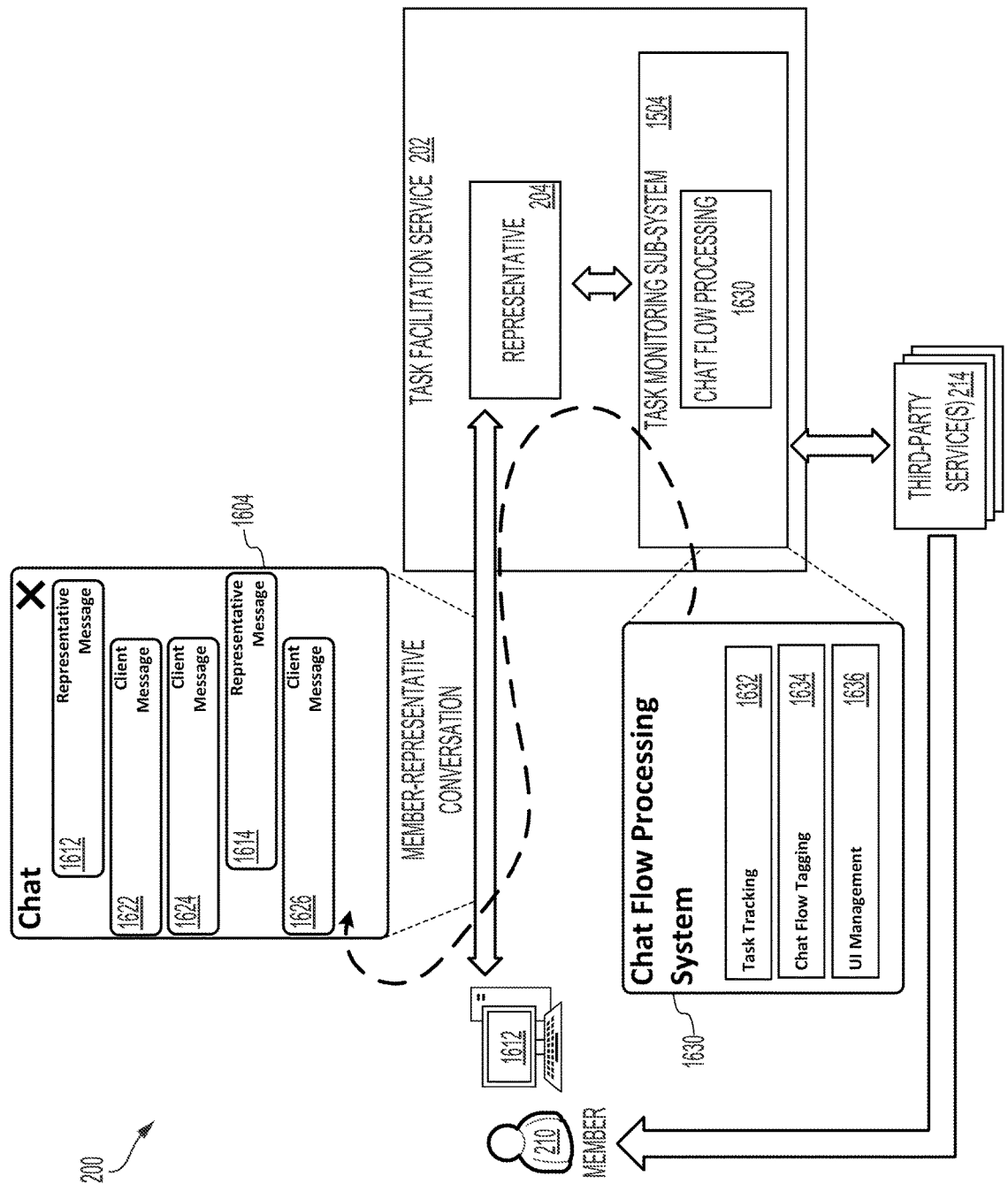
FIG. 16 shows an illustrative example of a system for chat flow management and message filtering in accordance with some embodiments.
Figure 17:
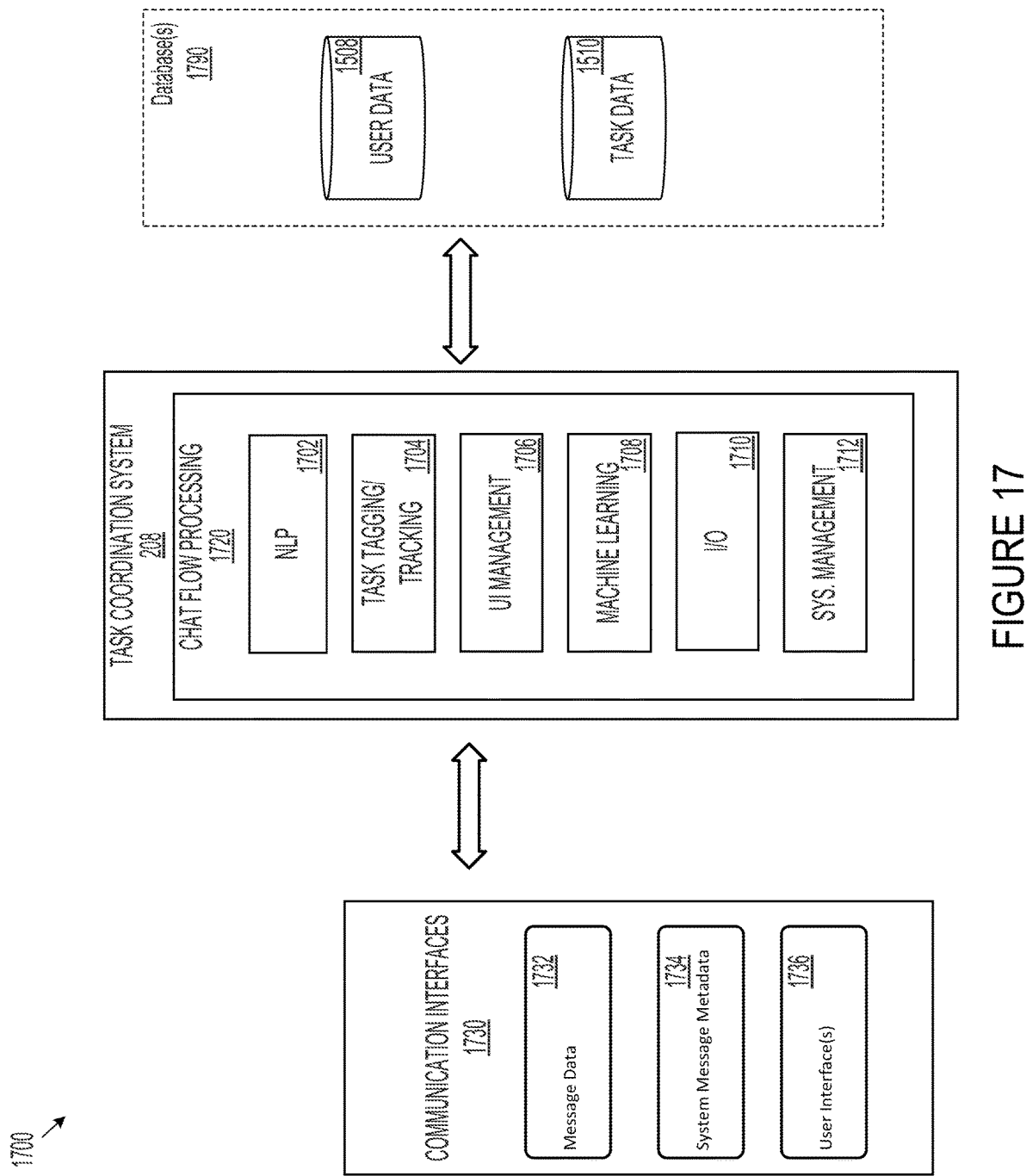
FIG. 17 shows an illustrative example of a system for chat flow management and message filtering in accordance with some embodiments.

FIGS. 16 and 17 illustrate aspects of an environment 200 implementing operations for using task tags in a chat flow as part of operations of the task facilitation service 202. The task facilitation service 202 can include elements of any system above, including the task coordination system 208 and the associated proposal creation sub-system 1502 and the task monitoring sub-system 1504 that can be used for establishing task tags and facilitating tasks as described herein. In the example of FIGS. 16, the real-time chat flow processing system 1630 is part of a task monitoring sub-system 1504 of the task facilitation service 202. Additionally, FIG. 16 includes the task facilitation service 202 as including representative device 204 in communication with member device 1612 and member 1610. Various devices and systems may additionally interact with third-party service(s) 214 to support task generation and execution using the task facilitation service 202 for the member device 1612 and the member 210.

As described above, a task monitoring sub-system 1504 or other such systems can include further sub-systems for real-time chat flow processing, such as the chat flow processing system 1630. The chat flow processing system 1630 includes task tracking system 1632, chat flow tagging system 1634, and user interface (UI) management systems 1636. Additional implementations of a chat flow processing system can include other such systems, or different system configurations with combined or split structures.

In the implementation of FIG. 16, the chat flow tagging system 1634 can implement a tagging algorithm as described herein to match a message to a task tag. The chat flow tagging system 1634 can interact with another system that generates task tags, and can then process the real-time message data of the chat flow 1604 with representative messages 1614, 1615, and 1616, and client (e.g., member) messages 1622, 1624, and 1626 to match data of the messages to tasks in the system. In some implementations, an unmatched tag can additionally be used when a message does not match an existing task tag after processing with the chat flow tagging system 1634. Such unmatched messages may be passed to another system such as the task tracking system 1632 for additional analysis and possible creation of a new task or new tasks.

The task tracking system 1632 can include a task or tag generation algorithm as described above to process information in a chat flow to identify how existing tasks are represented within message data of the chat flow 1604, and to identify options for additional generation or recommendation of task tags for new tasks or subtasks. Such an algorithm can, for example, use task template information, NLP data, or other such data to process messages that are not tagged by the chat flow tagging system 1634, or can identify task tags with a small or large volume of message flows within the chat flow 1604. Task tags with deadlines and a small message flow (e.g., less than a threshold number of messages per day, per week, or per percentage of task time remaining until a deadline) can be processed by the task tracking system 1632. to generate automated reminders within the chat flow 1604. For example, if a task is generated with one month until a deadline, and one week passes without any messages within the chat flow identified as associated with the task, the task tracking system 1632 can automatically generate a reminder for the task. For task tags with a message flow above a threshold (e.g., which can be set automatically or adjusted by a member or representative), the messages for the associated tag can be processed for possible sub-task tag creation, or identification of an issue or problem occurring with facilitation of the task.

The UI management system 1636 can use user preferences or system settings to customize the UI display of the chat flow 1604. As indicated above, a chat forward communication interface can, in some implementations, include a single chat flow with messages associated with a wide variety of tasks or topics. As the rate of message exchange increases, however, such a single chat flow can overwhelm a member. Aspects described herein can use a combination of member preferences and dynamic automated chat flow customization to create multiple chat flows, with each chat flow having a separate chat scroll interface (e.g., separate chat flows or chat flow displays). The UI management system 1636 can track chat message metrics using task tags and tracking data from the task tracking system 1632 and the chat flow tagging system 1634 to dynamically determine how messages are divided between chat flows, and when to separate messages that are in a single chat flow into multiple chat flows. For example, a system may use a general chat flow for messages having tags not associated with an existing task. If messages are received that are associated with a task proposal that is then accepted, a new task tag can be assigned to those messages, and the messages can be moved from a general chat flow to a dynamically generated chat flow. For example, the message 218 "I need help planning a move to a new home next month" can initially be processed as a request that is assigned to a task proposal, and kept in a general chat flow until the task proposal is generated and approved. When the task proposal is approved, a new chat flow interface can be dynamically generated, and messages such as the message 218 that were generated or sent within the system before approval of the task proposal can be moved from the general chat flow to the chat flow for the move task. As new messages are received, the chat flow tagging system 1634 can tag messages with associated tags, which allows the messages to be displayed (or not displayed) in various chat flow UI screens.

If a task such as the move task becomes complex or has a chat flow that exceeds certain thresholds, for example if mover scheduling, brokerage/sale communications for the old house, repair and maintenance communications associated with the old home and the new home, communications regarding utility management, and other such sub-tasks overwhelm a single chat flow for the move task, algorithms or AI analysis of the different sub-tags or sub-task information can be used to segment the move task communications into two or more chat flows. For example, communications associated with the old home (e.g., packing, home sale, etc.) can be tagged with a move task old-home tag, and displayed in one chat flow interface, and communications associated with the new home (e.g., utility turn-on, move-in checklists, etc.) can be in a separate chat flow. In some implementations, if a task has many different sub-tags and sub-tasks, an AI system can recommend possible chat flow segment groups that can be approved by the representative 204 or the member 210, or the AI systems or algorithms can dynamically adjust the chat flow, with automated messaging to member device(s) 1612 and representative devices 204 indicating the chat flow split. Similarly, when a chat flow split occurs, a pinned message may be placed in one or more of the chat flows describing how the sub-task tags distribute messages between the different chat flow interfaces.

Additionally, in some implementations, the UI management system 1636 stores information or user interaction data associated with message display size, numbers of messages presented at a given time within a display, or other such details. The UI management system 1636 can additionally track different member devices 1612, including screen size and device specific display preferences. The automated chat flow splitting described above can, in some implementations, be based on display size or other such characteristics associated with a particular member device 1612 that is most often used by a member.

Feedback data, such as user interaction or response to certain messages, explicit feedback related to reminders, or member messages identifying problems with tag based chat filtering can be used by learning systems to provide feedback to algorithms used in task tracking system 1632, the chat flow tagging system 1634, and UI management systems 1636. Additionally, after completion or closure of a task, a representative device 204 can be used to provide feedback on the operation of any system, with the feedback used to update training data, algorithm weights or settings, or any aspect of the chat flow processing system 1630 to improve performance. The chat flow processing system 1630 can process messages for not only one user, but for thousands of user simultaneously. Certain types of feedback described herein can be used from one user's task to update the algorithms used to process another user's chat flow. As many thousands of messages are being processed simultaneously in real-time such feedback can be used to dynamically update the algorithms used for tagging and task tracking at the same time that the messages are being processed.

Additionally, any such elements of the chat flow processing system 1630 can generate output data which is used as chat flow metadata by the service 202. For example, the service 202 can include a database that stores message data for the chat flow 1604 along with associated tags or any other such metadata (e.g., deadlines, member preferences, etc.). The metadata can be stored not only in a central database, but can be sent to the member device 1612 for use locally, as well as the representative device 204. For example, in some implementations, a filtering user interface (UI) element 1660 can be presented within a chat interface for the chat flow 1604. Such a UI element 1660 can be dynamically updated based on the tags associated with messages currently within the chat flow 1604. The chat flow 1604 can include messages not currently presented in a chat interface due to limited interface space, and selection of a pre-filtering input from the options presented within the filtering UI element 1660 can remove certain messages from the chat interface, allowing the member to respond more efficiently to information for a selected task flag based on the local metadata. A representative device 204 or the member device 1612 can similarly use cloud-based metadata if local metadata is not available. As new tasks or sub-tasks are automatically created or marked as completed, the filtering UI element 1660 can be updated dynamically and in real-time. Additionally, real-time processing by the chat flow tagging system 1634 can allow new messages with task tags to be filtered based on pre-filtering selections from the UI element 1660 as the messages are received.

FIG. 17 then illustrates an additional implementation of an environment 1700 including a task coordination system 208 with additional elements of a chat flow processing system 1720. The chat flow processing system 1720 can be an alternate implementation of the chat flow processing system 1630 of FIG. 16. As described above, the task coordination system 208 or other such systems for task facilitation (e.g., task generation systems, etc.) can use the chat flow processing system 1720. The chat flow processing system can, in come implementations, access databases 1790 which can store message data and other information as user data 1508, task data 1510 (e.g., when tagged with a task tag), or any other such data structure. The data in databases 1790 can include member preferences, member histories, member specific modifications to system algorithms based on history data for the user or similar users, user preference indications, or any other such data. The algorithms or machine learning systems of the chat flow processing system 1720 can use such data in facilitating tasks as described herein.

Additionally, the chat flow processing system 1720 can, in some implementations, manage one or more chat flows within communication interface system 1730 for a member, as well as for any number of members. A communication interface 1730 as described herein includes one or more chat flows which are used in grouping and displaying messages within a set of chat data. The chat flows of communication interfaces 1730 can include all chat messages exchanged between a member and a task facilitation service, or can include messages separated by some criteria. For example, in some implementations, a project (e.g., a high level task) can have a separate chat flow within communication interfaces 1730, with tagging within the separate chat flows of communication interfaces 1730 for the task based on sub-tasks that are part of the task. In some implementations, such separation of tasks can occur automatically based on task creation operations as described herein, or the separation can be based on member preferences or selections, or representative preferences or selections.

A chat flow of the communication interfaces 1730 can have one or more associated chat interfaces 1736, which refers to a placement of chat messages 1732 and any additional supporting elements (e.g., filter elements, size customizations, color customization inputs, etc.) A chat flow of communication interface 1730 can include messages which are not currently displayed within a chat interface 1736 (e.g., hidden messages) within a given chat flow of communication interfaces 1730, but that can be navigated to via UI selections (e.g., scrolling or filtering). The communication interfaces 1730 can additionally include metadata 1734, such as assigned tags, assigned display status, deadline metadata, urgency metadata, display customization metadata, or other such metadata related to message data 1732 for a given chat flow of the chat interfaces 1730. As described above, a task facilitation system can include various UI elements for navigating between task pages and associated UIs 1736 for chat flows of the communication interfaces 1730 to facilitate completion of various tasks.

The chat flow processing system 1720 includes an NLP system 1702, a task tracking system 1704, a UI management system 1706, a machine learning system 1708, an input/output (I/O) system 1710, and a system management module 1712. The NLP system 1702 can operate as described above to parse text of incoming messages and provide associations as part of various algorithms, including task matching for task tags, task creation recommendations for new tasks or sub-tasks, or associations with multiple tags. For example, if a member has five associated tasks being managed by a system, with a first representative helping with three of the tasks, and a second representative helping with two of the tasks, a message from the first representative "I will be away for one week" can be processed by the NLP system 1702 and other systems to include three task tags for the message associated with the three tasks the first representative is assisting with. A similar message from a back-up representative indicating coverage for the week can be assigned the same three task tags. The task tracking system 1704 can operate as described above in FIG. 16, and can interact with the NLP system 1702 to track task progress, such as updating metadata with the messages described above to identify a currently responsible representative. Similar analysis can be used for generating reminders for tasks with deadlines, or other such operations.

In some implementations, the reminders generated by the task tracking system 1704 can simply be a text message within a real-time chat flow of communication interfaces 1730. In other implementations, interaction with the automated reminder provides a quick interface. The illustrated quick interface provides an option to ignore or delay the reminder using an ignore/snooze interface element. If the reminder is ignored, the automated reminder can be removed from the real-time chat flow. In some implementations, the ignore input can be communicated to the representative 204, to identify why the system created an automated reminder that the member is ignoring. Such a communication to the representative device 204 may be used to generate feedback for a learning system, to improve selection of future reminders. Such feedback may identify an error by the member 210, a misalignment of priorities between the member and the task facilitation service 202, or a misunderstanding of task deadlines by the member 210.

The UI management system 1706 can operate as a centralized system for default chat interface 1736 configuration, customization of the chat interfaces 1736 based on a current member device, or other such operations. The machine learning system 1708 can operate as described above for any machine learning system to perform real-time processing of messages or NLP system 1702 outputs, which can then be used in various ways for tagging, task tracking, or other such operations.

I/O systems 1710 operate as device supports for communications to and from the task coordination system 208, a member device, a representative device, databases, or other such system computing resources as described herein. The system management module 1712 can manage integration of various systems, such as creation and management systems of task coordination system 208, load balancing of resources for large numbers of member chat flows, or other such system operation for real-time processing and tagging of task messages.

Figure 18:
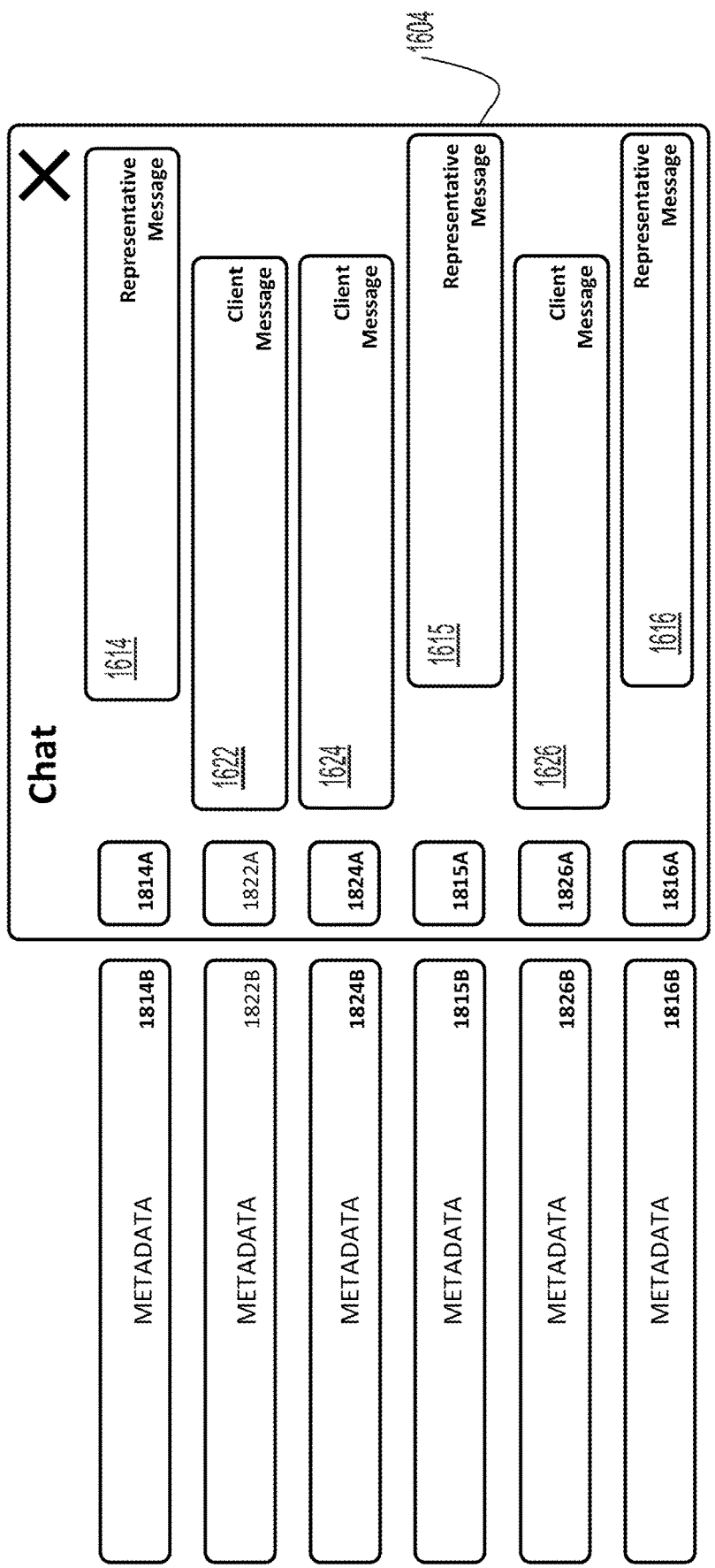
FIG. 18 illustrates aspects of an interface and data display structures for a chat flow in accordance with some embodiments.

FIG. 18 then illustrates additional aspects of a chat flow UI 1604, having messages 1614, 1615, 1622, 1624, and 1626. Each of the messages has corresponding metadata, along with UI elements corresponding to the metadata. For example, the message 1614 has corresponding metadata 1814B and UI element 1814A. Similarly, messages 1614, 1622, 1624, and 1626 having corresponding metadata 1815B, 1816B, 1822B, 1824B, and 1826B, along with corresponding UI elements 1815A, 1815A, 1822A, 1824A, and 1826A. The user interface elements can include dynamic visual indicators associated with metadata, as well as interactive elements associated with displaying or hiding all messages having similar metadata tags. Such UI elements can allow a member to manage display of filtered messages within the chat flow 1604. In addition, other implementations can include other user interface settings for pre-filtering messages to be displayed within the chat flow 1604. For example, once a pre-filtering input is received, messages received in real-time are processed to associate tags or other task affiliations with each message, and messages tagged with task tags identified for hiding in one or more chat flows are automatically hidden until the associated pre-filtering setting for that type of message is changed. As described herein, some messages can have multiple tags, and the UI element display indicators and associated tags can be managed in different ways. For example, a display preference or urgent flag associated with a message can override a hide setting for a tag associated with a task tag set for hiding in a certain display. Such settings can be across multiple chat flow interfaces, individual chat flow interfaces, or any other such preferences. Similarly, UI elements can, in some implementations, include display preferences associated with display size for a certain task tag, a number of messages to display in an interface customized for a user device, a task tag, and any other such metadata.

Figure 19:
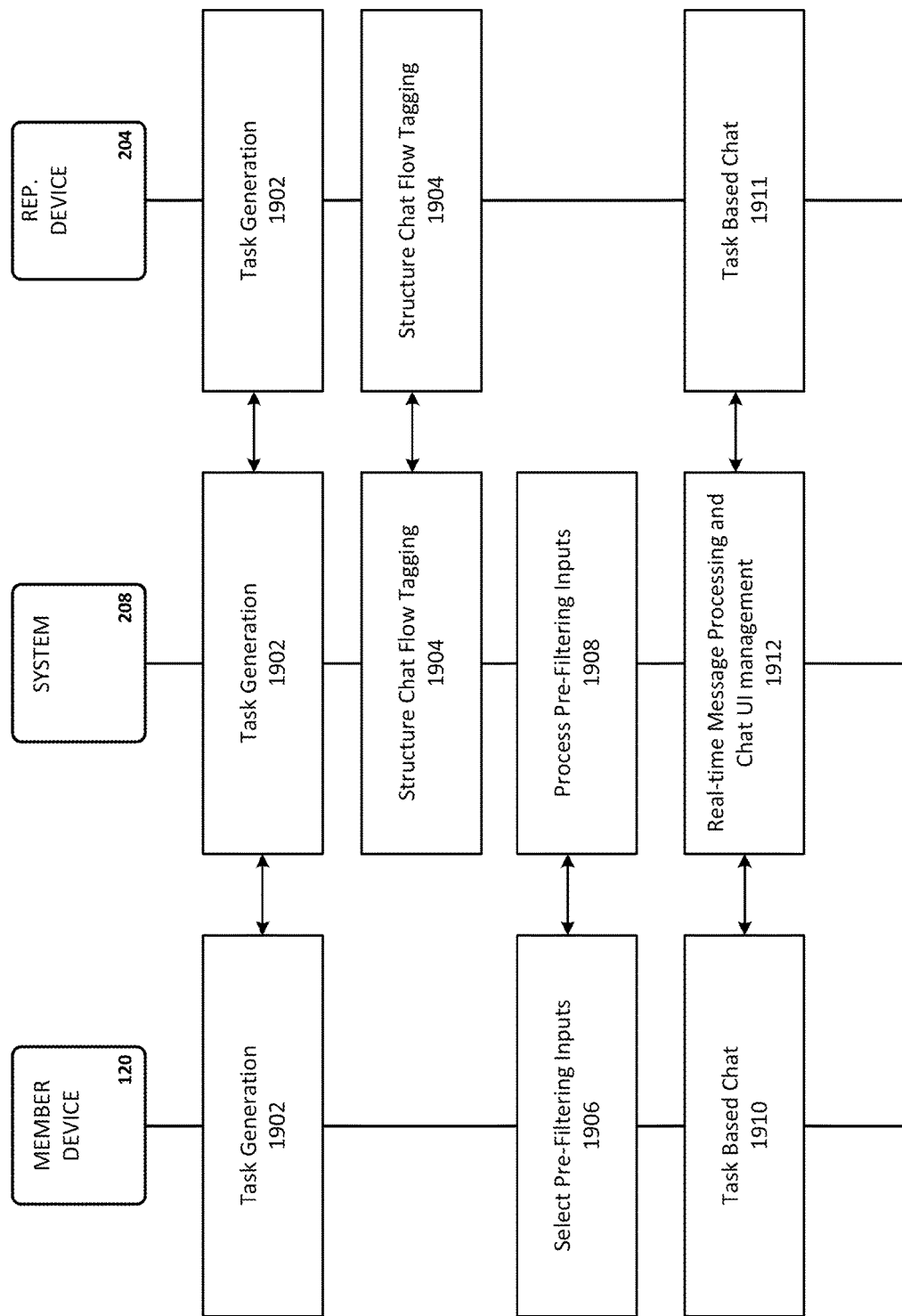
FIG. 19 illustrates aspects of systems and processes for message management and filtering within the chat flow of a task system, in accordance with some embodiments.

FIG. 19 then shows a process flow in a system including a member device 120, a task management system 208, and a representative device 204. In the implementation of FIG. 19, the member device and the representative device 204 exchange messages which can be processed by the system 208 for task generation as part of operations 1902. When a task is proposed or approved, the system 208 or the representative device 204 select task tags for the task in operations 1904. Such task tags can be predefined by a task template, with customization by the representative device 204 or an algorithm analyzing messages, user preferences, or other data stored in the system as part of task generation operations 1902. System tags can be defined automatically by the system 208 using AI or machine learning systems that are improved with feedback based on representative device 204 changes, member feedback, feedback received following task completion or abandonment, or any other such feedback.

Once the tags for a task are defined in operations 1904, the list of task tags can be provided to the member device 120 in operations 1906, and the system can process any pre-filtering inputs selected based on the provided task tags in operations 1908. The system 208 can then process real-time communications between the member device 120 and the representative device 204 in operations 1910, 1911 to implement real-time message processing and chat UI management in operations 1912. Such operations can include segmentation of messages between different chat flow UI displays, automatic generation of new chat flow UI options or displays, and filtering of messages presented in a member device 120 chat flow display, as described above.

Figure 20:
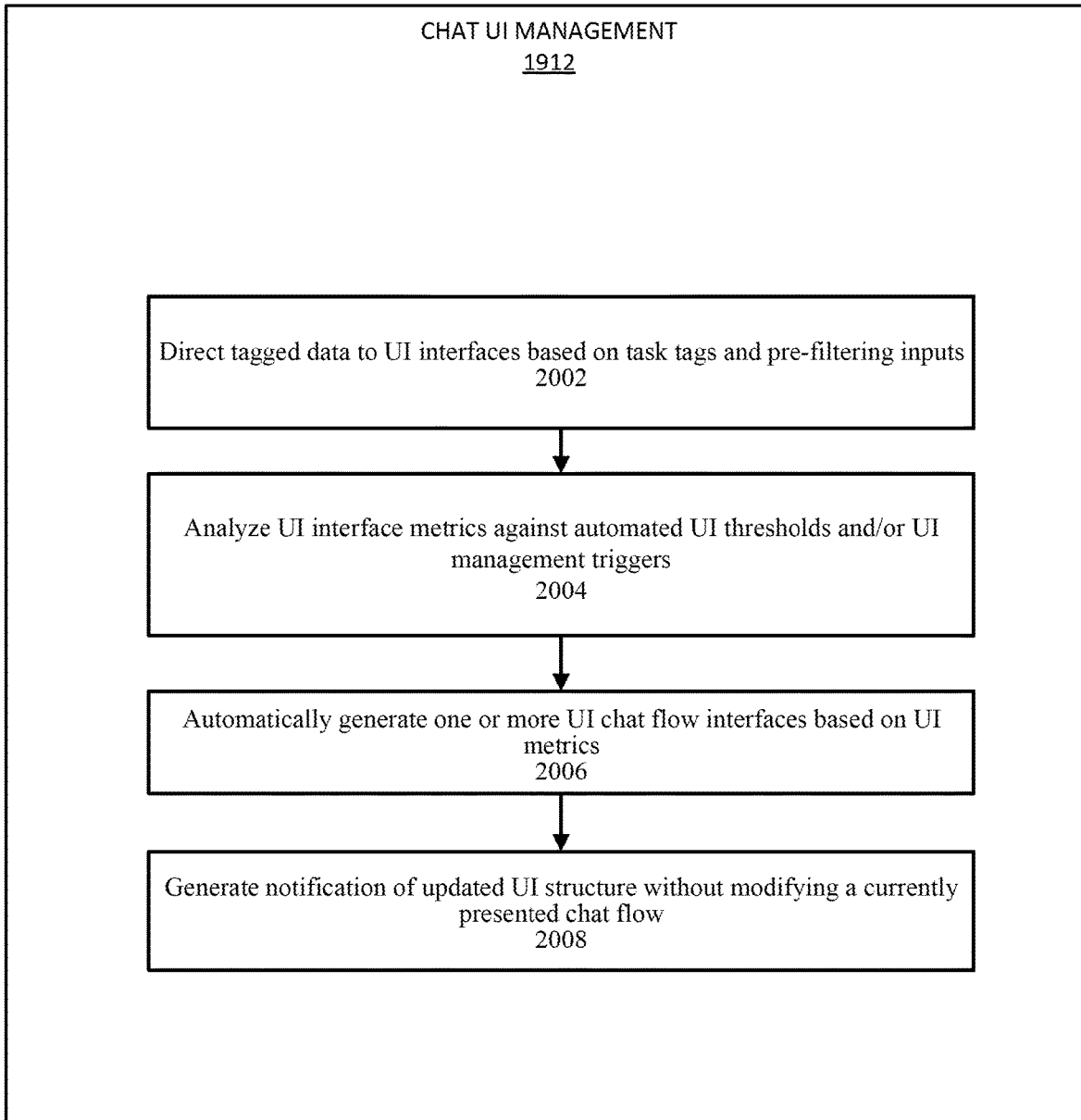
FIG. 20 shows a flowchart for a method for managing a dynamic chat flow interface used to facilitate interactions between a service member and a representative in accordance with some embodiments.

FIG. 20 illustrates aspects of chat UI management operations 1912 in accordance with some aspects. When tagged data (e.g., data processed in real-time to associate task tags) are made available to chat flow UI systems, the direct tagged data can be displayed based on task tags and pre-filtering inputs to display or hide messages in operations 2002. In operations 2004, the UI interface metrics (e.g., number of messages per time period, number of messages/text characters/words displayed, etc.) are analyzed against UI thresholds or UI management triggers implemented by system algorithms or machine learning. In operation 2006, additional chat flow interfaces are generated based on the UI metric comparison against the UI thresholds or management triggers. Such interface generation can occur while the system is processing additional messages. Operation 2008 can then involve generation of a notification of an updated UI structure without modifying a structure of the presented chat flow on a member device. For example, in some implementations, a chat flow display such as the chat flow 1604 can be displayed on a user device can include a UI element pop-up or interface notification within the existing display structure. In other implementations, a system message can be presented within a timeline of the chat flow indicating that a chat metric threshold has been met, and that messages for a set of identified task tags or sub-task tags have been split into a new interface or will be split into a new interface when a user selection to change the interface occurs. In some implementations, the dynamic chat flow split is selected by system operations, and an existing display continues with a presented chat flow until a user interface navigation element is selected, at which point the next navigation to the messages within the prior chat flow will provide an option to select between the multiple chat flows that now contain messages formerly associated with a single chat flow.

FIG. 21 illustrate operations of method 2100. The operations of such a method can be performed by member devices such as member device 120, 212, as well as corresponding operations performed by server computers implementing task facilitation service(s) 102, 202. In some aspects, the methods are embodied as instructions stored in a computer-readable storage medium that, when executed by one or more processors of a device, cause the device to perform operations of the illustrated methods. Some aspects include displays coupled to processors to enable user interfaces. The user interfaces facilitate functions to improve device operations with task management and information presentation to reduce user interaction times to process information and to reduce a member's cognitive load associated with tasks and subtasks via service 102, 202. This can include not only presentation and sorting of messages and associated data via chat flow interfaces, but machine learning algorithm processing of messages to automatically generate or modify tasks, and to generate user interfaces customized for task information to provide device functionality to a member with reduced device interaction and an overall decrease in cognitive load for a member.

Method 2100 includes operations to generate, present, and use feedback for a chat flow interface associated with a task system in accordance with examples described herein. The method 2100 includes operations 2102 for receiving one or more pre-filtering inputs from a member, wherein the one or more pre-filtering inputs include task associations to identify a first message type to display from a real-time chat interface based on the task associations, and a second message type to hide based on the task associations. The method 2100 further includes the operations 2104 for receiving in real-time a set of messages between the member and a representative as the set of messages are being exchanged. The method 2100 further includes the operations 2106 for processing the set of messages in real-time using a filtering algorithm to associate one or more tasks with messages of the set of messages, wherein the one or more tasks correspond to a set of tasks performable by the representative on behalf of the member. The method 2100 further includes the operations 2108 for displaying a first message of the set of messages in the real-time chat interface based on the one or more pre-filtering inputs and a first task association with the first message. The method 2100 further includes the operations 2110 for hiding a second message of the set of messages in the real-time chat interface based on the one or more pre-filtering inputs and a second task association with the second message.

Some such methods operate where the one or more tasks are selected from a set of approved project recommendations generated by a task proposal creation sub-system and approved using a task creation sub-system.

Some such methods operate where the filtering algorithm uses a natural language processing (NLP) system with machine learning to select the one or more tasks.

Some such methods operate where displaying the first message and hiding the second message comprises sorting the first message into a first chat flow interface for the first task association, and sorting the second message into a second chat flow interface for the second task association.

Some such methods operate where the filtering algorithm calculates messaging metrics for each task of the one or more tasks; wherein the filtering algorithm generates one or more chat flow interfaces for the one or more tasks based on the messaging metrics; and wherein the filtering algorithm dynamically generates a new chat flow interface for a sub-task of the one or more tasks based on the messaging metrics for the sub-task exceeding a threshold as the first message is displayed in the real-time chat interface.

Some such methods can further involve operations for receiving an updated pre-filtering input; and dynamically adjusting the real-time chat interface to display the second message and one or more additional real-time messages associated with the second task association.

Some such methods can further involve operations for receiving updated pre-filtering inputs as the messages are displayed; and updating displaying of the first message and the second message in real time in response to the updated pre-filtering inputs.

Additional operations to support the method above can include operations for processing the set of messages to identify one or more task flags associated with the set of messages, wherein the one or more task flags correspond to a set of tasks performable by the representative on behalf of the member. As described above, the task flags can be pre-generated by an approval or task generation process, or can be newly generated during processing of the messages in real-time. Additional operations can involve tracking a chat flow within a chat interface, wherein the set of messages are exchanged within the chat interface. Such tracking can involve processing content between multiple messages in a chat flow. Some such methods can further involve operations for processing the chat flow using a tagging algorithm to automatically assign at least one of the one or more task flags to messages of the set of messages. For pre-determined (e.g., previously approved tasks) tasks, such operations can involve a tagging algorithm to match existing tags to content of the set of messages. For new tag generation, a task generation algorithm can be used with messages determined not to match an existing active tag (e.g., a tag for a task or approved project that has not been completed). Some such methods can further involve operations for generating a message history including the set of messages and corresponding task flag assignments with associated tasks of the set of tasks.

In various implementations, methods in accordance with aspects described herein may further involve operations for processing the message history to generate a new task recommendation using a recommendation algorithm based on the one or more task flags and a timing of the set of messages within the chat flow, or operations for processing the chat flow using the tagging algorithm that further involve generating a plurality of subtasks for the at least one of the one or more task recommendations based on content of the set of messages within the chat flow and assigning one or more subtask tags to corresponding messages of the set of messages.

In some implementations, such a method can further operate where processing the chat flow using the tagging algorithm comprises generating a plurality of subtasks for the at least one of the one or more task recommendations based on content of the set of messages within the chat flow and assigning a plurality of subtask tags to a first message of the set of messages.

Some such methods can also or alternatively further involve receiving a pre-filtering input from a member device, wherein the pre-filtering input identifies a task flag of the one or more task flags, processing the message history using the pre-filtering input to adjust display of messages within the chat interface, receiving real-time messages between the member and a representative as the set of messages are being exchanged, processing the real-time messages in real-time using a filtering algorithm to associate one or more flags with messages of the real-time messages, displaying a first message of the real-time messages in the chat interface based on the pre-filtering input and a first task association with the first message, and hiding a second message of the real-time messages in the chat interface based on the pre-filtering input and a second task association with the second message.

Some implementations of the methods described herein can further involve receiving a tag association change message from a representative device associated with the representative, updating the message history to modify a tag associated with one or more messages based on the tag association change message, and updating the tagging algorithm using the tag association change message.

Some implementations of the methods described herein can further involve receiving a task completion notification associated with the set of messages and the one or more task flags, updating the message history to include a task completion flag associated with the one or more task flags and a task verification tag associated with assignment of the at least one of the one or more task flags to messages of the set of messages, accessing a plurality of message histories and task association data for corresponding completed tasks, wherein the plurality of message histories each include a task completion flag associated with the one or more task flags, and training the tagging algorithm using the plurality of message histories and task verification tags within the plurality of message histories, wherein the tagging algorithm comprises a machine learning algorithm configured to match message data with corresponding task flags.

The methods and operations described above are illustrative, and it will be apparent that such methods may involve repeated operations or operations with intermediate steps. Such repeated or intermediate steps may particularly occur as computer-implemented systems simultaneously perform operations for large numbers (e.g., thousands, millions, etc.) of messages and users. Additionally, similar methods which to not exactly match the described operations above are possible within the scope of the innovations described herein.

Figure 22:
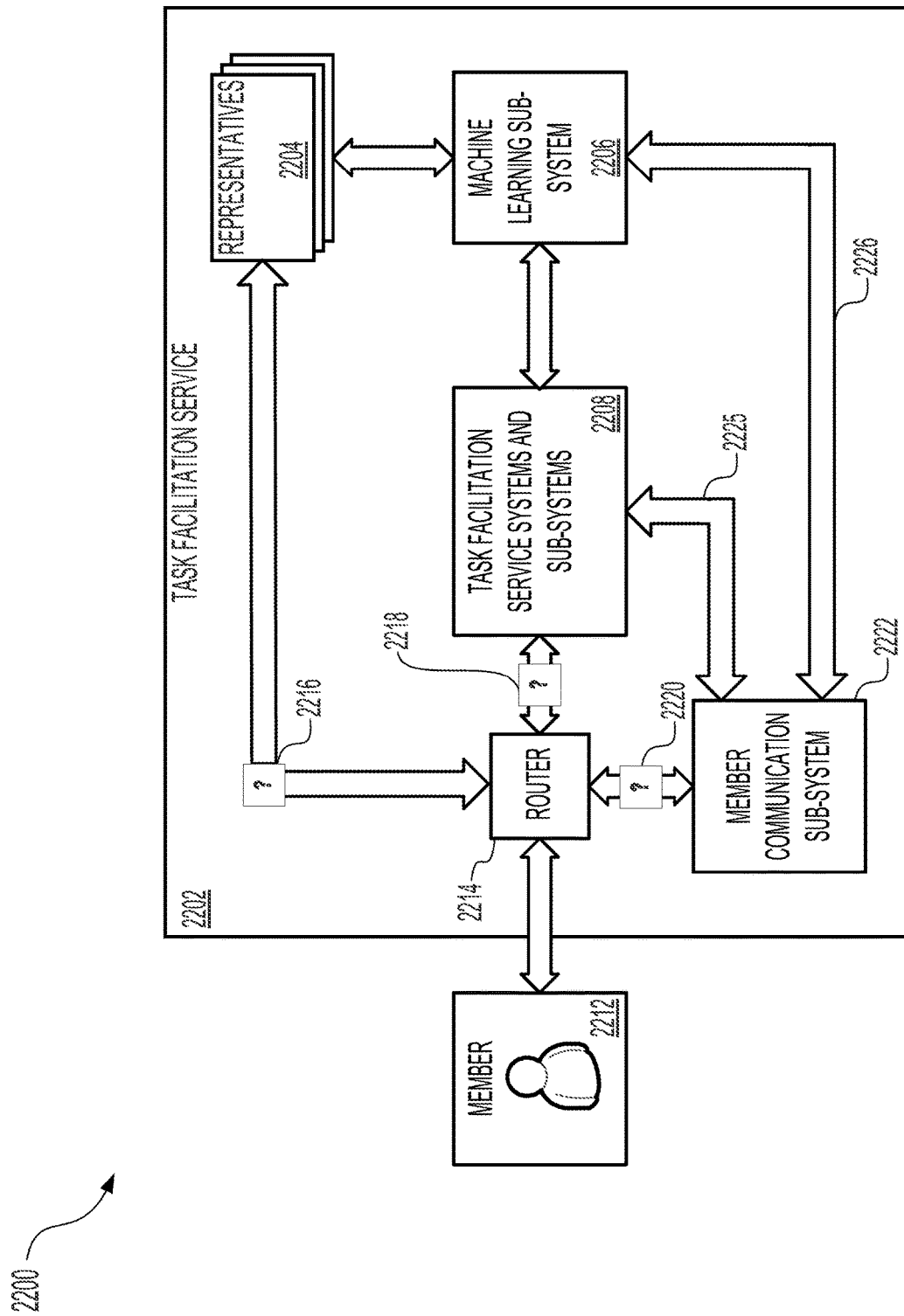
FIG. 22 shows an illustrative example of an environment in which communications with members are processed in accordance with at least one embodiment.

FIG. 22 shows an illustrative example of an environment 2200 in which communications with members are processed in accordance with at least one embodiment. In some embodiments, operations performed by representatives 2204 are partially and/or fully performed using one or more machine learning algorithms, artificial intelligence systems and/or computational models. For example, as the representatives 2204 perform or otherwise coordinate performance of tasks on behalf of a member 2212, the task facilitation service 2202 may update a profile of the member 2212 and/or a computational model of the profile of the member 2212.

In some embodiments, as the representatives 2204 perform or otherwise coordinate performance of tasks on behalf of a member 2212, the task facilitation service 2202 updates a profile of the member 2212 and/or a computational model of the profile of the member 2212 continuously. For example, as a member 2212 communicates with a system of the task facilitation service 2202, the task facilitation service 2202 may update the profile of the member 2212 and/or a computational model of the profile of the member 2212 continuously during the course of the interaction.

In some embodiments, as the representatives 2204 perform or otherwise coordinate performance of tasks on behalf of a member 2212, the task facilitation service 2202 updates a profile of the member 2212 and/or a computational model of the profile of the member 2212 dynamically. For example, as a task is performed on behalf of a member 2212, a vendor performing the task may provide regular updates to the task facilitation service 2202 and the task facilitation service 2202 may update the profile of the member 2212 and/or a computational model of the profile of the member 2212 dynamically at each update from the vendor.

In some embodiments, as the representatives 2204 perform or otherwise coordinate performance of tasks on behalf of a member 2212, the task facilitation service 2202 updates a profile of the member 2212 and/or a computational model of the profile of the member 2212 automatically. For example, when a proposal is generated for the member, the task facilitation service 2202 may update the profile of the member 2212 and/or a computational model of the profile of the member 2212 automatically as part of the proposal generation process.

In some embodiments, as the representatives 2204 perform or otherwise coordinate performance of tasks on behalf of a member 2212, the task facilitation service 2202 updates a profile of the member 2212 and/or a computational model of the profile of the member 2212 in real-time. For example, when a member 2212 accepts a proposal, the task facilitation service 2202 may update the profile of the member 2212 and/or a computational model of the profile of the member 2212 at the time that the proposal acceptance is provided, rather than delaying the update.

In some embodiments, the task facilitation service 2202 updates a profile of the member 2212 and/or a computational model of the profile of the member 2212 using a machine learning sub-system 2206 of the task facilitation service 2202. In some embodiments, a machine learning sub-system 2206 is a component of the task facilitation service 2202 that is configured to implement machine learning algorithms, artificial intelligence systems, and/or computation models. In an example, a machine learning sub-system 2206 may use various algorithms to train a machine learning model using sample and/or live data. Additionally, a machine learning sub-system 2206 may update the machine learning model as new data is received. In another example, the machine learning sub-system 2206 may train and/or update various artificial intelligence systems or generate, train and/or update various computational models. For example, a computational model of the profile of the member 2212 may be generated, trained and/or updated by the machine learning sub-system 2206 as new information is received about the member 2212.

In some embodiments, after the profile of the member 2212 and/or a computational model of the profile of the member 2212 has been updated over a period of time (e.g., six months, a year, etc.) and/or over a set of tasks (e.g., twenty tasks, thirty tasks, etc.), systems of the task facilitation service 2202 (e.g., a task recommendation system) utilize one or more machine learning algorithms, artificial intelligence systems and/or computational models to generate new tasks continuously, automatically, dynamically, and in real-time. For example, the task recommendation system may generate new tasks based on the various attributes of the member's profile (e.g., historical data corresponding to member-representative communications, member feedback corresponding to representative performance and presented tasks/proposals, etc.) with or without representative interaction. In some embodiments, systems of task facilitation service 2202 (e.g., a task recommendation system) can automatically communicate with the member 2212 to obtain any additional information needed and can also generate proposals that may be presented to the member 2212 for performance of these tasks.

In the example illustrated in FIG. 22, communications between the member 2212 and the task facilitation service 2202 may be routed to one or more entities within the task facilitation service 2202. The example illustrated in FIG. 22 shows a communication router 2214 (referred to in the illustration as a "router") however, as may be contemplated and as illustrated in FIG. 22, the router 2214 is an abstract representation of one or more techniques for routing communications between entities. Accordingly, communications from the member 2212 to the task facilitation service 2202 may be routed to one or more entities of the task facilitation service and communications from the one or more entities of the task facilitation service 2202 may be routed back to the member 2212.

In the example illustrated in FIG. 22, the representatives 2204 can monitor communications between task facilitation service systems and/or sub-systems 2208 and the member 2212 to ensure that the interaction maintains a positive polarity as described herein because the communications can be routed 2216 to the representatives 2204 and also routed 2218 to task facilitation service systems and/or sub-systems 2208. For example, if a member 2212 is interacting with the task recommendation system, the representatives 2204 can determine whether the member 2212 is satisfied with the interaction. If the representatives 2204 determine that the conversation has a negative polarity (e.g., that the member 2212 is not satisfied with the interaction), the representatives 2204 may intervene to improve the interaction.

Similarly, other interactions between task facilitation service systems and/or sub-systems 2208 and the member 2212 may be routed 2220 to a member communication sub-system 2222 which may be configured to monitor the interactions between task facilitation service systems and/or sub-systems 2208 and the member 2212. In some embodiments, the member communication sub-system 2222 can be configured to intercept the interactions between task facilitation service systems and/or sub-systems 2208 and the member 2212 (using, for example, the router 2214). In such an embodiment, all such interactions can be routed 2220 between the member 2212 and the member communication sub-system 2222 and can be routed 2225 between the member communication sub-system 2222 and the task facilitation service systems and/or sub-systems 2208. In such an embodiment, interactions between the task facilitation service systems and/or sub-systems 2208 and the member 2212 may not be routed 2218 directly. In such an embodiment, the representatives 2204 may still monitor interactions between task facilitation service systems and/or sub-systems 2208 and the member 2212 to ensure that the interaction maintains a positive polarity as described above (e.g., by routing 2216 the interactions to the representatives 2204).

In some embodiments, the representatives 2204 can interact with the machine learning sub-system 2206 to update the profile of the member indicating changing member preferences based on an interaction between the representatives 2204 the member 2212. In some embodiments, the task facilitation service systems and/or sub-systems 2208 can interact with the machine learning sub-system 2206 to update the profile of the member when, for example, a proposal is accepted or rejected. Additionally, as illustrated in FIG. 22, the interactions between the task facilitation service 2202 and the member 2212 can be additionally routed 2226 between the member communication sub-system 2222 and the machine learning sub-system 2206. Accordingly, interactions between the member 2212 and, for example, a proposal creation sub-system may be used to update the profile of the member as a proposal is created.

Thus, unlike automated customer service systems and environments, wherein the systems and environment may have little or no knowledge of users interacting with agents and/or other automated systems, task facilitation service systems and/or sub-systems 2208 can update the profile of the member 2212 and/or a computational model of the profile of the member 2212 continuously, dynamically, automatically, and/or in real-time. For example, task facilitation service systems and/or sub-systems 2208 can update the profile of the member 2212 and/or a computational model of the profile of the member 2212 using the machine learning sub-system 2206 as described herein. Accordingly, task facilitation service systems and/or sub-systems 2208 can update the profile of the member 2212 and/or a computational model of the profile of the member 2212 to provide up-to-date information about the member based on the member's automatic interaction with the task facilitation service 2202, based on the member's interaction with the representative 2204, and/or based on tasks performed on behalf of the member 2212 over time. This information may also be updated continuously, automatically, dynamically, and/or in real-time as tasks and/or proposals are created, proposed, and performed for the member 2212. This information may also be used by the task facilitation service 2202 to anticipate, identify, and present appropriate or intelligent interactions with the member 2212 (e.g., in response to member 2212 queries, needs, and/or goals).

FIG. 22 illustrates a computing system architecture 2300, including various components in electrical communication with each other, in accordance with some embodiments. The example computing system architecture 2300 illustrated in FIG. 23 includes a computing device 2302, which has various components in electrical communication with each other using a connection 2306, such as a bus, in accordance with some implementations. The example computing system architecture 2300 includes a processing unit 2304 that is in electrical communication with various system components, using the connection 2306, and including the system memory 2314. In some embodiments, the system memory 2314 includes read-only memory (ROM), random-access memory (RAM), and other such memory technologies including, but not limited to, those described herein. In some embodiments, the example computing system architecture 2300 includes a cache 2308 of high-speed memory connected directly with, in close proximity to, or integrated as part of the processor 2304. The system architecture 2300 can copy data from the memory 2314 and/or the storage device 2310 to the cache 2308 for quick access by the processor 2304. In this way, the cache 2308 can provide a performance boost that decreases or eliminates processor delays in the processor 2304 due to waiting for data. Using modules, methods and services such as those described herein, the processor 2304 can be configured to perform various actions. In some embodiments, the cache 2308 may include multiple types of cache including, for example, level one (L1) and level two (L2) cache. The memory 2314 may be referred to herein as system memory or computer system memory. The memory 2314 may include, at various times, elements of an operating system, one or more applications, data associated with the operating system or the one or more applications, or other such data associated with the computing device 2302.

Other system memory 2314 can be available for use as well. The memory 2314 can include multiple different types of memory with different performance characteristics. The processor 2304 can include any general purpose processor and one or more hardware or software services, such as service 2312 stored in storage device 2310, configured to control the processor 2304 as well as a special-purpose processor where software instructions are incorporated into the actual processor design. The processor 2304 can be a completely self-contained computing system, containing multiple cores or processors, connectors (e.g., buses), memory, memory controllers, caches, etc. In some embodiments, such a self-contained computing system with multiple cores is symmetric. In some embodiments, such a self-contained computing system with multiple cores is asymmetric. In some embodiments, the processor 2304 can be a microprocessor, a microcontroller, a digital signal processor ("DSP"), or a combination of these and/or other types of processors. In some embodiments, the processor 2304 can include multiple elements such as a core, one or more registers, and one or more processing units such as an arithmetic logic unit (ALU), a floating point unit (FPU), a graphics processing unit (GPU), a physics processing unit (PPU), a digital system processing (DSP) unit, or combinations of these and/or other such processing units.

To enable user interaction with the computing system architecture 2300, an input device 2316 can represent any number of input mechanisms, such as a microphone for speech, a touch-sensitive screen for gesture or graphical input, keyboard, mouse, motion input, pen, and other such input devices. An output device 2318 can also be one or more of a number of output mechanisms known to those of skill in the art including, but not limited to, monitors, speakers, printers, haptic devices, and other such output devices. In some instances, multimodal systems can enable a user to provide multiple types of input to communicate with the computing system architecture 2300. In some embodiments, the input device 2316 and/or the output device 2318 can be coupled to the computing device 2302 using a remote connection device such as, for example, a communication interface such as the network interface 2320 described herein. In such embodiments, the communication interface can govern and manage the input and output received from the attached input device 2316 and/or output device 2318. As may be contemplated, there is no restriction on operating on any particular hardware arrangement and accordingly the basic features here may easily be substituted for other hardware, software, or firmware arrangements as they are developed.

In some embodiments, the storage device 2310 can be described as non-volatile storage or non-volatile memory. Such non-volatile memory or non-volatile storage can be a hard disk or other types of computer readable media which can store data that are accessible by a computer, such as magnetic cassettes, flash memory cards, solid state memory devices, digital versatile disks, cartridges, RAM, ROM, and hybrids thereof.

As described above, the storage device 2310 can include hardware and/or software services such as service 2312 that can control or configure the processor 2304 to perform one or more functions including, but not limited to, the methods, processes, functions, systems, and services described herein in various embodiments. In some embodiments, the hardware or software services can be implemented as modules. As illustrated in example computing system architecture 2300, the storage device 2310 can be connected to other parts of the computing device 2302 using the system connection 2306. In some embodiments, a hardware service or hardware module such as service 2312, that performs a function can include a software component stored in a non-transitory computer-readable medium that, in connection with the necessary hardware components, such as the processor 2304, connection 2306, cache 2308, storage device 2310, memory 2314, input device 2316, output device 2318, and so forth, can carry out the functions such as those described herein.

Figure 23:
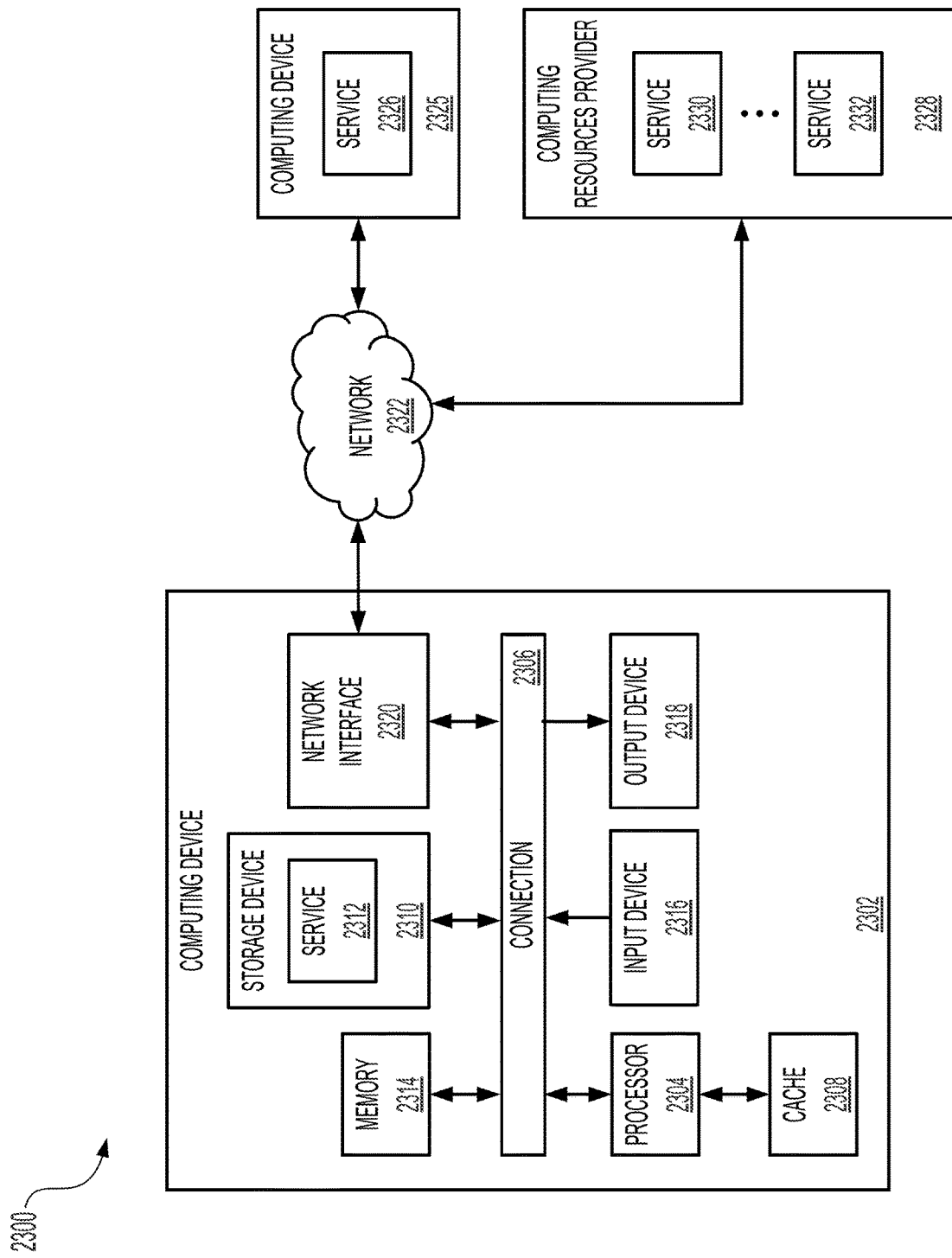
FIG. 23 shows a computing system architecture including various components in electrical communication with each other using a connection in accordance with various embodiments.

The disclosed processed for generating and executing experience recommendations can be performed using a computing system such as the example computing system illustrated in FIG. 23, using one or more components of the example computing system architecture 2300. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device.

In some embodiments, the processor can be configured to carry out some or all of methods and functions for generating and executing experience recommendations described herein by, for example, executing code using a processor such as processor 2304 wherein the code is stored in memory such as memory 2314 as described herein. One or more of a user device, a provider server or system, a database system, or other such devices, services, or systems may include some or all of the components of the computing system such as the example computing system illustrated in FIG. 23, using one or more components of the example computing system architecture 2300 illustrated herein. As may be contemplated, variations on such systems can be considered as within the scope of the present disclosure.

This disclosure contemplates the computer system taking any suitable physical form. As example and not by way of limitation, the computer system can be an embedded computer system, a system-on-chip (SOC), a single-board computer system (SBC) (such as, for example, a computer-on-module (COM) or system-on-module (SOM)), a desktop computer system, a laptop or notebook computer system, a tablet computer system, a wearable computer system or interface, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud computing system which may include one or more cloud components in one or more networks as described herein in association with the computing resources provider 2328. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor 2304 can be a conventional microprocessor such as an Intel® microprocessor, an AMD® microprocessor, a Motorola® microprocessor, or other such microprocessors. One of skill in the relevant art will recognize that the terms "machine-readable (storage) medium" or "computer-readable (storage) medium" include any type of device that is accessible by the processor.

The memory 2314 can be coupled to the processor 2304 by, for example, a connector such as connector 2306, or a bus. As used herein, a connector or bus such as connector 2306 is a communications system that transfers data between components within the computing device 2302 and may, in some embodiments, be used to transfer data between computing devices. The connector 2306 can be a data bus, a memory bus, a system bus, or other such data transfer mechanism. Examples of such connectors include, but are not limited to, an industry standard architecture (ISA" bus, an extended ISA (EISA) bus, a parallel AT attachment (PATA" bus (e.g., an integrated drive electronics (IDE) or an extended IDE (EIDE) bus), or the various types of parallel component interconnect (PCI) buses (e.g., PCI, PCIe, PCI-104, etc.).

The memory 2314 can include RAM including, but not limited to, dynamic RAM (DRAM), static RAM (SRAM), synchronous dynamic RAM (SDRAM), non-volatile random access memory (NVRAM), and other types of RAM. The DRAM may include error-correcting code (EEC). The memory can also include ROM including, but not limited to, programmable ROM (PROM), erasable and programmable ROM (EPROM), electronically erasable and programmable ROM (EEPROM), Flash Memory, masked ROM (MROM), and other types or ROM. The memory 2314 can also include magnetic or optical data storage media including read-only (e.g., CD ROM and DVD ROM) or otherwise (e.g., CD or DVD). The memory can be local, remote, or distributed.

As described above, the connector 2306 (or bus) can also couple the processor 2304 to the storage device 2310, which may include non-volatile memory or storage and which may also include a drive unit. In some embodiments, the non-volatile memory or storage is a magnetic floppy or hard disk, a magnetic-optical disk, an optical disk, a ROM (e.g., a CD-ROM, DVD-ROM, EPROM, or EEPROM), a magnetic or optical card, or another form of storage for data. Some of this data is may be written, by a direct memory access process, into memory during execution of software in a computer system. The non-volatile memory or storage can be local, remote, or distributed. In some embodiments, the non-volatile memory or storage is optional. As may be contemplated, a computing system can be created with all applicable data available in memory. A typical computer system will usually include at least one processor, memory, and a device (e.g., a bus) coupling the memory to the processor.

Software and/or data associated with software can be stored in the non-volatile memory and/or the drive unit. In some embodiments (e.g., for large programs) it may not be possible to store the entire program and/or data in the memory at any one time. In such embodiments, the program and/or data can be moved in and out of memory from, for example, an additional storage device such as storage device 2310. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The connection 2306 can also couple the processor 2304 to a network interface device such as the network interface 2320. The interface can include one or more of a modem or other such network interfaces including, but not limited to those described herein. It will be appreciated that the network interface 2320 may be considered to be part of the computing device 2302 or may be separate from the computing device 2302. The network interface 2320 can include one or more of an analog modem, Integrated Services Digital Network (ISDN) modem, cable modem, token ring interface, satellite transmission interface, or other interfaces for coupling a computer system to other computer systems. In some embodiments, the network interface 2320 can include one or more input and/or output (I/O) devices. The I/O devices can include, by way of example but not limitation, input devices such as input device 2316 and/or output devices such as output device 2318. For example, the network interface 2320 may include a keyboard, a mouse, a printer, a scanner, a display device, and other such components. Other examples of input devices and output devices are described herein. In some embodiments, a communication interface device can be implemented as a complete and separate computing device.

In some embodiments, the computing device 2302 can be connected to one or more additional computing devices such as computing device 2325 via a network 2322 using a connection such as the network interface 2320. In such embodiments, the computing device 2325 may execute one or more services 2326 to perform one or more functions under the control of, or on behalf of, programs and/or services operating on computing device 2302. In some embodiments, a computing device such as computing device 2325 may include one or more of the types of components as described in connection with computing device 2302 including, but not limited to, a processor such as processor 2304, a connection such as connection 2306, a cache such as cache 2308, a storage device such as storage device 2310, memory such as memory 2314, an input device such as input device 2316, and an output device such as output device 2318. In such embodiments, the computing device 2325 can carry out the functions such as those described herein in connection with computing device 2302. In some embodiments, the computing device 2302 can be connected to a plurality of computing devices such as computing device 2325, each of which may also be connected to a plurality of computing devices such as computing device 2325. Such an embodiment may be referred to herein as a distributed computing environment.

In some embodiments, the computing device 2302 and/or the computing device 2325 can be connected to a computing resources provider 2328 via the network 2322 using a network interface such as those described herein (e.g. network interface 2320). In such embodiments, one or more systems (e.g., service 2330 and service 2332) hosted within the computing resources provider 2328 (also referred to herein as within "a computing resources provider environment") may execute one or more services to perform one or more functions under the control of, or on behalf of, programs and/or services operating on computing device 2302 and/or computing device 2325. Systems such as service 2330 and service 2332 may include one or more computing devices such as those described herein to execute computer code to perform the one or more functions under the control of, or on behalf of, programs and/or services operating on computing device 2302 and/or computing device 2325.

For example, the computing resources provider 2328 may provide a service, operating on service 2330 to store data for the computing device 2302 when, for example, the amount of data that the computing device 2302 exceeds the capacity of storage device 2310. In another example, the computing resources provider 2328 may provide a service to first instantiate a virtual machine (VM) on service 2332, use that VM to access the data stored on service 2332, perform one or more operations on that data, and provide a result of those one or more operations to the computing device 2302. Such operations (e.g., data storage and VM instantiation) may be referred to herein as operating "in the cloud," "within a cloud computing environment," or "within a hosted virtual machine environment," and the computing resources provider 2328 may also be referred to herein as "the cloud." Examples of such computing resources providers include, but are not limited to Amazon® Web Services (AWS®), Microsoft's Azure®, IBM Cloud®, Google Cloud®, Oracle Cloud® etc.

Services provided by a computing resources provider 2328 include, but are not limited to, data analytics, data storage, archival storage, big data storage, virtual computing (including various scalable VM architectures), blockchain services, containers (e.g., application encapsulation), database services, development environments (including sandbox development environments), e-commerce solutions, game services, media and content management services, security services, serverless hosting, virtual reality (VR) systems, and augmented reality (AR) systems. Various techniques to facilitate such services include, but are not be limited to, virtual machines, virtual storage, database services, system schedulers (e.g., hypervisors), resource management systems, various types of short-term, mid-term, long-term, and archival storage devices, etc.

As may be contemplated, the systems such as service 2330 and service 2332 may implement versions of various services (e.g., the service 2312 or the service 2326) on behalf of, or under the control of, computing device 2302 and/or computing device 2325. Such implemented versions of various services may involve one or more virtualization techniques so that, for example, it may appear to a user of computing device 2302 that the service 2312 is executing on the computing device 2302 when the service is executing on, for example, service 2330. As may also be contemplated, the various services operating within the computing resources provider 2328 environment may be distributed among various systems within the environment as well as partially distributed onto computing device 2325 and/or computing device 2302.

Client devices, user devices, computer resources provider devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things such as those described herein. The input devices can include, for example, a keyboard, a mouse, a key pad, a touch interface, a microphone, a camera, and/or other types of input devices including, but not limited to, those described herein. The output devices can include, for example, a display screen, a speaker, a haptic feedback system, a printer, and/or other types of output devices including, but not limited to, those described herein. A data storage device, such as a hard drive or flash memory, can enable the computing device to temporarily or permanently store data. A network interface, such as a wireless or wired interface, can enable the computing device to communicate with a network. Examples of computing devices (e.g., the computing device 2302) include, but is not limited to, desktop computers, laptop computers, server computers, hand-held computers, tablets, smart phones, personal digital assistants, digital home assistants, wearable devices, smart devices, and combinations of these and/or other such computing devices as well as machines and apparatuses in which a computing device has been incorporated and/or virtually implemented.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as that described herein. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices (e.g., a combination of a DSP and a microprocessor), a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

As used herein, the term "machine-readable media" and equivalent terms "machine-readable storage media," "computer-readable media," and "computer-readable storage media" refer to media that includes, but is not limited to, portable or non-portable storage devices, optical storage devices, removable or non-removable storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), solid state drives (SSD), flash memory, memory or memory devices.

A machine-readable medium or machine-readable storage medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like. Further examples of machine-readable storage media, machine-readable media, or computer-readable (storage) media include but are not limited to recordable type media such as volatile and non-volatile memory devices, floppy and other removable disks, hard disk drives, optical disks (e.g., CDs, DVDs, etc.), among others, and transmission type media such as digital and analog communication links.

As may be contemplated, while examples herein may illustrate or refer to a machine-readable medium or machine-readable storage medium as a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

Some portions of the detailed description herein may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

It is also noted that individual implementations may be described as a process which is depicted as a flowchart, a flow diagram, a data flow diagram, a structure diagram, or a block diagram. Although a flowchart, a flow diagram, a data flow diagram, a structure diagram, or a block diagram may describe the operations as a sequential process, many of the operations can be performed in parallel or concurrently. In addition, the order of the operations may be re-arranged. A process illustrated in a figure is terminated when its operations are completed, but could have additional steps not included in the figure. A process may correspond to a method, a function, a procedure, a subroutine, a subprogram, etc. When a process corresponds to a function, its termination can correspond to a return of the function to the calling function or the main function.

In some embodiments, one or more implementations of an algorithm such as those described herein may be implemented using a machine learning or artificial intelligence algorithm. Such a machine learning or artificial intelligence algorithm may be trained using supervised, unsupervised, reinforcement, or other such training techniques. For example, a set of data may be analyzed using one of a variety of machine learning algorithms to identify correlations between different elements of the set of data without supervision and feedback (e.g., an unsupervised training technique). A machine learning data analysis algorithm may also be trained using sample or live data to identify potential correlations. Such algorithms may include k-means clustering algorithms, fuzzy c-means (FCM) algorithms, expectation-maximization (EM) algorithms, hierarchical clustering algorithms, density-based spatial clustering of applications with noise (DBSCAN) algorithms, and the like. Other examples of machine learning or artificial intelligence algorithms include, but are not limited to, genetic algorithms, backpropagation, reinforcement learning, decision trees, liner classification, artificial neural networks, anomaly detection, and such. More generally, machine learning or artificial intelligence methods may include regression analysis, dimensionality reduction, metalearning, reinforcement learning, deep learning, and other such algorithms and/or methods. As may be contemplated, the terms "machine learning" and "artificial intelligence" are frequently used interchangeably due to the degree of overlap between these fields and many of the disclosed techniques and algorithms have similar approaches.

As an example of a supervised training technique, a set of data can be selected for training of the machine learning model to facilitate identification of correlations between members of the set of data. The machine learning model may be evaluated to determine, based on the sample inputs supplied to the machine learning model, whether the machine learning model is producing accurate correlations between members of the set of data. Based on this evaluation, the machine learning model may be modified to increase the likelihood of the machine learning model identifying the desired correlations. The machine learning model may further be dynamically trained by soliciting feedback from users of a system as to the efficacy of correlations provided by the machine learning algorithm or artificial intelligence algorithm (i.e., the supervision). The machine learning algorithm or artificial intelligence may use this feedback to improve the algorithm for generating correlations (e.g., the feedback may be used to further train the machine learning algorithm or artificial intelligence to provide more accurate correlations).

While certain aspects of the disclosure are presented below in certain claim forms, the inventors contemplate the various aspects of the disclosure in any number of claim forms. Any claims intended to be treated under 35 U.S.C. § 192(f) will begin with the words "means for". Accordingly, the applicant reserves the right to add additional claims after filing the application to pursue such additional claim forms for other aspects of the disclosure.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A computer-implemented method comprising:
simultaneously processing, by a server computer including one or more processors, numerous messages between members and representatives;
receiving, at the server computer, one or more pre-filtering inputs from a member, wherein the one or more pre-filtering inputs include task associations;
receiving in real-time a set of messages between the member and a representative, wherein the set of messages are received simultaneously with the numerous messages between members and representatives, and wherein the set of messages are received by the server computer in real-time as the set of messages are being exchanged;
simultaneously processing the set of messages and the numerous messages using a filtering algorithm to associate a message type with the set of messages and the numerous messages;
calculating messaging metrics for tasks of the task associations;
generating one or more chat flow interfaces for the task associations based on the messaging metrics;
dynamically generating a new chat flow interface as a message of the message type is displayed in a real-time chat interface, wherein the new chat flow interface is for a sub-task associated with the task associations, and wherein the new chat flow interface is generated when the messaging metrics for the sub-task exceed a threshold; and
updating a system algorithm using the task associations and the sub-task, wherein the system algorithm dynamically generates additional chat flow interfaces in real-time as new messages of the message type are being exchanged between members and representatives.

2. The computer-implemented method of claim 1, wherein updating the system algorithm comprises member specific algorithm training using member specific modifications to the system algorithm.

3. The computer-implemented method of claim 1, further comprising storing the set of messages and the numerous messages in a database, wherein updating the system algorithm further uses user data, task data, member preference indications, and member specific modifications.

4. The computer-implemented method of claim 1, wherein updating the system algorithm is associated with a reduction in energy usage, memory usage, and processor access time for updating the system algorithm.

5. The computer-implemented method of claim 1, wherein the task associations are associated with one or more tasks selected from a set of approved project recommendations generated by a task proposal creation sub-system and approved using a task creation sub-system.

6. The computer-implemented method of claim 1, wherein the filtering algorithm uses a natural language processing (NLP) system with machine learning to select the task associations.

7. The computer-implemented method of claim 1, further comprising:
generating a training set using messages of the set of messages and the numerous messages.

8. A server computer comprising:
memory; and
one or more processors coupled to the memory and configured to perform operations including:
simultaneously processing numerous messages between members and representatives;
receiving, at the server computer, one or more pre-filtering inputs from a member, wherein the one or more pre-filtering inputs include task associations;
receiving in real-time a set of messages between the member and a representative, wherein the set of messages are received simultaneously with the numerous messages between members and representatives, and wherein the set of messages are received by the server computer in real-time as the set of messages are being exchanged;
simultaneously processing the set of messages and the numerous messages using a filtering algorithm to associate a message type with the set of messages and the numerous messages;
calculating messaging metrics for tasks of the task associations;
generating one or more chat flow interfaces for the task associations based on the messaging metrics;
dynamically generating a new chat flow interface as a message of the message type is displayed in a real-time chat interface, wherein the new chat flow interface is for a sub-task associated with the task associations, and wherein the new chat flow interface is generated when the messaging metrics for the sub-task exceed a threshold; and
updating a system algorithm using the task associations and the sub-task, wherein the system algorithm dynamically generates additional chat flow interfaces in real-time as new messages of the message type are being exchanged between members and representatives.

9. The server computer of claim 8, wherein updating the system algorithm comprises member specific algorithm training using member specific modifications to the system algorithm.

10. The server computer of claim 8, wherein the one or more processors are configured for operations further comprising storing the set of messages and the numerous messages in a database, wherein updating the system algorithm further uses user data, task data, member preference indications, and member specific modifications.

11. The server computer of claim 8, wherein updating the system algorithm is associated with a reduction in energy usage, memory usage, and processor access time for updating the system algorithm.

12. The server computer of claim 8, wherein the task associations are associated with one or more tasks selected from a set of approved project recommendations generated by a task proposal creation sub-system and approved using a task creation sub-system.

13. The server computer of claim 8, wherein the filtering algorithm uses a natural language processing (NLP) system with machine learning to select the task associations.

14. The server computer of claim 8, wherein the operations further include:
generating a training set using messages of the set of messages and the numerous messages.

15. A non-transitory computer-readable storage medium comprising instructions that, when executed by one or more processors of a server computer, cause the server computer to perform operations comprising:
simultaneously processing numerous messages between members and representatives;
receiving, at the server computer, one or more pre-filtering inputs from a member, wherein the one or more pre-filtering inputs include task associations;
receiving in real-time a set of messages between the member and a representative, wherein the set of messages are received simultaneously with the numerous messages between members and representatives, and wherein the set of messages are received by the server computer in real-time as the set of messages are being exchanged;
simultaneously processing the set of messages and the numerous messages using a filtering algorithm to associate a message type with the set of messages and the numerous messages;
calculating messaging metrics for tasks of the task associations;
generating one or more chat flow interfaces for the task associations based on the messaging metrics;
dynamically generating a new chat flow interface as a message of the message type is displayed in a real-time chat interface, wherein the new chat flow interface is for a sub-task associated with the task associations, and wherein the new chat flow interface is generated when the messaging metrics for the sub-task exceed a threshold; and
updating a system algorithm using the task associations and the sub-task, wherein the system algorithm dynamically generates additional chat flow interfaces in real-time as new messages of the message type are being exchanged between members and representatives.

16. The non-transitory computer-readable storage medium of claim 15, wherein updating the system algorithm comprises member specific algorithm training using member specific modifications to the system algorithm.

17. The non-transitory computer-readable storage medium of claim 15, further comprising storing the set of messages and the numerous messages in a database, wherein updating the system algorithm further uses user data, task data, member preference indications, and member specific modifications.

18. The non-transitory computer-readable storage medium of claim 15, wherein updating the system algorithm is associated with a reduction in energy usage, memory usage, and processor access time for updating the system algorithm.

19. The non-transitory computer-readable storage medium of claim 15, wherein the task associations are associated with one or more tasks selected from a set of approved project recommendations generated by a task proposal creation sub-system and approved using a task creation sub-system.

20. The non-transitory computer-readable storage medium of claim 15, wherein the filtering algorithm uses a natural language processing (NLP) system with machine learning to select the task associations.

* * * * *